United States Patent [19]
Hamada et al.

[11] Patent Number: 5,315,339
[45] Date of Patent: May 24, 1994

[54] AUTO FOCUS CAMERA HAVING PLURAL FOCUSSING MODES

[75] Inventors: Masataka Hamada, Osakasayama; Kenji Ishibashi, Sakai; Hiroshi Ueda, Habikino; Hiroshi Otsuka, Sakai; Yoshihiro Hara, Kishiwada, all of Japan

[73] Assignee: Minolta Camera Kabushiki Kaisha, Osaka, Japan

[21] Appl. No.: 885,615

[22] Filed: May 19, 1992

[30] Foreign Application Priority Data

| May 22, 1991 | [JP] | Japan | 3-147916 |
| May 23, 1991 | [JP] | Japan | 3-149984 |
| May 23, 1991 | [JP] | Japan | 3-149985 |
| May 24, 1991 | [JP] | Japan | 3-149987 |
| May 24, 1991 | [JP] | Japan | 3-149988 |
| Jun. 27, 1991 | [JP] | Japan | 3-156675 |

[51] Int. Cl.$^5$ ............................................. G03B 13/36
[52] U.S. Cl. ....................................... 354/400; 354/402
[58] Field of Search ................ 354/400, 219, 402, 62

[56] References Cited

U.S. PATENT DOCUMENTS

| 4,609,274 | 9/1986 | Iwashita et al. | 354/400 |
| 5,138,354 | 8/1992 | Okada et al. | 354/400 |

FOREIGN PATENT DOCUMENTS

| 62-34865 | 2/1987 | Japan. |
| 1-42639 | 2/1989 | Japan. |
| 2-179076 | 7/1990 | Japan. |

OTHER PUBLICATIONS

Photo Industry, vol. 48, No. 11, Nov. 1990, pp. 74–83.

Primary Examiner—Russell E. Adams
Attorney, Agent, or Firm—Burns, Doane, Swecker & Mathis

[57] ABSTRACT

An auto focus camera includes a focus detecting circuit, a lens driving circuit for driving a taking lens to an in-focus position based on a focus detection result, a starting signal outputting circuit for outputting a starting signal which starts a focusing operation, an operating member to be operated by a user after the starting signal is outputted, and a controlling circuit for controlling the lens driving circuit so as to drive the taking lens in manners different between before and after an operation of the operation member.

18 Claims, 68 Drawing Sheets

Ua Flow

Fig. 31 Qa Flow

Fig. 32 Ra Flow

Sa Flow

T Flow

Fig. 48
(While FA Mode Is ON)
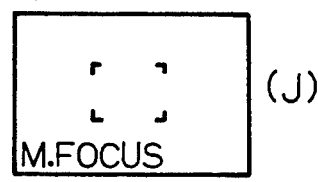 (J)
(In FA Mode)
| | Wide AF | Spot AF |
|---|---|---|
| In eye sensing mode | 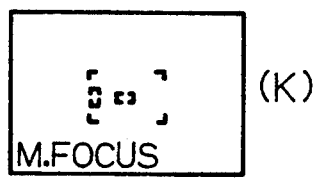 (K) | 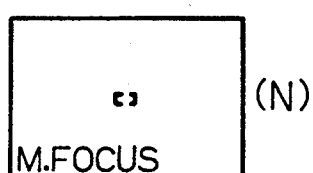 (N) |
| Under S1ON condition | 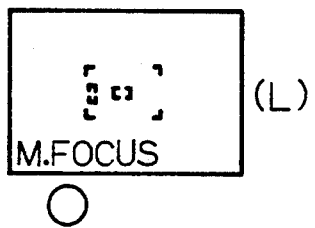 (L) | 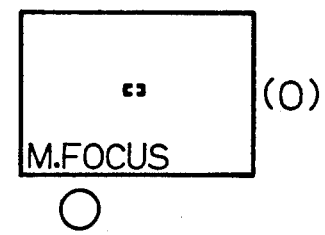 (O) |

Sb Flow

Sc Flow

Qb Flow

RC FLOW

AUTO FOCUS CAMERA HAVING PLURAL FOCUSSING MODES

BACKGROUND OF THE INVENTION

1. Field of the Invention

The present invention relates to a camera, and more specifically, to a camera having an auto focus (AF) function.

2. Description of the Prior Art

A function called continuous AF has conventionally been known. Continuous AF is a function of repeating an AF operation such as focus detection and lens driving so that an in-focus condition is always obtained with respect to a subject moving along the optical axis.

On the other hand, while photometry and an AF operation are started by a halfway depression of a release button in conventional cameras, a camera has recently been proposed where photometry and an AF operation are started prior to the halfway depression of the release button in order to reduce time lag as much as possible. For example, a camera where photometry and an AF operation are started on it being sensed that a user is looking through the finder is proposed in Japanese laid-open Patent Application S64-42639.

In a camera of this type, since it is necessary to always obtain an in-focus condition during the whole time the user is looking through the finder, it is desirable to perform the above-mentioned continuous AF. In performing continuous AF under a condition where in-focus condition has been obtained, however, since variation in focus position which variation is caused as the subject moves is not so large, it is desirable to give priority to causing the user to be unconscious of an AF operation over the operation speed of the continuous AF. That is, a quiet continuous AF is desirable which causes the user to be unconscious of focusing.

On the contrary, if an AF operation is slowly performed on the user's looking through the finder, an amount of time is required from when the user starts to look through the finder to when an in-focus condition is obtained, which is inconvenient to the user. Moreover, it is required that focusing be immediately performed just before a release operation is performed.

As described above, concerning the cameras having the continuous AF function, a camera is demanded where lens driving control can be changed according to the situation.

On the other hand, continuous AF has another problem. Generally, focusing is performed with respect to a subject located in a predetermined area called a focus area in conventional cameras. With such an arrangement, when a main subject that the user intends to photograph is located outside of the focus area, an in-focus condition is obtained with respect to the background, not with respect to the main subject. Such a problem is also caused in performing a continuous AF operation. Particularly, in a case where the main subject moves out of the focus area just before a release operation, the moment the main subject moves out, in-focus condition is obtained with respect to the background in the continuous AF. As a result, a photograph is taken where the main subject is out of focus.

SUMMARY OF THE INVENTION

An object of the present invention is to provide a camera where lens driving control can be varied according to the situation during continuous AF.

Another object of the present invention is to provide a camera where, when there is a main subject with respect to which the user intends to obtain an in-focus condition, it can be prevented that the in-focus condition is obtained with respect to the background during continuous AF even in a case where the main subject is located outside of the focus area.

BRIEF DESCRIPTION OF THE DRAWINGS

These and other objects and features of this invention will become clear from the following description taken in conjunction with the preferred embodiments with reference to the accompanied drawings in which:

FIG. 48 shows displays provided within the finder and AF condition displays provided out of the finder in a manual focus mode in the first embodiment of the present invention;

DESCRIPTION OF THE PREFERRED EMBODIMENT

As a first embodiment of the present invention, a single-lens reflex camera system which is provided with a zoom lens system where a focal length can be varied by a motor will hereinafter be described with reference to the drawings.

Figure 1:
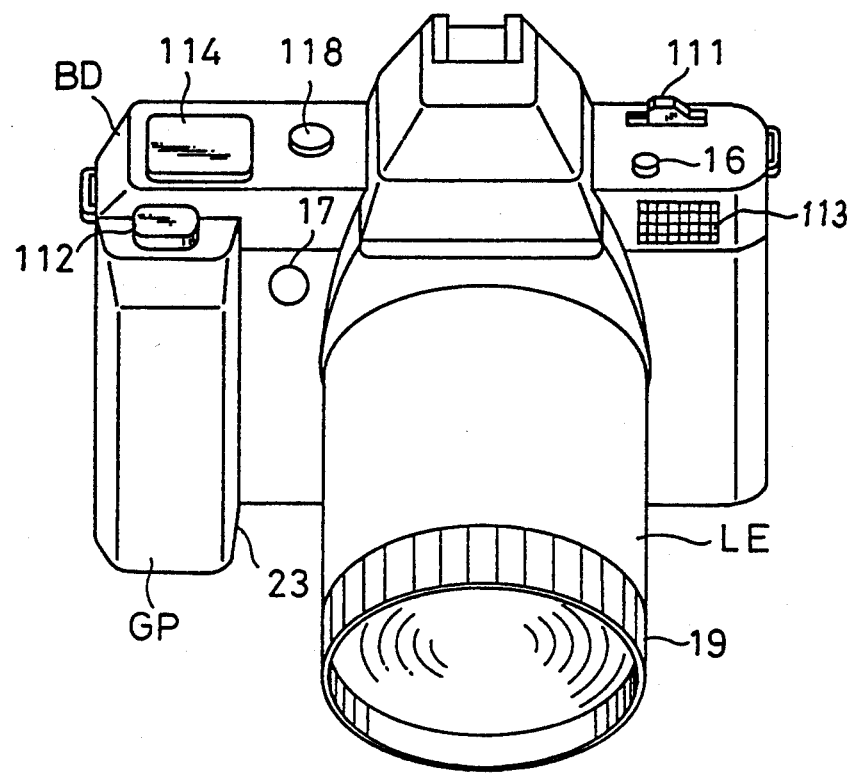
FIG. 1 is a front overlooked view showing the appearance of a first embodiment of the present invention.
Figure 2:
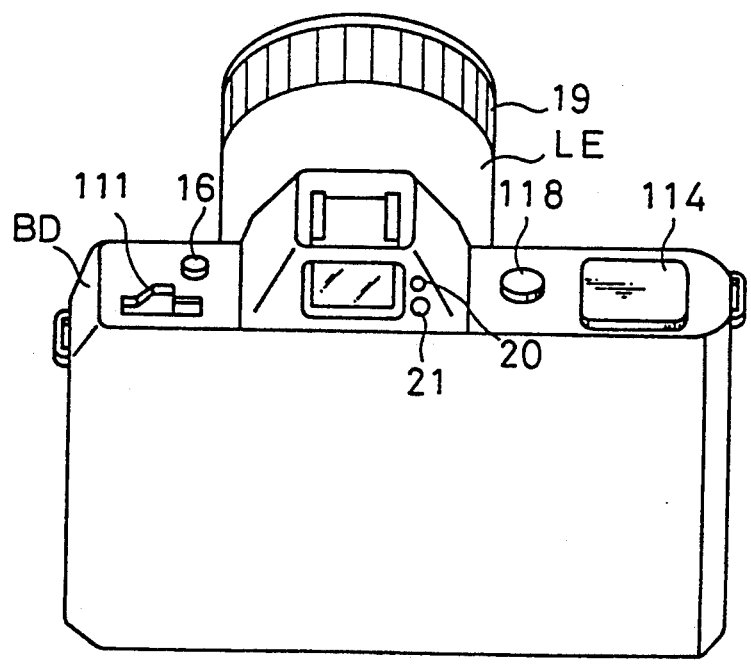
FIG. 2 is a rear overlooked view showing the appearance of the first embodiment of the present invention.
Figure 3:
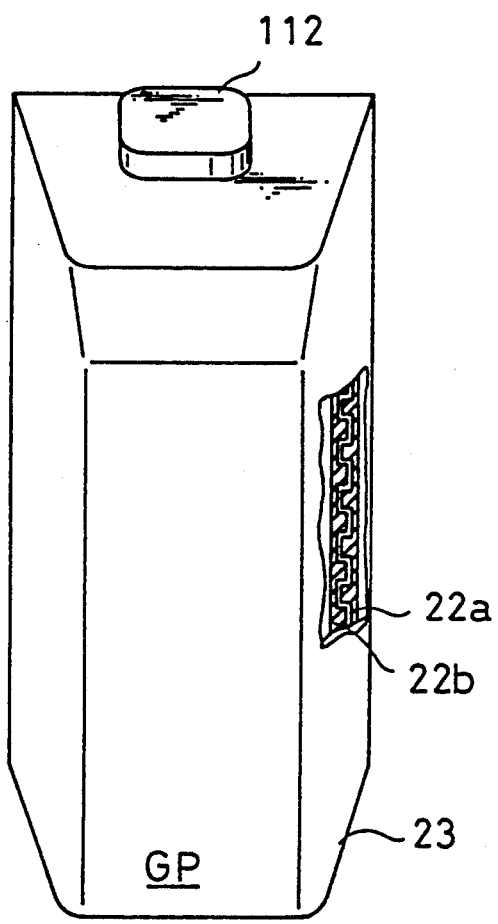
FIG. 3 is a front overlooked view of a grip portion of the first embodiment of the present invention.

FIG. 1 is a front overlooked view of a camera body BD embodying the present invention. FIG. 2 is a rear overlooked view of the camera body BD. FIG. 3 is an enlarged view of a grip portion GP of the camera body BD.

The name and function of each portion of the camera body BD will briefly be described with reference to FIGS. 1 to 3. Switches will be described later together with the circuit arrangement which is shown in FIG. 4.

Figure 4:
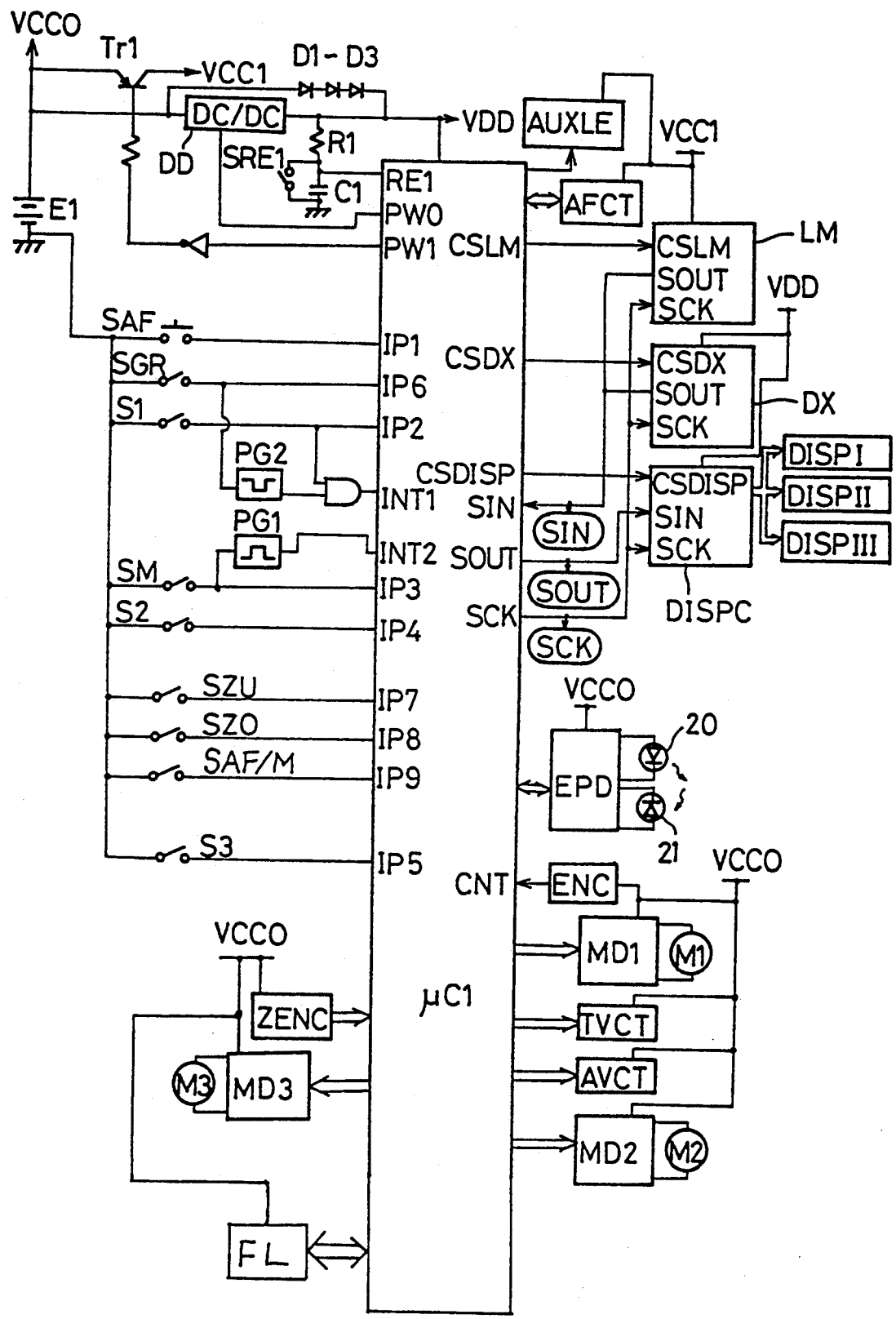
FIG. 4 is a circuit diagram of the first embodiment of the present invention.

The numeral 111 is a slider for turning on and off a subsequently-described main switch SM (FIG. 4). The camera body BD is under an operable condition when the slider 111 is placed at ON position, and is under an inoperable condition when the slider 111 is placed at OFF position. The numeral 113 is a flash emitting portion.

The numeral 112 is a release button. By depressing the release button 112 halfway, a subsequently-described photographing preparation switch S1 is turned on to start a photometry, an exposure calculation and an AF operations. Moreover, by depressing the release button 112 all the way down, a subsequently-described release switch S2 is turned on to start an exposure control operation.

The numeral 114 is a body display portion for displaying a shutter speed and an aperture value.

The numeral 16 is an AF/MF changeover switch for changing over between AF and MF (manual focusing).

The numeral 17 is a light emitting window for emitting auxiliary light. Inside thereof, au auxiliary light emitting portion is arranged.

The numeral 118 is an AF area changing switch which is operated in order to change AF areas (distance measurement areas).

The numeral 19 which is provided to the lens LE is a zoom ring. A subsequently-described motor is driven in accordance with the rotation of the zoom ring and the direction of the rotation thereof to move a lens in a wide direction (shorter focal length direction) or in a telephoto direction (longer focal length direction).

The numeral 20 is an LED (light emitting diode) which serves as a light emitting portion. The numeral 21 is an SPC (silicon photocell) which serves as a light receiving portion. By the LED 20 and the SPC 21, whether a user is looking through the finder or not is sensed (this sensing will hereinafter be referred to as "eye sensing"). That is, a light beam emitted by the LED 20 is reflected by the user who is looking through the finder, and the reflected light beam is received by the SPC 21 to perform the eye sensing.

An external cover 23 of the grip portion GP of FIG. 3 is made of elastic rubber. Inside of the grip portion GP, conductive patterns 22a and 22b which are insulated from each other are provided. Between the cover 23 and the conductive patterns 22a and 22b, conductive rubber (not shown) is arranged. By pressing the external cover 23 of the grip portion GP, the conductive patterns 22a and 22b are enabled through the conductive rubber. With this arrangement, the grip portion GP functions as a switch (hereinafter referred to as "grip switch").

Subsequently, a circuit arrangement of the camera body BD will be described.

FIG. 4 is a circuit diagram of an intra-body circuit which is incorporated in the camera body BD. First, the intra-body circuit will be described with reference to the figure.

$\mu C1$ is an intra-body microcomputer which controls the entire camera system and performs various calculations.

AFCT is a focus detection light receiving circuit, which is provided with: a CCD (charge coupled device) which serves as a focus detection sensor for accumulating an optical charge for a predetermined period of time; a circuit for driving the CCD; and a circuit for processing and A/D-(analog to digital) converting an output of the CCD to provide (data dump) it to the intra-body microcomputer μC1. The focus detection light receiving circuit AFCT is connected to the intra-body microcomputer μC1 through a data bus. Information on a defocus amount of a subject which is located in a distance measurement area is obtained through the focus detection light receiving circuit AFCT.

LM is a photometry circuit which is provided on the finder optical path. A photometry value thereof is A/D-converted and provided to the intra-body microcomputer μC1 as luminance information.

DX is a film sensitivity reading circuit for reading a data, on film sensitivity, which is provided to a film holder to serially output them to the intra-body microcomputer μC1.

DISPC is a display circuit for inputting a display data and a display control signal from the intra-body microcomputer μC1 to cause the following display portions to form a predetermined display character: a display portion DISPI (the display portion 114 of FIGS. 1 and 2) which is provided on the upper surface of the camera body BD; a display portion DISPII, of a transmission type liquid crystal, which is arranged in parallel with a focusing screen (not shown) and whose display character is viewed within an image plane consisting of images made through the lens; and a display portion DISPIII whose display character is viewed outside of a finder image plane.

EPD is an eye sensing circuit for performing eye sensing by use of the LED 20 and the SPC 21.

M1 is an AF motor for driving an AF lens provided in the lens LE (FIGS. 1 and 2) as a focusing lens for AF through an AF mechanism (not shown).

MD1 is a motor drive circuit for driving the AF motor M1 based on focus detection information. A normal or a reverse rotation and stopping thereof is controlled by an instruction from the intra-body microcomputer μC1.

ENC is an encoder for monitoring a rotation of the AF motor M1. The encoder ENC outputs a pulse to a counter input terminal CNT of the intra-body microcomputer μC1 every predetermined rotation angle. The intra-body microcomputer μC1 counts the pulse, detects a moving-out amount from infinity to the current lens position, and calculates a photographing distance (or a subject distance) of a subject from the moving-out amount (moving-out pulse count CT).

TVCT is a shutter control circuit for controlling a shutter in response to a control signal from the intra-body microcomputer μC1.

AVCT is an aperture control circuit for controlling an aperture in response to a control signal from the intra-body microcomputer μC1.

M2 is a motor for winding and rewinding film and charging an exposure control mechanism. MD2 is a motor drive circuit for driving the motor M2 based on an instruction from the intra-body microcomputer μC1.

M3 is a motor for driving a mechanism (not shown) and driving a part or the whole of the lens system to perform a zooming operation. MD3 is a motor drive circuit for driving the motor M3 based on an instruction from the intra-body microcomputer μC1.

ZENC is an encoder for detecting a focal length. The zoom lens LE has a focal length range of between 35 mm to 400 mm.

AUXLE is an auxiliary light emitting circuit for emitting an auxiliary light in response to an auxiliary light emission signal from the intra-body microcomputer μC1 in an auxiliary light mode. The auxiliary light mode is a mode where light is irradiated to a subject in order to obtain a subject image required for AF when the subject is of low luminance and of low contrast. FL is a flash control portion for flash emission and flash charging.

Subsequently, an arrangement relating to the power source will be described.

E1 is a battery which serves as the power source of the camera body BD.

Tr1 is a first power supply transistor for supplying power to a part of the above-described circuit.

DD is a DC/DC (direct current/direct current) converter for stabilizing a voltage VDD which is to be supplied to the intra-body microcomputer μC1. The DC/DC converter DD operates when a power control terminal PW0 is of high level.

VDD is an operation power voltage for the intra-body microcomputer μC1, the film sensitivity reading circuit DX and the display control circuit DISPC.

VCC1 is an operation power voltage for the focus detection light receiving circuit AFCT and the photometry circuit LM. The voltage VCC1 is supplied from the battery E1 through the power supply transistor Tr1 under control of a signal which is outputted from a power control terminal PW1.

VCC0 is an operation power voltage for the eye sensing circuit EPD, the motor drive circuit MD1, the shutter control circuit TVCT, the aperture control circuit AVCT and the motor drive circuits MD2 and MD3. The voltage VCC0 is supplied directly from the battery E1.

D1 to D3 are diodes for, in order to reduce power consumption, providing a voltage lower than the voltage VDD to the intra-body microcomputer μC1 when the DC/DC converter DD halts its operation. The lower voltage is set to a minimum power supply voltage at which the intra-body microcomputer μC1 can operate. When the DC/DC converter DD halts its operation, only the intra-body microcomputer μC1 can be operated.

Subsequently, switches will be described. In FIG. 4, IP1 to IP9 are terminals, of the intra-body microcomputer μC1, through which the intra-body microcomputer μC1 is connected to respective switches.

SAF is a normally-open push switch for changing AF areas to be subsequently described. The switch SAF is turned on when the previously-described AF area changing switch 118 is depressed.

SGR is a grip switch which is turned on when the grip portion GP is gripped.

PG2 is a one-shot circuit which generates a pulse when the grip switch SGR is turned on.

S1 is a photographing preparation switch which is turned on by depressing the release button 112 halfway. When the switch S1 is turned on or when the above-mentioned grip switch SGR is turned on, an interrupt signal is inputted to an interrupt terminal INT1 of the intra-body microcomputer μC1 to perform preparation operations (such as a photometry, a distance measurement and an AF operation) required for photographing.

SM is a main switch which is ON when the slider 11 for enabling the operation of the camera is placed at ON position and which is OFF when the slider 11 is placed at OFF position.

PG1 is a pulse generator which outputs a low-level pulse every time the switch SM is turned from ON to OFF or from OFF to ON. An output of the pulse generator PG1 is inputted to an interrupt terminal INT2 of the intra-body microcomputer μC1 as an interrupt signal.

SZU and SZD are switches which are turned on and off by rotating the zoom ring 19 to the left or to the right. Zooming up is performed by the turning on of the switch SZU, while zooming down is performed by the turning on of the switch SZD.

S2 is a release switch which is turned on by depressing the release button 112 all the way down. When the switch S2 is turned on, a photographing operation is performed.

S3 is a mirror-up completion detecting switch which is turned on when a mirror (not shown) is brought up to a predetermined position during a release operation.

SAF/M is a changeover switch for changing over between AF and MF.

SRE1 is a battery attachment detecting switch which is turned off when the battery E1 is attached to the camera body BD. When the battery E1 is attached and the battery attachment detecting switch SRE1 is turned off, a capacitor C1 is charged through a resistor R1 so that the level of a reset terminal RE1 of the intra-body microcomputer μC1 is changed from low to high. Thereby, the intra-body microcomputer μC1 executes a subsequently-described reset routine.

Subsequently, an arrangement for serial data communication will be described.

The photometry circuit LM, the film sensitivity reading circuit DX and the display control circuit DISPC perform serial data communication with the intra-body microcomputer μC1 through a serial input SIN, a serial output SOUT and a serial SCK, respectively.

The communication partner with the intra-body microcomputer μC1 is selected based on the levels of chip select terminals CSLM, CSDX and CDSDISP. That is, the photometry circuit LM is selected when the level of the terminal CSLM is low; the film sensitivity reading circuit DX is selected when the level of the terminal CSDX is low; and the display control circuit DISPC is selected when the level of the terminal CSDISP is low.

Subsequently, software will be described.

First, software of the intra-body microcomputer μC1 will be described.

When the battery E1 is attached to the camera body BD, in the intra-body circuit shown in FIG. 4, the battery attachment detecting switch SRE1 is turned off, the reset capacitor C1 is charged through the resistor R1, and a reset signal whose level is changed from low to high is inputted to the reset terminal RE1 of the intra-body microcomputer μC1 which controls the entire camera. By the inputting of the reset signal, the intra-body microcomputer μC1 starts to generate a clock by use of hardware incorporated therein, activates the DC/DC converter DD and is supplied with the voltage VDD at which the intra-body microcomputer μC1 can operate to execute a reset routine which is shown in FIG. 5.

Under a subsequently-described sleep condition (halt condition), the intra-body microcomputer μC1 halts the clock generation, and the DC/DC converter DD halts its operation. In an operation which is started by an interrupt applied under the sleep condition, similarly at the attachment of the battery E1, the clock generation and the operation of the DC/DC converter DD are started by the hardware which is incorporated in the intra-body microcomputer μC1.

Figure 5:
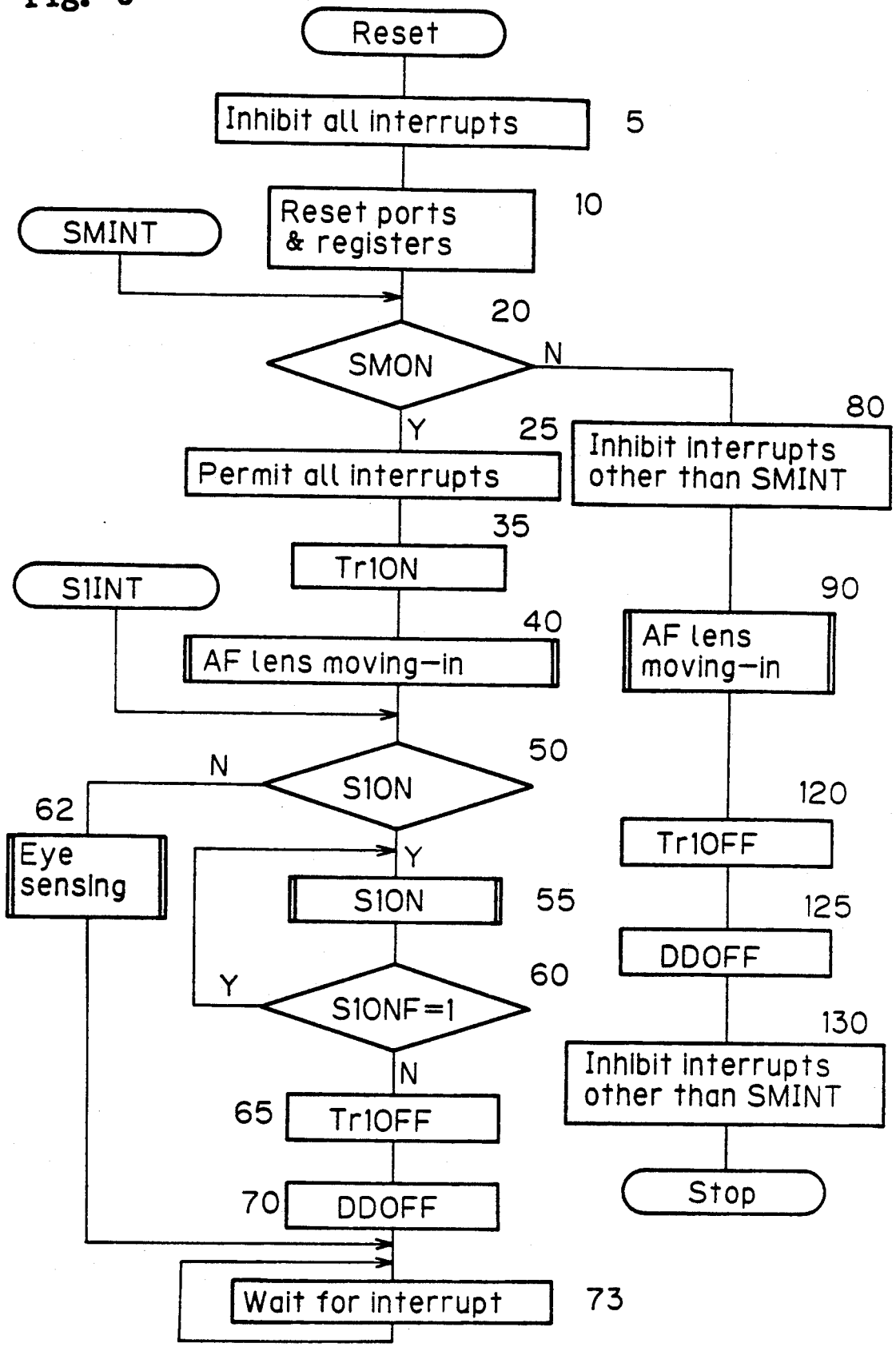
FIG. 5 is a flow chart of a reset routine executed by an intra-body microcomputer of the first embodiment of the present invention.

In the reset routine of FIG. 5, first, all the interrupts are inhibited (step #5), and ports and registers are reset (step #10). Then, at step #20, whether the main switch SM is ON or not is determined. Moreover, when the main switch SM is turned from on to off or from off to on, an interrupt SMINT by the operation of the main switch SM is applied and executed from step #20.

When it is determined that the main switch SM is ON at step #20, all the interrupts are permitted (step #25), and the level of the output port PW1 which is a power source control terminal is set to high in order to enable the transistor Tr1 for supplying power to each circuit (step #35).

Figure 6:
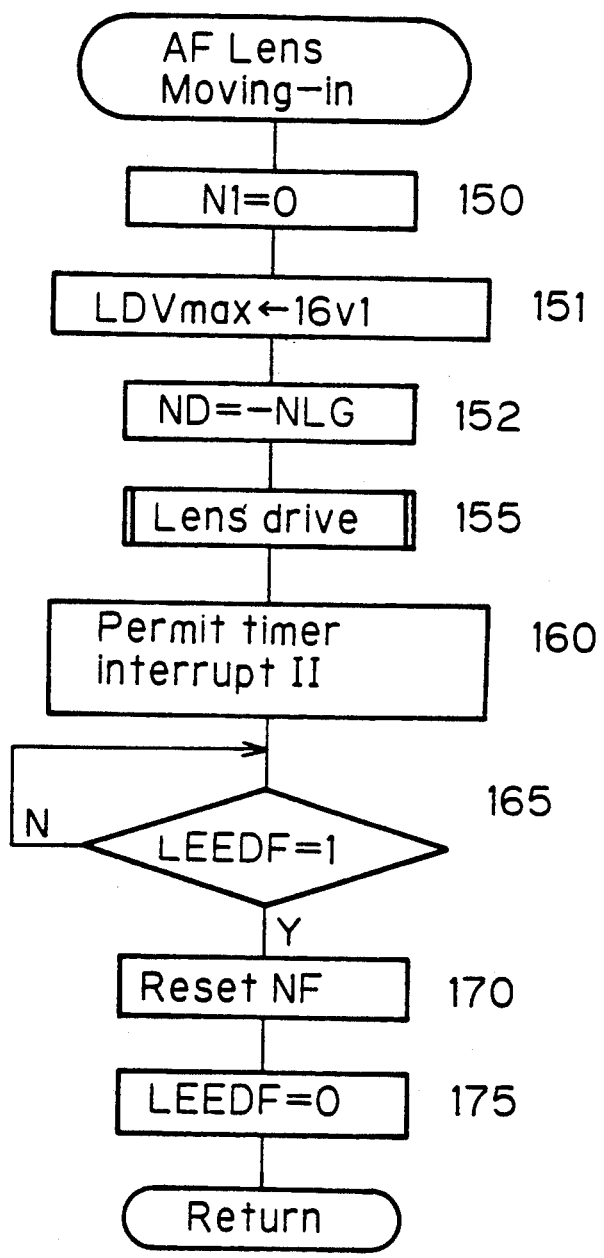
FIG. 6 is a flow chart of an AF lens moving-in subroutine executed by the intra-body microcomputer of the first embodiment of the present invention.

Then, at step #40, an AF lens moving-in subroutine is executed. The subroutine is shown in FIG. 6.

When the AF lens moving-in subroutine is called, first, a counter N1 for indicating a drive amount is set to 0 (step #150), and a speed limit LDVmax is set to 16 V1 (16 times the V1) (step #151). Then, the value of a counter ND for indicating a drive amount of the AF lens for focusing is set to −NLG (a negative value with a high absolute value) (step #152), and a lens drive subroutine for the AF lens is executed (step #155).

Figure 21:
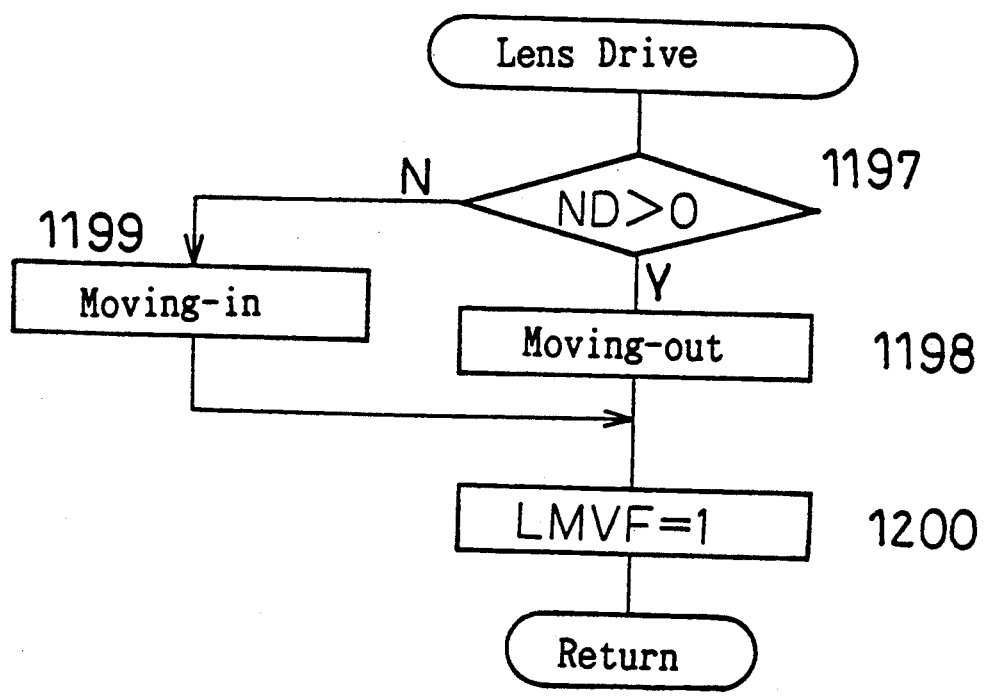
FIG. 21 is a flow chart of a lens drive subroutine executed by the intra-body microcomputer of the first embodiment of the present invention.

The lens drive subroutine is shown in FIG. 21.

When the lens drive subroutine is called, whether the sign of the lens drive amount ND is plus or not (whether the first bit is 1 or not) is determined (step #1197). Determining that the drive direction of the lens is a near direction when the sign is plus and that the drive direction is an infinity direction when the sign is not plus, signals representative of respective directions are outputted to the motor drive circuit MD1 (steps #1198 and #1199). Then, a flag LMVF showing that the lens is being moved is set (step #1200), and the process returns.

In this embodiment, the driving of the AF lens is controlled by a counter interrupt II and a timer interrupt II.

The counter interrupt II is applied when a pulse showing the driving of the AF lens is inputted from the encoder ENC (FIG. 4), while the timer interrupt II is applied when no counter interrupt II is applied within a predetermined period of time after the first counter interrupt II was applied. It is detected by the timer interrupt II that the lens is moved to the end (an infinity position or a nearest position). That is, if the drive amount ND is set to a value with a high absolute value like at step #152 of FIG. 6, the lens is always moved to the end without being stopped on the way, and by the timer interrupt II which is applied thereafter, it is detected that the lens is moved to the end.

Figure 7:
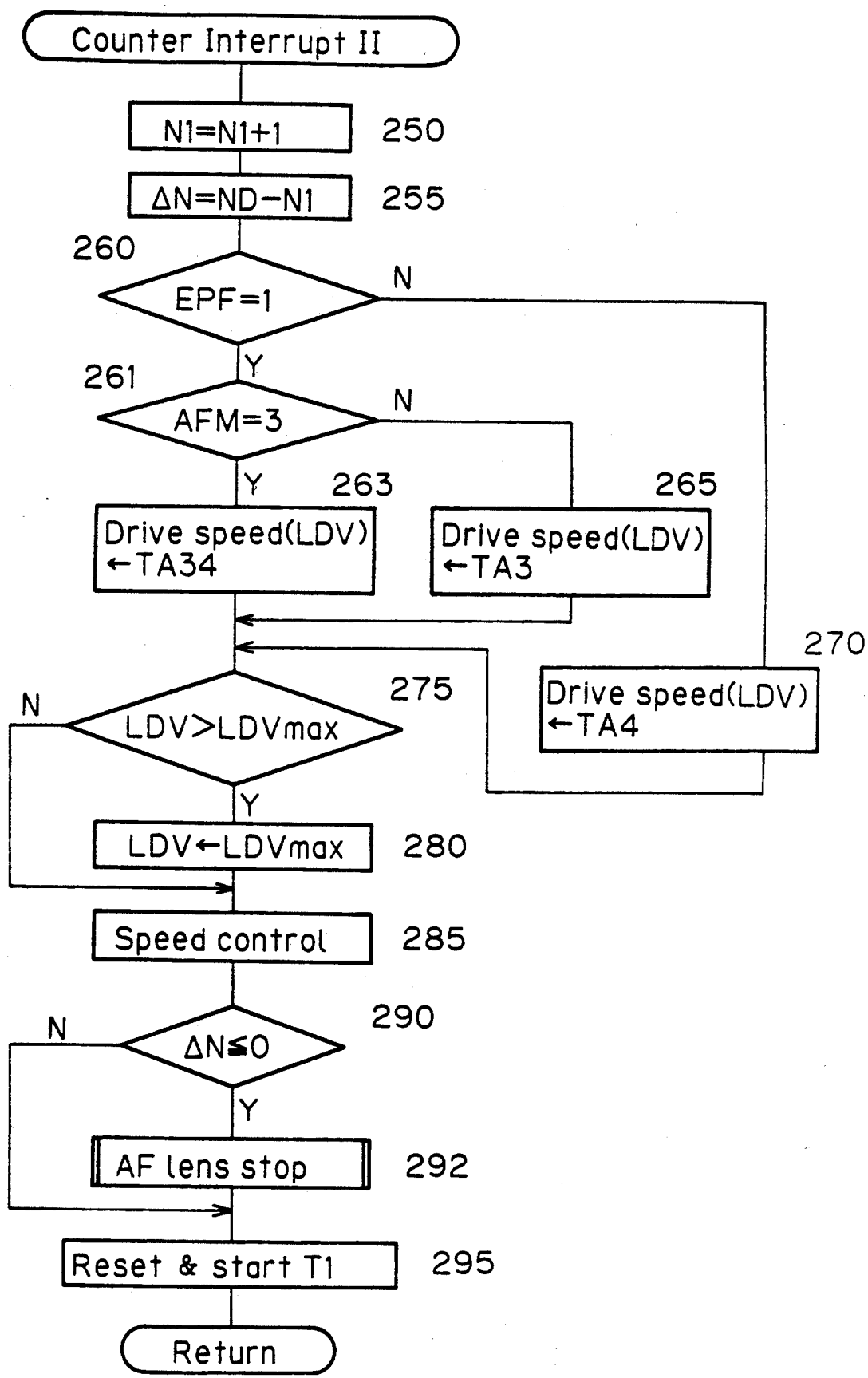
FIG. 7 is a flow chart of a counter interrupt II subroutine executed by the intra-body microcomputer of the first embodiment of the present invention.
Figure 8:
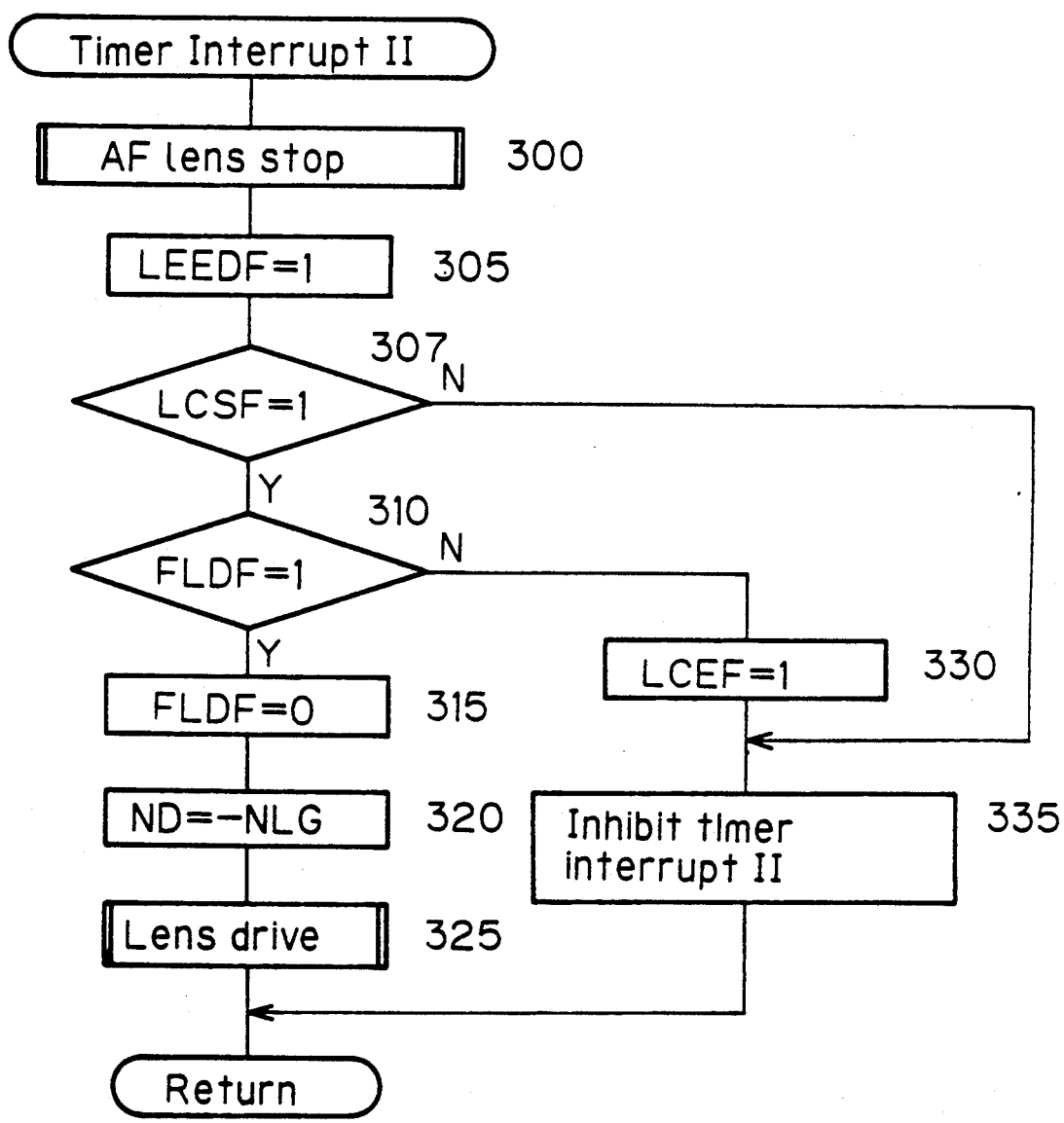
FIG. 8 is a flow chart of a timer interrupt II subroutine executed by the intra-body microcomputer of the first embodiment of the present invention.

The routines of the counter interrupt II and the timer interrupt II are shown in FIGS. 7 and 8, respectively.

First, the routine of the counter interrupt II will be described.

When a pulse is inputted from the encoder ENC, the counter interrupt II is applied, and the routine of the counter interrupt II shown in FIG. 7 is executed.

At step #250, the count value N1 indicating a driven amount (rotation number of the motor) of the AF lens is set to N1+1. At step #255, N1 is subtracted from the drive amount ND to obtain a remaining drive amount (remaining rotation number) ΔN.

At step #260, whether a subsequently-described eye sensing mode is ON or not is determined.

The eye sensing mode is a process which is executed when the eye sensing circuit EPD detects that the user grasps the grip without depressing the release switch halfway (the condition where the release switch S1 is depressed halfway will hereinafter be referred to as "S1ON") and looks through the finder. In this operation, S1ON flows (that is, AF and AE (automatic exposure) flows under the S1ON condition) are executed. In an AF operation of the eye sensing mode, however, the maximum speed of the lens drive is lower than in an AF operation of the S1ON condition. Other operations of the eye sensing mode are also different from those of the S1ON condition.

When the eye sensing mode is ON (EPF=1), whether a moving subject mode is ON (AFM=3) or not is determined (step #261). When the moving subject mode is not ON, an AF lens drive speed LDV is obtained from the driven amount N1 and the remaining drive amount ΔN of the lens according to Table 2 (TA3) (step #265). When the moving subject mode is ON, the AF lens drive speed LDV is obtained from the driven amount N1 and the remaining drive amount ΔN of the lens according to Table 2 (TA34) (step #263). Then, the process proceeds to step #275.

When the eye sensing mode is not ON (EPF=0), the AF lens drive speed LDV is obtained from the driven amount N1 and the remaining drive amount ΔN of the lens according to Table 2 (TA4) (step #270). Then, the process proceeds to step #275.

A starting speed of the lens at the activation is controlled by the driven amount N1. In order to stop the lens, the speed of the lens is controlled by the remaining drive amount ΔN. The speed V1 is set as the reference speed. The AF lens drive speed LDV is represented by a multiple of the speed V1.

Then, at step #275, whether the drive speed LDV is higher than the speed limit LDVmax or not is determined. When it is higher, the drive speed LDV is set as a new speed limit LDVmax (step #280), and the process proceeds to step #285. When it is not higher, the process proceeds directly to step #285.

At step #285, the lens is controlled so as to be moved at the speed LDV which is set at the above-mentioned steps. The method of controlling the speed of the lens will not be described since it is irrelevant to this embodiment.

Then, at step #290, whether or not the remaining drive amount ΔN is 0 or smaller is determined. When it is 0 or smaller, the AF lens is stopped (step #292), an end detecting timer T1 is reset and started (step #295), and the process returns. Otherwise, the process proceeds to step #295 without stopping the AF lens, and returns.

The lens drive speed is lower in the eye sensing mode than in other modes. Moreover, in the eye sensing mode, the lens drive speed is higher when the subject is moving than when the subject is stationary. These will be described later.

Subsequently, the routine of the timer interrupt II will be described.

When the value of the timer T1 which is reset and started in the above-described routine of the counter interrupt II (step #295 of FIG. 7) reaches a predetermined value, the routine of the timer interrupt II shown in FIG. 8 is executed. That is, determining that the AF lens is moved to the end (the infinity position or the nearest position), an AF lens stop subroutine is executed (step #300), and a flag LEEDF showing that the process has passed through the AF lens stop subroutine is set (#305).

Figure 9:
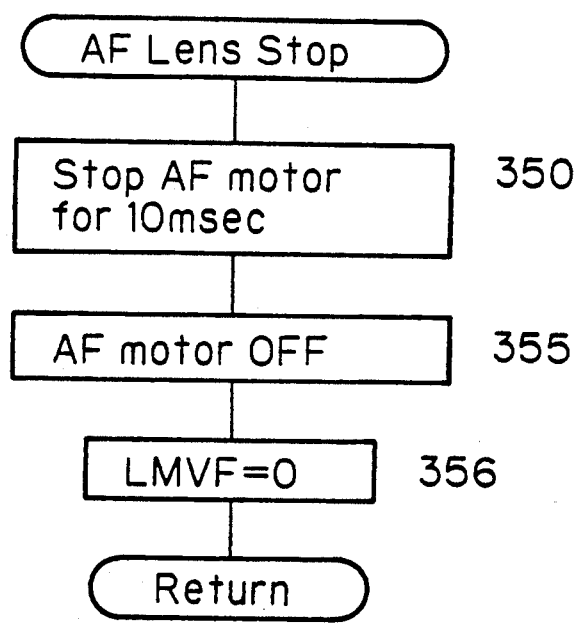
FIG. 9 is a flow chart of an AF lens stop subroutine executed by the intra-body microcomputer of the first embodiment of the present invention.

The AF lens stop subroutine which is called at steps #292 and #300 is shown in FIG. 9.

When the subroutine is called, first, a control signal for shorting both terminals of the AF motor M1 is outputted to the motor drive circuit MD1 for 10 msec in order to stop the AF motor M1 (step #350).

Then, a control signal for disabling the AF motor M1 is outputted to the motor drive circuit MD1 (step #355), and the flag LMVF showing that the lens is being moved is reset (LMVF=0, step #356). Then, the process returns.

Returning to the flow chart of FIG. 8, whether or not a flag LCSF showing a low contrast scanning mode has been set is determined at step #307. The low contrast scanning is to repeat a focus detection (distance measurement) while driving the AF lens when focus detection is impossible because of insufficient contrast. The low contrast scanning mode is a mode where the low contrast scanning is performed.

When the flag LCSF has been set (LCSF=1), that is, when the low contrast mode is ON, the process proceeds to step #310, where whether the lens drive mode is a moving-out mode or not is determined. The moving-out mode is a mode where the AF lens is moved out, while a moving-in mode is a mode where the AF lens is moved in.

When the mode is the moving-out mode (FLDF=1) at step #310, a flag FLDF is reset (FLDF=0) at step #315, and the drive amount ND is set to −NLG at step #320. Then, after a lens drive routine (FIG. 21) is executed at step #325, the process returns.

When the mode is not the moving-out mode (FLDF=0), that is, when the mode is the moving-in mode, determining that focus detection cannot be performed even through both the moving-out operation and the moving-in operation are performed, a flag LCEF is set (LCEF=1) at step #330 in order to show that focus detection is impossible. Then, after the timer interrupt II is inhibited at step #335, the process returns. The inhibition of the timer interrupt II prevents the flow from being executed again after a predetermined process is completed (although the timer is operating).

When the flag LCSF showing the low contrast scanning mode has not been set (LCSF=0), at step #307, the process proceeds to step #335, where the timer interrupt is inhibited. Then, the process returns.

Returning to the flow chart of FIG. 6, when the process returns from the above-described lens drive subroutine (FIG. 21), the timer interrupt 11 is permitted (step #160), and the process waits until the flag LEEDF showing that the lens has been moved to the end is set (LEEDF=1, step #165).

Since the drive amount ND is set to −NLG which is a negative value with a high absolute value at step #152, it never occurs that ΔN becomes 0 due to the counter interrupt II before the lens is moved to the end. Therefore, the lens is never stopped on the way. That is, by setting ND to −NLG, the lens is always moved to the end without being stopped on the way, and the flag LEEDF is set in the interrupt routine for the timer interrupt II which is applied thereafter. When it is detected that the flag LEEDF has been set at step #165, the process proceeds to step #170. Then, determining that the lens has been moved to the infinity position, a counter for counting a moving-out amount NF, of the lens, from the infinity position is reset (step #170), the flag LEEDF is reset (step #175), and the process returns.

Returning to the flow chart of FIG. 5, when the process returns from the above-described AF lens moving-in subroutine (FIG. 6), the process proceeds to step #50, where whether the photographing preparation switch S1 is ON or not is determined.

When the photographing preparation switch S1 is not ON, the process proceeds to step #62, where a subsequently-described eye sensing subroutine is executed. Thereafter, the process proceeds to step #73 to wait until an interrupt is applied.

The eye sensing subroutine and a timer interrupt III relating thereto will be described with reference to FIGS. 10 and 11, respectively.

Figure 10:
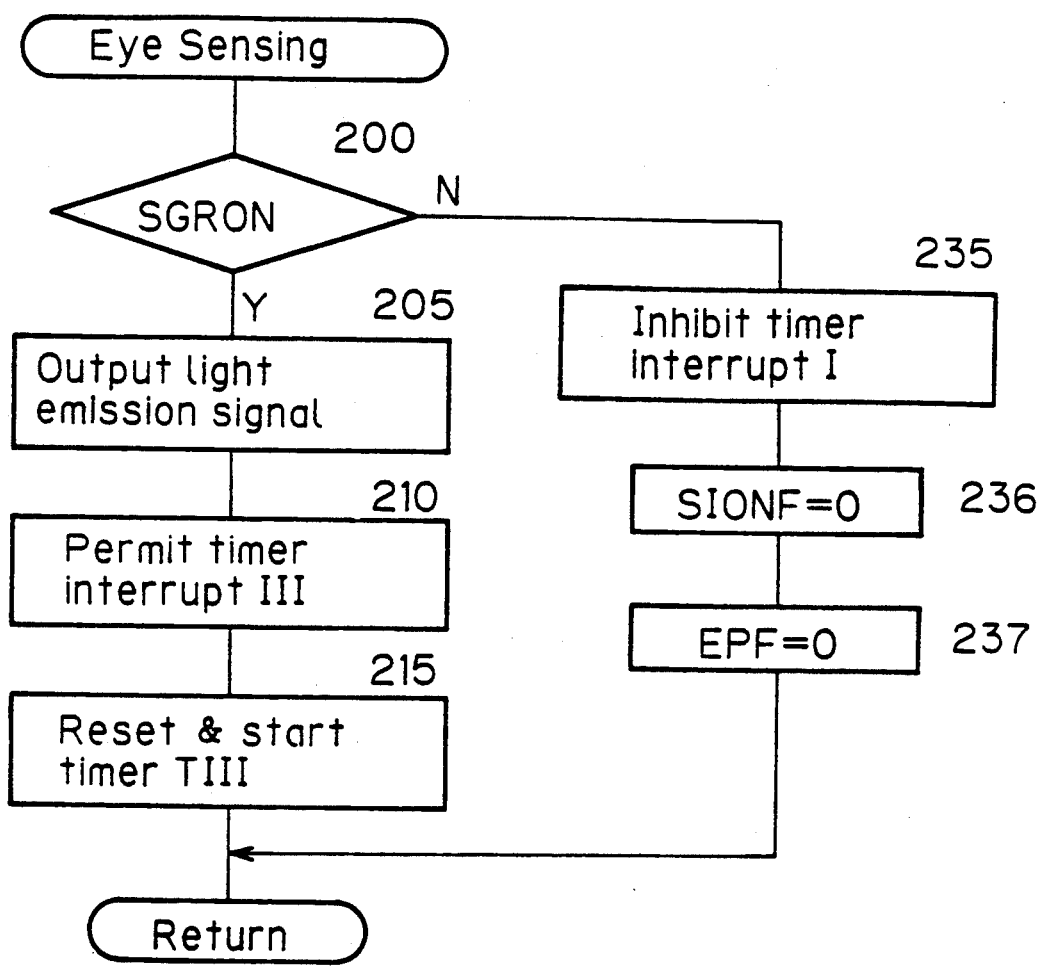
FIG. 10 is a flow chart of an eye sensing subroutine executed by the intra-body microcomputer of the first embodiment of the present invention.

As shown in FIG. 10, when the eye sensing subroutine is called, first, whether the grip switch SGR is ON or not is determined (step #200).

When the grip switch SGR is not ON, a timer interrupt I is inhibited (step #235), a flag S1ONF is reset which is set when the photographing preparation switch S1 is ON or when five minutes have not passed since the turning off of the photographing preparation switch S1 (S1ONF=0, step #236), a flag EPF showing that the eye sensing mode is reset (EPF=0, step #237), and the process returns.

When the grip switch SGR is ON, a signal representative of the start of light emission is outputted to the eye sensing detecting circuit EPD (step #205). Thereby, the eye sensing detecting circuit EPD emits an infrared ray through the LED 20. Thereafter, the timer interrupt III of a timer TIII which waits 50 msec until an infrared ray detecting circuit is stabilized is permitted (step #210). Then, the timer TIII is reset and started (step #215), and the process returns.

Figure 11:
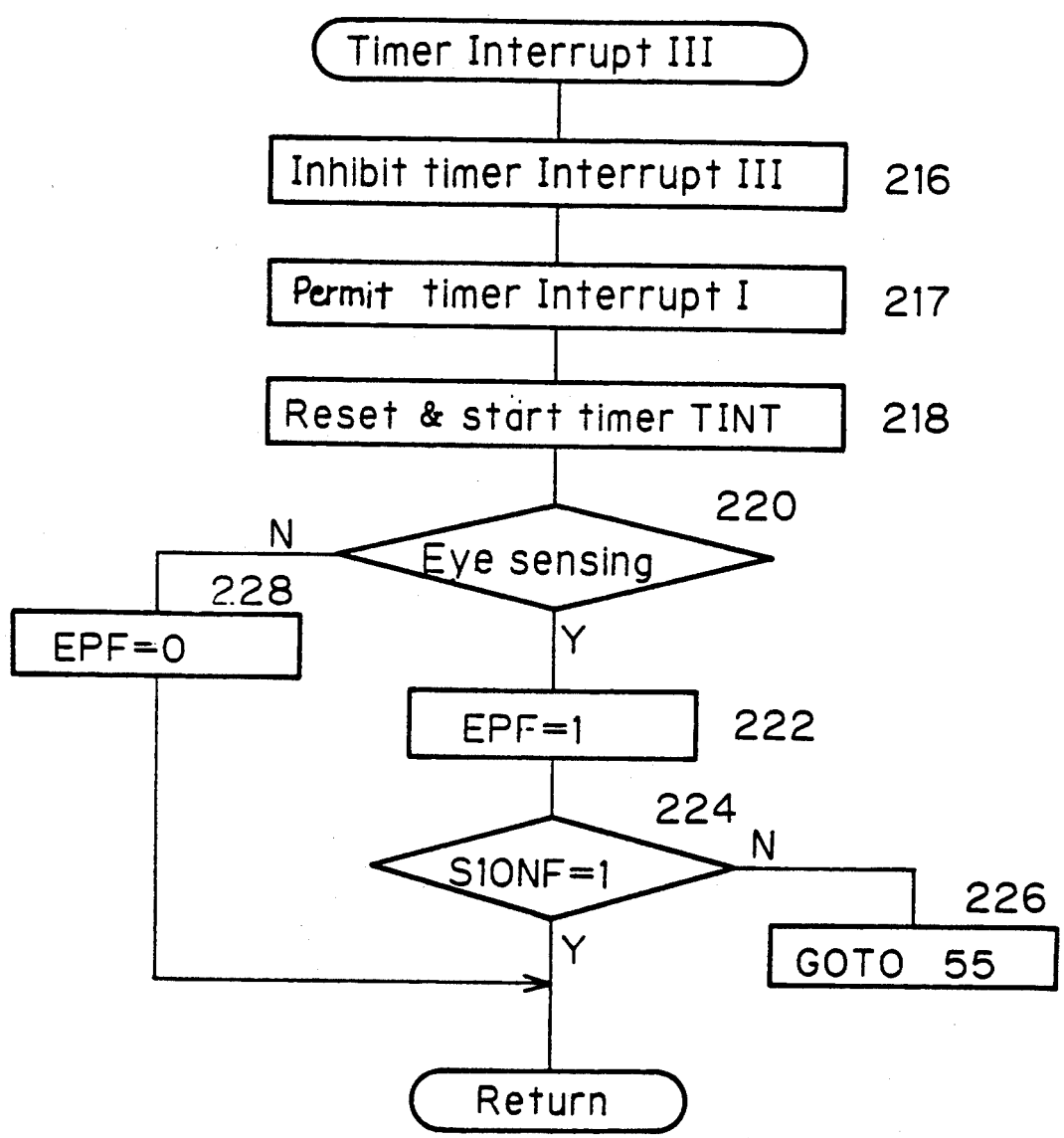
FIG. 11 is a flow chart of a timer interrupt III relating to the eye sensing subroutine executed by the intra-body microcomputer of the first embodiment of the present invention.

When 50 msec have passed, the timer interrupt III shown in FIG. 11 is executed.

First, at step #216, the timer interrupt III is inhibited. At step #217, the timer interrupt I for eye sensing is permitted. At step #218, a timer TINT for the timer interrupt I is reset and started.

Then, at step #220, whether or not it has been sensed that the user is looking through the finder is determined based on a sensing signal which is inputted from the eye sensing detecting circuit EPD.

When it is sensed that the user is looking through the finder, the flag EPF showing it is set (EPF=1) at step #222, and at step #224, whether or not the flag S1ONF showing that the S1ON subroutine is being executed has been set is determined. When it has been set, the process returns. When it has not been set, the process proceeds to step #55 (FIG. 5) in order to execute the S1ON subroutine (step #226).

When it is not sensed that the user is looking through the finder at step #220, the flag EPF showing that it is sensed that the user has been looking through the finder is reset (EPF=0) at step #228, and the process returns.

Figure 12:
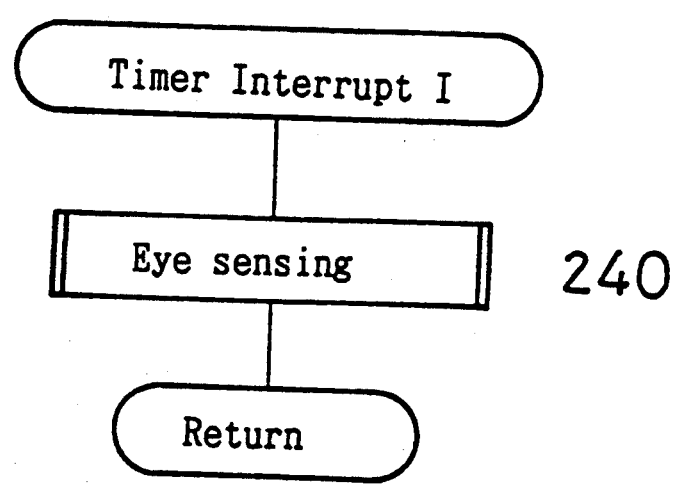
FIG. 12 is a flow chart of a timer interrupt I subroutine executed by the intra-body microcomputer of the first embodiment of the present invention.

The timer interrupt I is applied every 250 msec. When the interrupt is applied, after the eye sensing subroutine (FIG. 10) is executed at step #240 as shown in FIG. 12, the process returns.

Returning to the flow chart of FIG. 5, a case where it is determined that the photographing preparation switch S1 is ON at step #50 will be described.

In this case, the process proceeds to step #55 to execute the S1ON subroutine. Then, at step #60, whether or not the flag S1ONF which is set when the photographing preparation switch S1 is ON or when five minutes have not passed since the turning off of the photographing preparation switch S1 has been set or not is determined.

When the flag S1ONF has been set (S1ONF=1), the process returns to step #55, and the S1ON subroutine is repeated until the flag S1ON is reset.

When the flag S1ONF has not been set (S1ON=0), the process proceeds to step #65, where the level of the power control terminal PW1 is set to low in order to disable the power supply transistor Tr1. Then, at step #70, the level of the power control terminal PW0 is set to low in order to stop the operation of the DC/DC converter DD, and at step #73, the process waits until an interrupt is applied.

When the grip switch SGR or the photographing preparation switch S1 is turned from off to on, an interrupt S1INT is applied, and the process starts from step #50.

Figure 13:
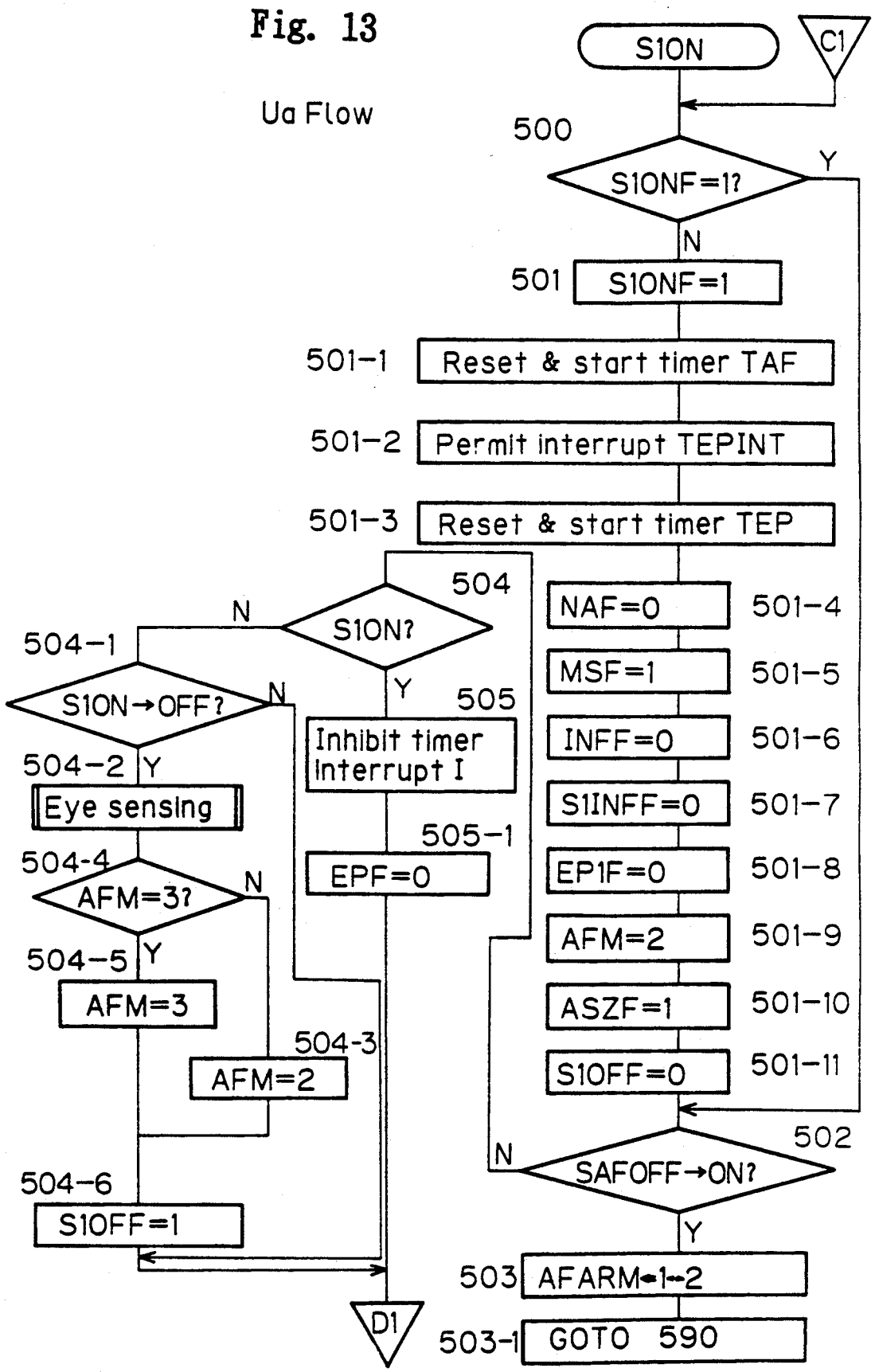
FIG. 13 is flow chart of a Ua flow of an S1ON subroutine executed by the intra-body microcomputer of the first embodiment of the present invention.
Figure 14:
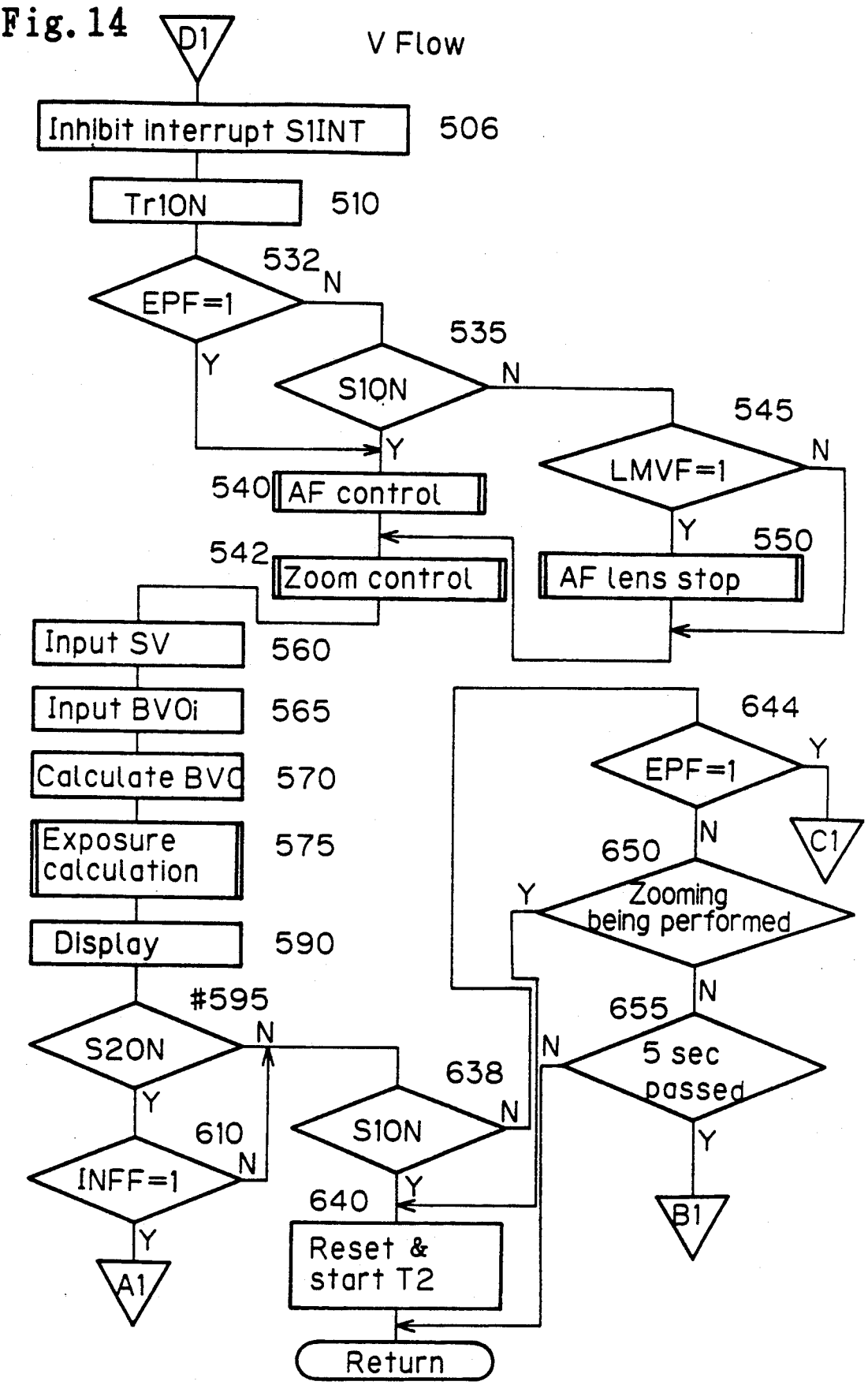
FIG. 14 is flow chart of a V flow of the S1ON subroutine executed by the intra-body microcomputer of the first embodiment of the present invention.
Figure 15:
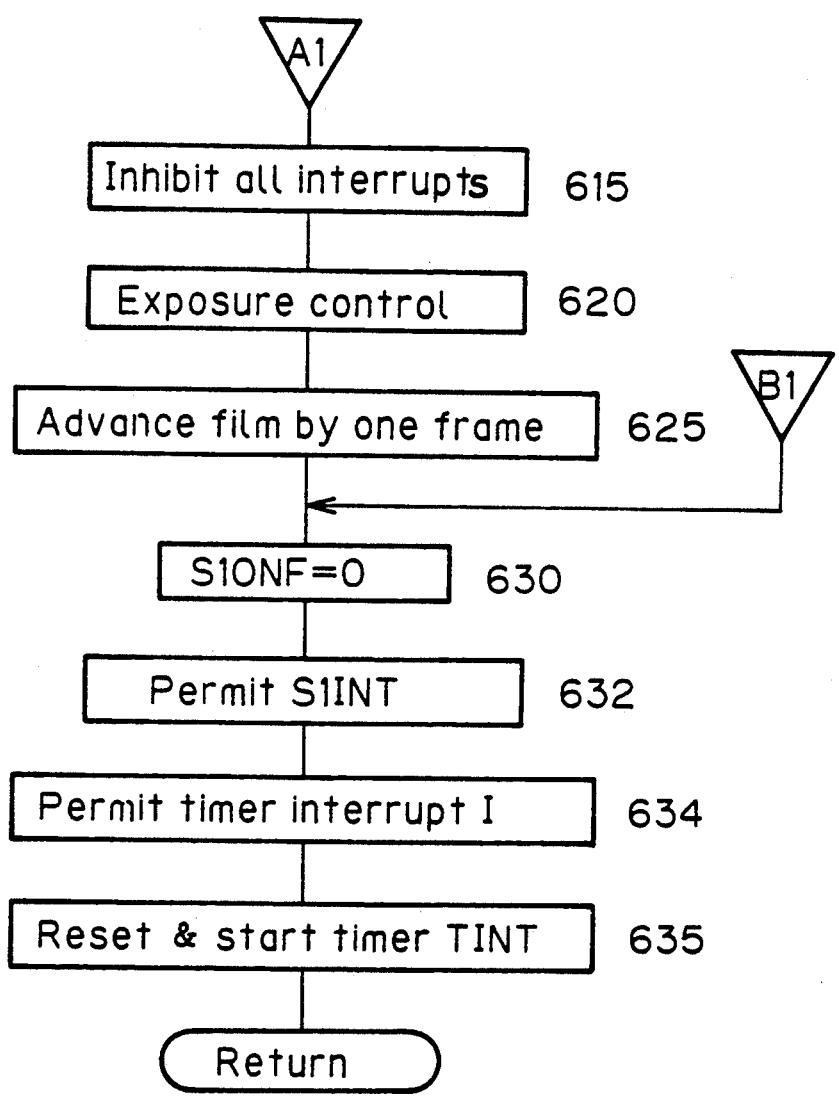
FIG. 15 is flow chart of a W flow of the S1ON subroutine executed by the intra-body microcomputer of the first embodiment of the present invention.

The above-mentioned S1ON subroutine is shown in FIGS. 13 to 15. The S1ON subroutine consists of a Ua flow (FIG. 13), a V flow (FIG. 14) and a W flow (FIG. 15).

When the subroutine is called, first, whether or not the flag S1ONF showing that the S1ON subroutine has been executed is determined (step #500).

When the flag S1ON has not been set (S1ONF=0), the flag S1ON is set (S1ONF=1) at step #501. Then, a timer TAF for an AF operation is reset and started (step #501-1), an interrupt TEPINT for detecting a blur is permitted (step #501-2), a timer TEP for the interrupt TEPINT is reset and started (step #501-3), a variable NAF for counting the number of times of focus detection is reset (NAF=0, step #501-4), and a flag MSF showing that a main subject determination mode (see the subroutine of FIG. 35) is executed is set (MSF=1, step #501-5).

Then, a flag INFF showing that the in-focus condition has been obtained is reset (INFF=0, step #501-6), a flag S1INFF showing that the in-focus condition has been obtained after the photographing preparation switch S1 was turned on is reset (S1INFF=0, step #501-7), and a flag EPLF showing a first-time lens drive in the eye sensing mode is reset (EP1F=0, step #501-8).

Then, an AF mode is set to "2" which represents the indetermination mode (AFM=2, step #501-9), and a flag ASZF for performing a subsequently-described auto stand-by zoom is set (ASZF=1, step #501-10). Then, after a flag S1OFF showing that the switch S1 has been turned from on to off is reset (S1OFF=0, step #501-11), the process proceeds to step #502. When the S1ONF has been set at step #500, the process proceeds directly to step #502.

In the AF mode (see a moving subject determination routine of FIG. 37), AFM=1 represents an AF lock (the subject is stationary), AFM=2 represents that whether the subject is stationary or moving is indeterminate, and AFM=3 represents the subject is moving.

At step #502, whether or not the AF area changing switch SAF has been turned from off to on is determined.

When it has been turned from off to on, the AF area is alternately changed over between "wide" (mode 1: AFARM=1) and "spot" (mode 2: AFARM=2) (step #503). Then, the process proceeds to step #590 to control a display (step #503-1).

When the AF area changing switch SAF has not been turned from off to on, the process proceeds to step #504.

At step #504, whether the photographing preparation switch S1 is ON or not is determined.

When the switch S1 is ON, the timer interrupt I is inhibited at step #503, the flag EPF showing that it has been sensed that the user is looking through the finder is reset (EPF=0) at step #505-1. Then, the process proceeds to step #506 of the V flow (FIG. 14).

When the switch S1 is not ON, whether the switch S1 has been turned from on to off is determined at step #504-1.

When the switch S1 has been turned from on to off, the process proceeds to step #504-2, where the eye sensing is performed. Thereafter, the AF mode when the switch S1 is turned on is determined (step #504-4). When the AF mode is the moving subject mode, AFM is maintained AFM=3 to continue the moving subject mode (step #504-5). When the AF mode is not the moving subject mode, at step #504-3, the AF mode is set to "2" which represents the indetermination mode (AFM=2) in order to reset the AF mode which is set under the S1ON condition. Then, after the flag S1OFF showing that the switch S1 has been turned from on to off is set (step #504-6), the process proceeds to step #506.

When the switch S1 has not been turned from on to off (that is, the switch S1 is currently OFF), the process proceeds directly to step #506.

At step #506, the interrupt S1INT is inhibited. Thereafter, at step #510, the level of the power terminal PW1 is set to high in order to enable the power supply transistor Tr1.

Then, at step #532, whether or not the flag EPF showing that the user is looking through the finder has been set is determined.

When the flag EPF has been set (EPF=1), the process proceeds to step #540, where a subroutine for AF control is executed.

When the flag EPF has not been set (EPF=0), whether the photographing preparation switch S1 is ON or not is determined at step #535.

When the photographing preparation switch S1 is ON, the process proceeds to step #540, where the AF control subroutine (controlling of an automatic focusing operation) is executed. Thereafter, the process proceeds to step #542, where a zoom control subroutine is executed. A case where the photographing preparation switch S1 is not ON will be described later.

Subsequently, AF control and display (area display within an image plane and in-focus display) will be described.

First, an arrangement relating to AF and display will be described with reference to the block diagram of FIG. 16.

In the figure, a light beam which is incident through a taking lens 9 is reflected by a finder mirror 4. Then, after being incident on a pentaprism 1 through a focusing screen 3 and a transmission type liquid crystal display (LCD) 2, the light beam passes through a finder lens 18 to be incident on the eye of the user as an image.

Of the light beams which are incident on the finder mirror 4, a part of light beams which is required for focus detection passes through the mirror 4 and is incident on a focus detecting portion 8 by a sub mirror 5. A focus detecting portion 8 is provided with an optical system which is required for focus detection, and includes a sensor and a data outputting portion. A data which is outputted from the focus detecting portion 8 is inputted to a control circuit 7. Based on the inputted data, the control circuit 7 outputs data for controlling a focus detecting sensor, a sequence and an LCD drive circuit 6. The LCD drive circuit 6 controls the transmission type LCD 2 based on the control data outputted from the control circuit 7 to provide various liquid crystal displays.

Figure 16:
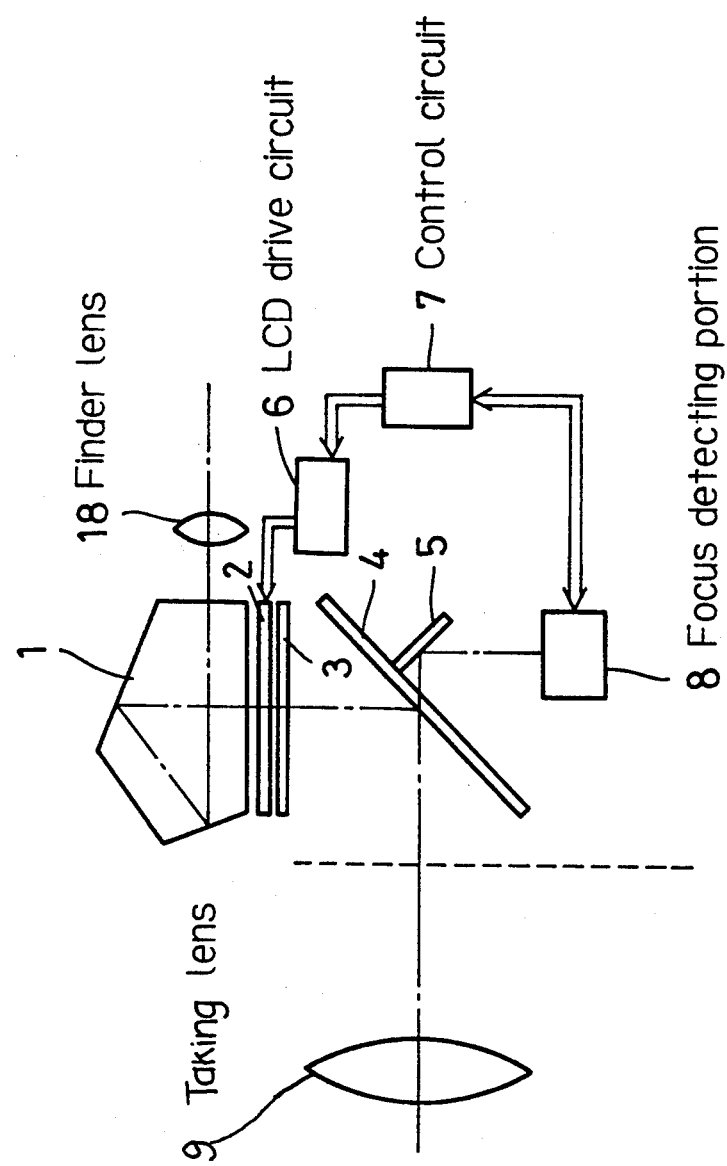
FIG. 16 is a block diagram showing a main arrangement relating to AF and display of the first embodiment of the present invention.
Figure 17:
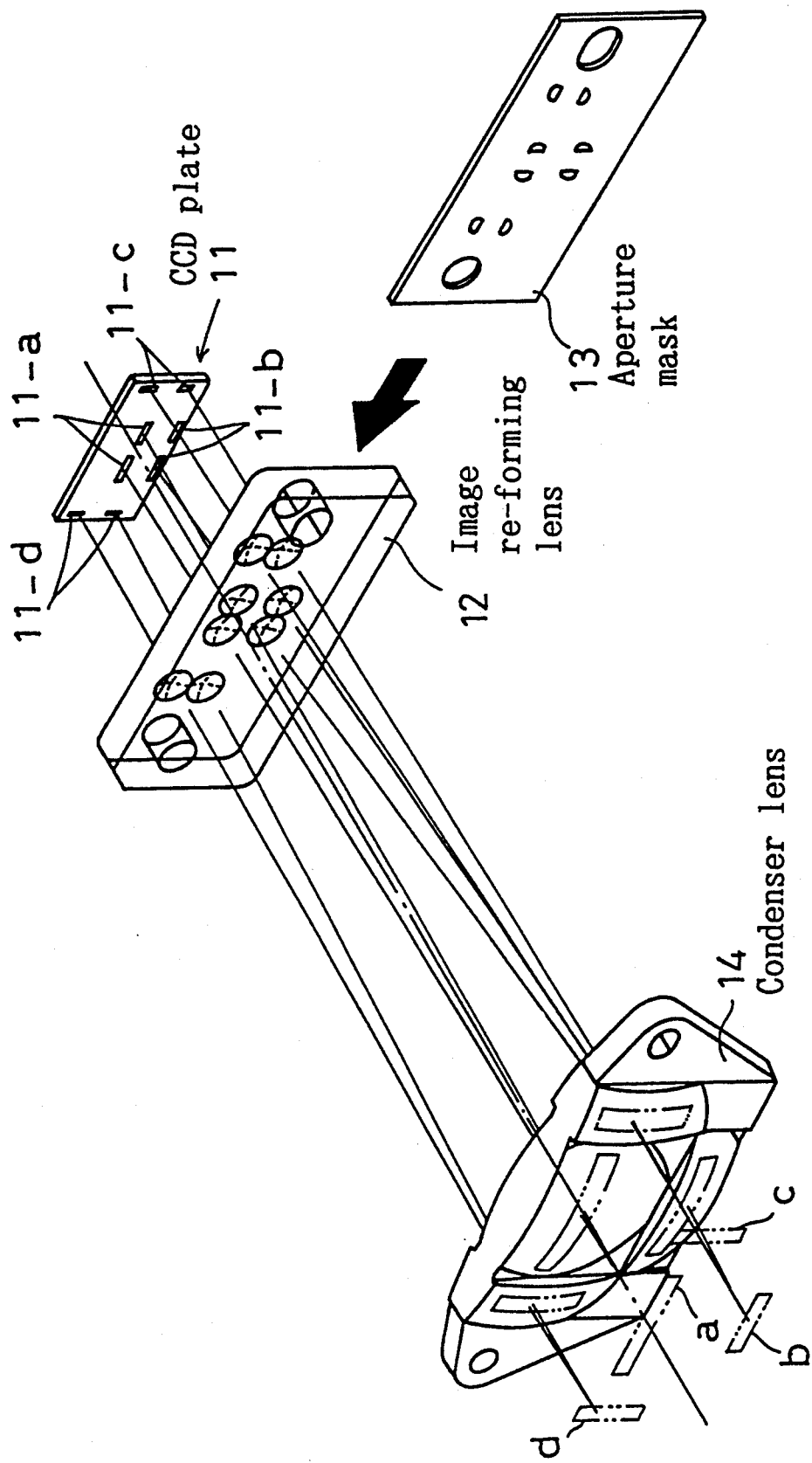
FIG. 17 shows a specific arrangement of a focus detecting portion of the first embodiment of the present invention.

FIG. 17 shows a specific arrangement of the focus detecting portion of FIG. 16.

In the figure, a light beams reflected by the sub mirror 5 of FIG. 16 is divided into four luminous fluxes by an image re-forming lens 12 through a condenser lens 14. The luminous fluxes are formed into images on a CCD plate 11.

In this embodiment, the conventionally-known phase difference detecting method is employed as an AF method. An aperture mask 13 is set so as to overlap the image re-forming lens 12. Unnecessary light beams coming from the condenser lens 14 are cut by openings of the aperture mask 13. On the CCD plate 11, line sensor pairs 11-a, 11-b, 11-c and 11-d are formed in correspondence with subsequently-described four focus detection (distance measurement) areas a, b, c and d.

Figure 18:
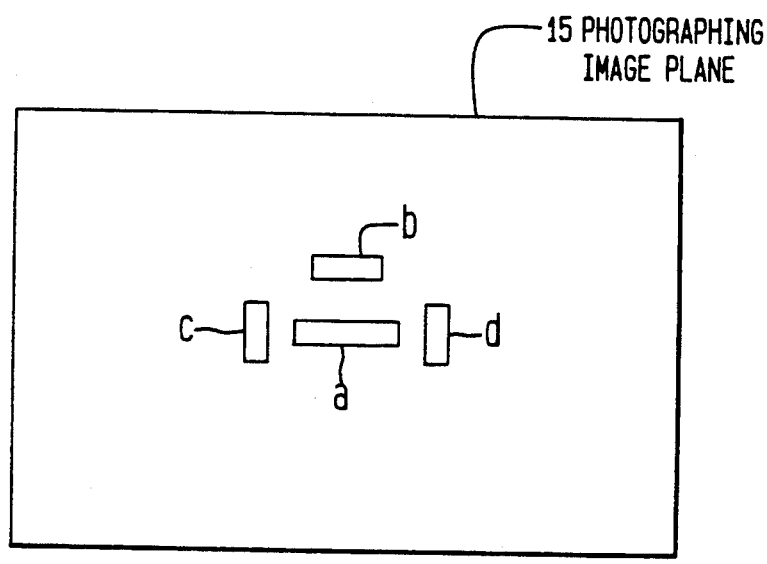
FIG. 18 shows a condition of a photographing image plane of the first embodiment of the present invention.

FIG. 18 shows a condition of a photographing image plane of a camera of this embodiment.

In the figure, the distance measurement areas a, b, c and d respectively corresponding to the line sensors 11-a, 11-b, 11-c and 11-d which are formed on the CCD plate 11 of FIG. 17 are shown within the photographing image plane 15.

Figure 19:
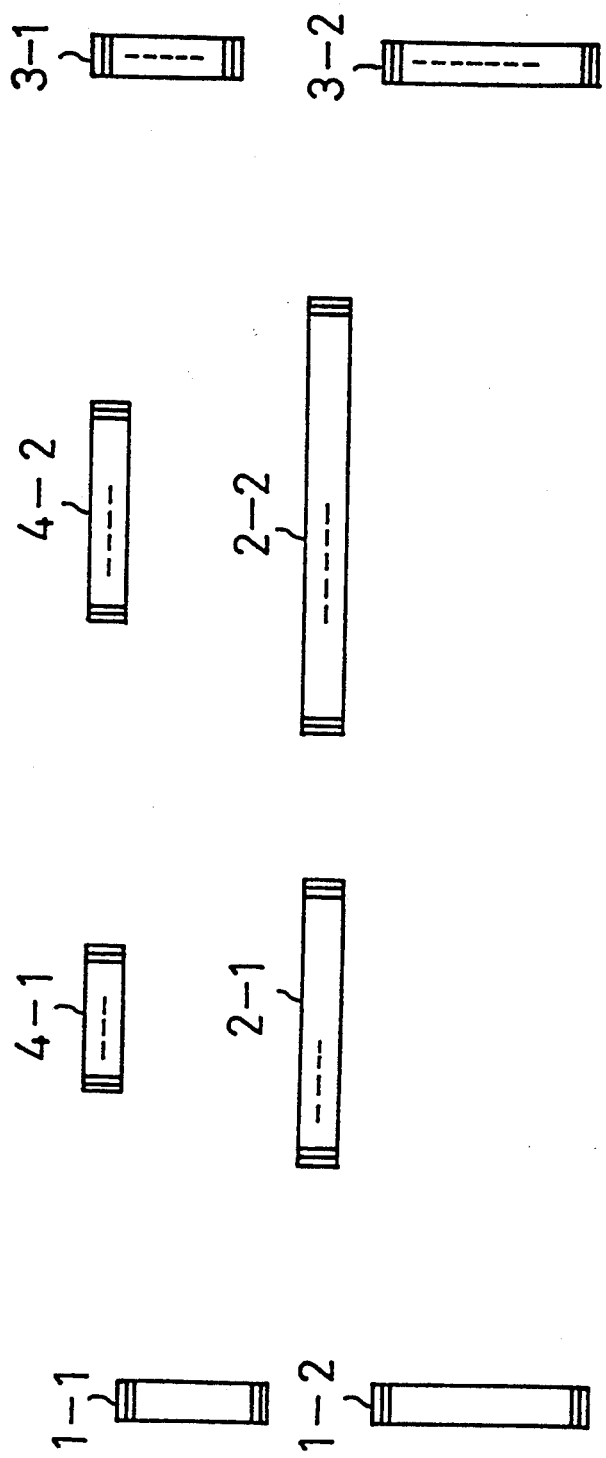
FIG. 19 shows a specific arrangement of line sensors provided on a CCD plate employed for the first embodiment of the present invention.

FIG. 19 shows a specific arrangement of the line sensors 11-a to 11-d of the CCD plate 11 shown in FIG. 17.

In the figure, 1-1, 2-1, 3-1 and 4-1 are reference portions, while 1-2, 2-2, 3-2 and 4-2 are comparison portions. The reference portions 1-1, 2-1, 3-1 and 4-1 associate with the comparison portions 1-2, 2-2, 3-2 and 4-2, respectively. Focus detection is performed by comparing an image of the reference portion with an image of the comparison portion while shifting the image of the reference portion.

Figure 20:
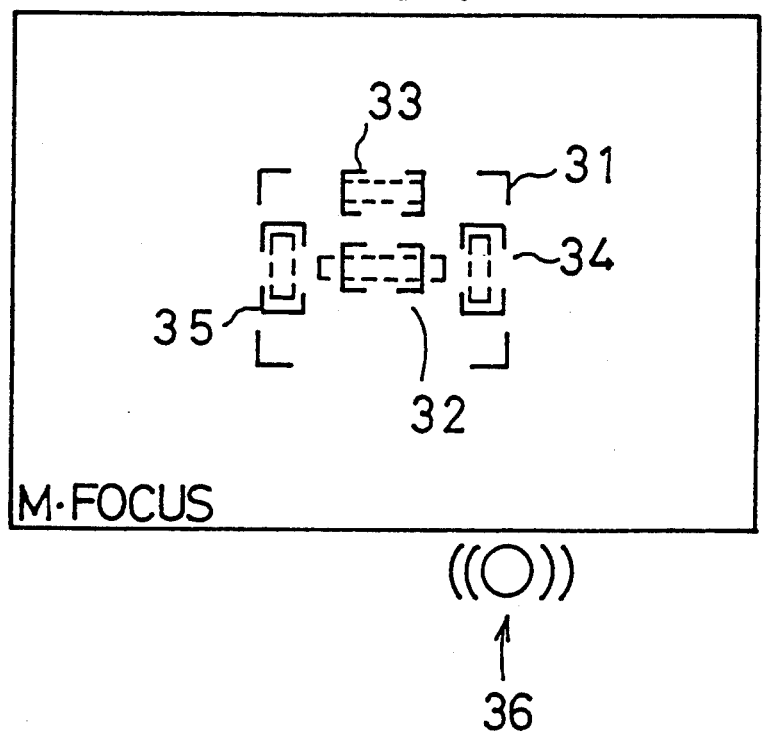
FIG. 20 shows finder displays of the first embodiment of the present invention.

FIG. 20 shows all the finder displays.

In the figure, a display 31 is a distance measurement frame under a wide condition (mode I), while a display 32 is a distance measurement frame under a spot condition (mode II). Dotted lines show portions corresponding to the distance measurement areas of FIG. 18, and are not practically displayed in the finder. Displays 32 to 35 are provided when a subject viewed through each distance measurement frame is located within a depth of field during an MF operation. A display 36 is turned on, off and blinks to show that the subject is in-focus, that the subject is out of focus, that the subject is moving, and that focus detection is impossible.

As described above, various display functions are provided in the finder. Thereby, the user can correctly understand the photographing condition, and the camera becomes more convenient.

Figure 23:
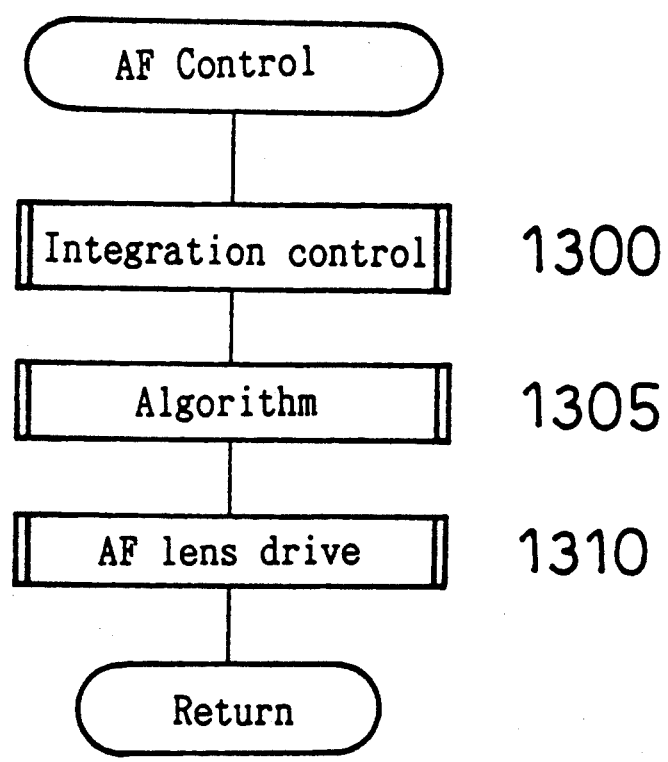
FIG. 23 is a flow chart of an AF control subroutine executed by the intra-body microcomputer of the first embodiment of the present invention.

The previously-mentioned AF control subroutine is shown in FIG. 23.

The AF control consists of three operations: integration control (step #1300); an algorithm for calculating a defocus amount based on a CCD data obtained after the integration is completed and for determining whether a subject is moving or stationary (step #1305); and AF lens drive which is based on the defocus amount obtained as a result of the algorithm (step #1310).

The above three will subsequently be described.

Figure 24:
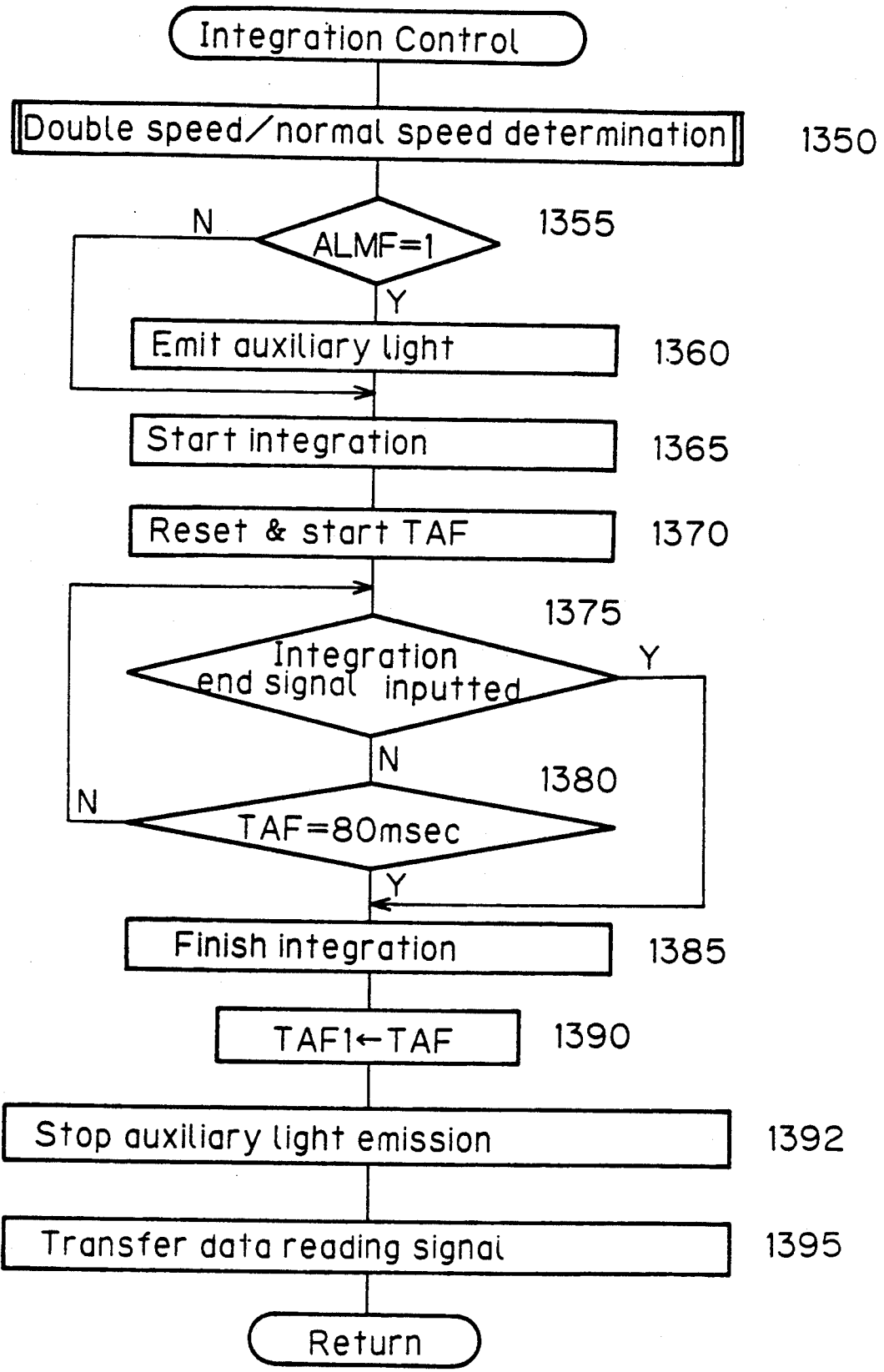
FIG. 24 is a flow chart of an integration control subroutine executed by the intra-body microcomputer of the first embodiment of the present invention.

A flow for the integration control is shown in FIG. 24.

First, at step #1350, double speed/normal speed determination is made. Now, the double speed/normal speed will hereinafter be described.

Figure 25:
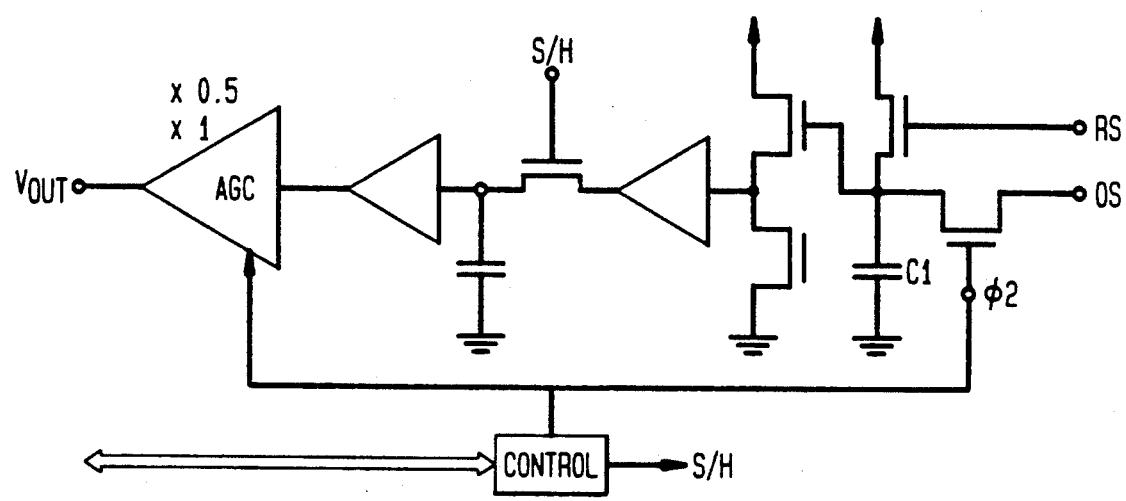
FIG. 25 is a circuit diagram of a circuit, for executing an AF process in a double speed mode by the intra-body microcomputer of the first embodiment of the present invention.
Figure 26:
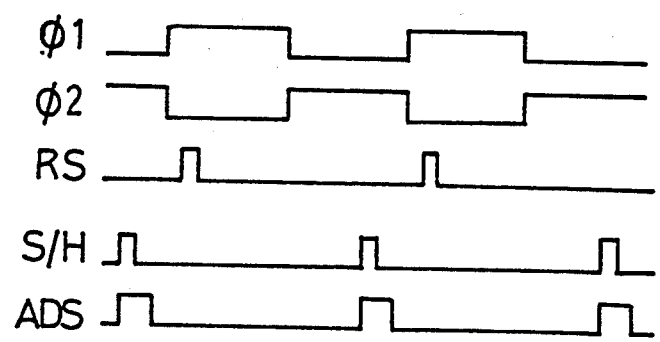
FIG. 26 is a timing chart in a normal speed mode of the first embodiment of the present invention.
Figure 27:
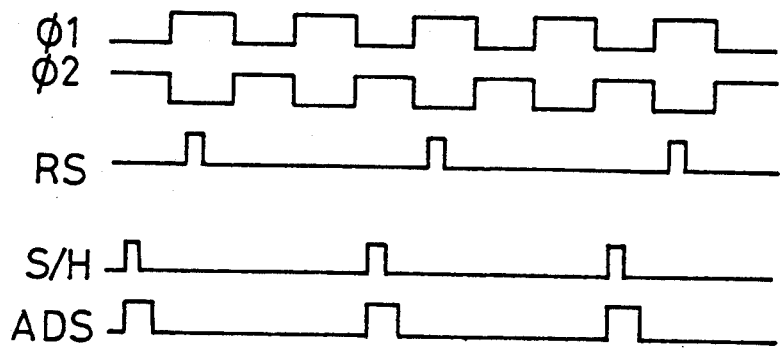
FIG. 27 is a timing chart in the double speed mode of the first embodiment of the present invention.

When a high-speed AF process is required, an AF system where data dump requires a long time is inappropriate. For this reason, with respect to an output (OS terminal) from the CCD of FIG. 25, the speed of each of transfer clocks $\phi 1$ and $\phi 2$ is increased, as shown in FIG. 27, to a speed double the normal speed (FIG. 26), and a shift gate signal S/H is outputted every time two dots of image are outputted. Therefore, a data on two dots of image is added as a data on one dot of image in a hardware manner and outputted, and an AGC (auto gain control) is caused to halve the doubled output of the CCD. Thereby, the data becomes apparently equivalent to the data on the half number of dots of image, so that the data dump time is reduced to half the normal time. A double speed mode is a mode where the above-described operation is performed.

RS is a reset terminal for resetting the capacitor C1. ADS of FIGS. 26 and 27 shows timing of A/D conversion by an A/D converter which is not shown.

The above control (control of the clocks $\phi 1$ and $\phi 2$, the signal S/H and an amplifier) is performed by a signal from the intra-body microcomputer $\mu$C1.

Figure 28:
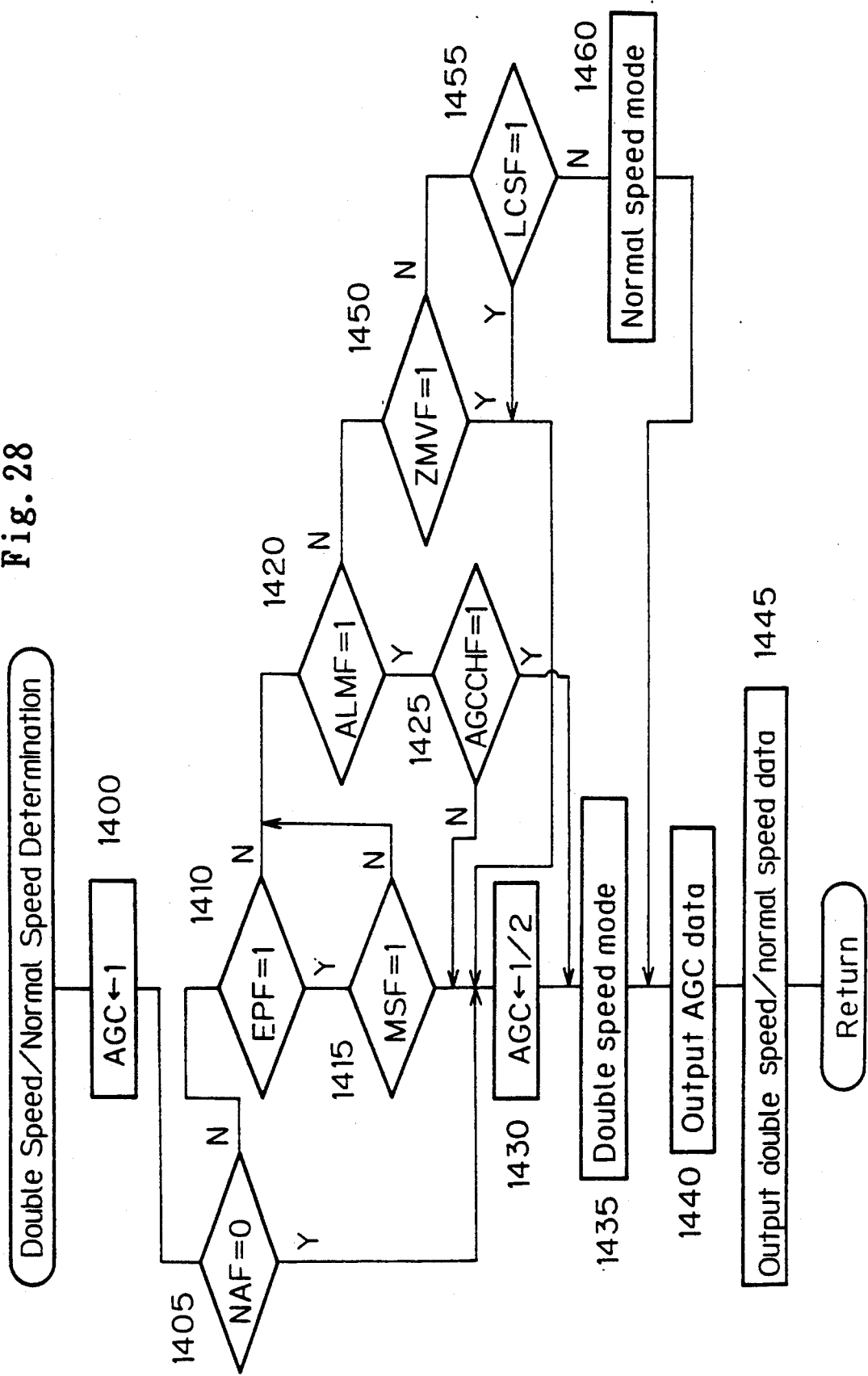
FIG. 28 is a flow chart of a double speed/normal speed determination subroutine executed by the intra-body microcomputer of the first embodiment of the present invention.

A double speed/normal speed determination subroutine shown in FIG. 28 will be described.

First, at step #1400, the AGC is set to 1. At step #1405, whether the current AF operation is a first-time AF operation or not is determined.

When it is a first-time AF operation (NAF=0), since a high-speed AF process is more required than data accuracy, the process proceeds step #1430 to set the double speed mode. The AGC is reduced to $\frac{1}{2}$ at step #1430, the double speed mode (clock) is set at step #1435, and an AGC data and double speed/normal speed data are outputted (steps #1440 and #1445). Then, the process returns.

When the current AF operation is not a first-time AF operation (NAF$\neq$0), the process proceeds to step #1410, where the eye sensing mode is ON or not is determined (step #1410).

When the eye sensing mode is ON (EPF=1), whether the main subject determination mode is ON or not is determined at step #1415. When the main subject determination mode is ON (MSF=1), the process proceeds to step #1430 to set the double speed mode. The reasons why the double mode is set are that a high-speed AF process is also more required than AF accuracy in the main subject determination mode and that focusing is finally performed in a normal speed mode.

When the eye sensing mode is not ON (EPF=0) at step #1410, or when the main subject determination mode is not ON (MSF=0) at step #1415, the process proceeds to step #1420, where whether the auxiliary light mode is ON or not is determined.

When the auxiliary light mode is ON (ALMF=1), whether a changeover of the AGC is necessary or not is determined at step #1425.

When a changeover of the AGC is not necessary (AGCCHF=0), the process proceeds to step #1430 to set the normal double speed mode. When a changeover of the AGC is necessary (AGCCHF=1), the process proceeds to step #1435 while the AGC is maintained intact. The reason why the double speed mode is set in the auxiliary light mode is that the double speed mode where outputs of two devices are added is advantageous to the low-frequency subjects. It should be noted that the auxiliary light mode is set when many of the subjects are of low contrast, and many of the low-contrast subjects are of low-frequency with respect to an image signal thereof. When the AGC is set to "1" (AGCCHF=1), the processing capability for a low-contrast subject is improved by setting the AGC not to $\frac{1}{2}$ but to 1 when a subject is dark and an output of the CCD is small under a condition where the integration time is limited to 80 msec.

When the auxiliary light mode is not ON at step #1420 (ALMF$\neq$1), the process proceeds to step #1450, where whether zooming is being performed or not is determined.

When zooming is being performed (ZMVF=1), the process proceeds to step #1430 to set the double speed mode in order to increase the speed of AF process.

The reason why the speed of AF process is increased during zooming is that the size of a subject image is varied on an image plane (film surface). That is, the double speed mode is set in order to swiftly follow the variation of the subject image size. Moreover, in a case where a varifocal lens is employed, the reason why the speed is increased is that a high-speed process is required since an image is shifted along the optical axis.

When zooming is not being performed (ZMFV$\neq$1) at step #1450, the process proceeds to step #1455, where the low contrast scanning is being performed or not is determined.

When the low contrast scanning is being performed (LCSF=1), a high-speed process is required since an image is varied during integration by performing focus detection while moving the lens. Therefore, the process proceeds to step #1430 to set the double speed mode.

When the low contrast scanning is not being performed (LCSF$\neq$1), the normal speed mode is set at step #1460. The AGC data and the double speed or normal speed data are outputted (steps #1440 and #1445). Then, the process returns.

Returning to the integration control flow of FIG. 24, when the double speed/normal speed determination routine has been completed at step #1350, whether the auxiliary light mode is ON or not is determined at step #1355.

When the auxiliary light mode is ON (ALMF=1), the auxiliary light emission signal is transferred to the auxiliary light emitting circuit AUXLE to emit auxiliary light (step #1360). Then, the process proceeds to step #1365.

When the auxiliary light mode is not ON (ALMF$\neq$1), the process proceeds directly to step #1365.

At step #1365, an integration starting signal is outputted to the AF circuit AFCT to start integration. Then, at step #1370, a subsequently-described timer TAF which is used in an AF operation is reset and started. Then, whether an integration completion signal is inputted from the AF circuit AFCT or not is determined at step #1375. And whether the integration time is 80 msec or not (TAF=80 msec) are determined at step #1380. On detecting any of them, the intra-body microcomputer $\mu$C1 outputs the integration completion signal to the AF circuit AFCT to finish the integration (step #1385).

Then, at step #1390, the value of the timer TAF is stored as TAF1. At step #1392, the emission of auxiliary light is stopped. At step #1395, a data reading signal is transferred to an integration circuit and the data is inputted into the intra-body microcomputer μC1.

Various methods of controlling integration are available. In this embodiment, however, the description thereof will be omitted since they are irrelevant to the present invention.

Returning to FIG. 23, when the integration control of step #1300 is completed, an algorithm routine of step #1305 is executed. A flow of the algorithm shown in FIG. 29 will be described.

First, a defocus amount is calculated based on an inputted CCD data (step #1450), and whether the eye sensing mode is ON or not is determined (#1455).

When the eye sensing mode is ON (EPF=1), whether focus detection is impossible or not is determined at step #1460.

When focus detection is not impossible (LCF=0) a main subject determination subroutine for determining whether a main subject has been found or not and a moving subject determination routine for determining whether the subject is moving or not are executed (steps #1465 and #1470). Then, the process returns.

When focus detection is impossible (LCF=1), determining that no detection results are obtained so that the above two determinations cannot be made, the process returns.

When the eye sensing mode is not ON (EPF=0) at step #1455, whether the in-focus condition has been obtained or not is determined at step #1475.

When the in-focus condition has not been obtained (S1INFF=0), the process returns to move the lens for focusing.

When the in-focus condition has been obtained (S1INFF=1), a one-shot/continuous changeover routine for performing a one-shot operation when the subject is stationary and a continuous operation when the subject is moving is executed by use of an algorithm for determining whether the subject is moving or stationary according to the condition of the subject. Then, the process returns (step #1480).

Of the above-mentioned algorithms, first, a subroutine for calculating a defocus amount will be described with reference to FIGS. 30 to 34. The defocus amount calculation subroutine consists of a P flow (FIG. 30), a Qa flow (FIG. 31), an Ra flow (FIG. 32), an Sa flow (FIG. 33) and a T flow (FIG. 34).

First, at step #1500, a flag AGCCHF showing a changeover of AGC is reset (AGCCHF=0).

In order to store defocus amounts calculated in the preceding three calculation operations, defocus amounts are shifted in sequence among memories (steps #1505 to #1515).

A flag LCF showing that focus detection is impossible in all the areas and flags LCF1 to LCF 4 showing that focus detection is impossible in respective areas are set (steps #1520 and #1525). Flags INFF1 to INFF4 showing that the in-focus condition has been obtained in respective areas are reset (step #1530). A flag ALMF showing the auxiliary light mode is reset (step #1535).

Then, at step #1540, the number NAF of times of AF operation is set to NAF+1. At step #1542, a predetermined reference value KDF for detecting the focus condition is set to 80 μm. At step #1545, correlation calculation is performed for respective focus detection areas (first to fourth focus detection areas). The method of the correlation calculation will not be described since it is irrelevant to this embodiment.

Based on a result of the correlation calculation, whether or not focus detection is impossible in the first area is determined at step #1550.

When focus detection is impossible, the process proceeds to step #1575. When focus detection is possible, a defocus amount DF1 of the first area is calculated at step #1555, and the flag LCF1 showing that focus detection is impossible for the first area is reset at step #1560. Then, the process proceeds to step #1565.

At step #1565, whether or not the defocus amount is the predetermined value KDF or smaller is determined.

When it is the predetermined value KDF or smaller, the flag INFF1 showing that the in-focus condition has been obtained is set (INFF1=1), and the process proceeds to step #1575. When the defocus amount exceeds the predetermined value KDF, skipping step #1570, the process proceeds directly to step #1575.

Similar operations are performed for the second, third and fourth areas at steps #1575 to #1595, at steps #1600 to #1620 and at steps #1625 to #1645, respectively. The description thereof will be omitted. The first, second, third and fourth areas correspond to the distance measurement areas 1-1, 1-2, 4-1 and 4-2 (correspond to c, a, d and b of FIG. 18), respectively.

When step #1645 is completed, whether an MF operation is being performed or not is determined at step #1647.

The process returns when an MF operation is being performed. Otherwise, the process proceeds to step #1650.

At step #1650, whether or not all the flags LCF1 to LCF4 showing that focus detection is impossible in respective areas have been set is determined.

When all the flags LCF1 to LCF4 have been set (LCF1 to LCF4=1), determining that focus detection is impossible, the process proceeds to subsequently-described step #1750.

When at least one of the flags LCF1 to LCF4 has not been set, the process proceeds to step #1655, where the flag LCF showing that focus detection is impossible for all the areas is reset (LCF=0). Then, the flag LCEF showing that focus detection is impossible even in the low contrast scanning or the auxiliary light mode is reset (LCEF=0, step #1660), and a counter NLC showing the number of cases where focus detection is impossible is reset (NLC=0, Step #1665). Then, the process proceeds to step #1675.

At step #1675, a defocus amount which is greatest of the defocus amounts DF1 to DF4 is set as a defocus amount DF (steps #1675 and #1680).

The greatest defocus amount is set in order to find a subject which is located closest to the camera. The defocus amount of the rear focus side is a positive DF, while that of the front focus side is a negative DF.

Then, at step #1685, whether the eye sensing mode is ON or not is determined.

When the eye sensing mode is ON (EPF=1), the predetermined value KDF is set to 300 μm to increase the in-focus range. When the eye sensing mode is not ON (EPF≠1), the in-focus range is decreased at steps from #1700.

This is because a continuous mode (where the lens is moved again, if the subject becomes out of focus again after an in-focus condition is obtained) is frequently ON in the eye sensing mode. That is, the lens is frequently moved if the in-focus range is small, so that power consumption increases and one of the objects of the eye sensing mode, that is, to make no noise during operations cannot be achieved because of the noise caused by moving the lens. Therefore, the in-focus range is increased in the eye sensing mode.

Then, whether or not the absolute value of the defocus amount DF which is obtained at step #1700 is the predetermined value KDF or lower is determined.

When it is the predetermined value KDF or lower, the flag INFF showing that the in-focus condition has been obtained is set (INFF=1) at step #1705, and whether the eye sensing mode is ON or not is determined at step #1710.

When the eye sensing mode is not ON (EPF≠1), whether or not the flag S1INFF showing that the in-focus condition has been obtained by an operation of the switch S1 has been set is determined at step #1712.

When the flag S1INFF has not been set (S1INFF≠1), the flag S1INFF is set (S1INFF=1) at step #1715, the counter NAF showing the number of times of focus detection is set to "0" at step #1720, and the process proceeds to step #1725.

The process proceeds to step #1725 when the in-focus condition has not been obtained at step #1700 (|DF|>KDF) or when the eye sensing mode is ON (EPF=1) at step #1710 or when the flag S1INFF has been set (S1INFF=1) at step #1712.

At step #1725, an average defocus amount DFAV showing the average of the defocus amounts obtained in the preceding three operations and the current operation is set as a preceding average defocus amount LDFAV. At step #1730, the average defocus amount DFAV is obtained by (DF+L1DF+L2DF+L3DF)/4. At step #1735, whether the flag S1INFF has been set or not is determined.

When the flag S1INFF has not been set (S1INFF≠1), the process returns.

When the flag S1INFF has been set (S1INFF=1), whether or not the number NAF of times of focus detection after the in-focus condition has been obtained is 4 (whether or not focus detection was performed four times) is determined.

When it is 4 (NAF=4), the average defocus amount DFAV is set to DFB at step #1745, and the process returns. When it is not 4 (NAF≠4), the process returns.

When focus detection is impossible at step #1650 (LCF1 to LCF4=1), the process proceeds to step #1750, where whether the in-focus condition has been obtained or not is determined.

When the in-focus condition has been obtained (INFF=1), the number NLC of consecutive cases where focus detection is impossible is obtained by NLC=NLC+1 (step #1754). Then, the process returns.

When the in-focus condition has not been obtained (INFF≠1), whether the auxiliary light mode flag ALMF has been set or not is determined at step #1752.

When the flag ALMF has not been set (ALMF≠1), whether or not the integration time TAF1 is TK (70 msec) or more is determined at step #1755.

When the integration time TAK1 is TK or more (TAF1≧TK), determining that focus detection is impossible because of insufficient brightness, a flag ALMF is set (ALMF=1) at step #1760. Then, the process returns.

When the flag ALMF is set (ALMF=1) at step #1752, whether the AGC is "1" or not is determined at step #1765.

When the AGC is "1", determining that focus detection cannot be performed even if the gain is increased in the double speed mode, the flag LCEF is set (LCEF=1). Then, the process returns.

When the AGC is not "1", the average of data inputted from the CCD is obtained (step #1775). Then, whether the average is greater than a predetermined value KLV or not is determined at step #1780.

When it is greater than the predetermined value KLV (the average value>KLV), determining that the data inputted from the CCD is great enough to perform focus detection, the process proceeds to step #1770, where the flag LCEF showing that focus detection is impossible (LCEF=1) is set. Then, since there is no use in changing the gain, the process returns.

When the average value is the predetermined value KLV or lower (the average value≦KLV), the flag AGCCHF is set (AGCCHF=1) at step #1785. Then, the process returns.

When the integration time is less than the predetermined value TK (TAF1<TK) at step #1755, the process proceeds to step #1790, where whether or not the flag LCSF showing the low contrast scanning mode has been set is determined.

When the flag LCSF has been set (LCSF=1), the process returns.

When the flag LCSF has not been set (LCSF≠1), the flag FLDF is set (FLDF=1) in order to set the moving-out mode at step #1795, the flag LCSF showing the low contrast scanning mode is set (LCSF=1) at step #1798, and a drive amount N is set to NLG at step #1799. Then, the process returns.

Figure 29:
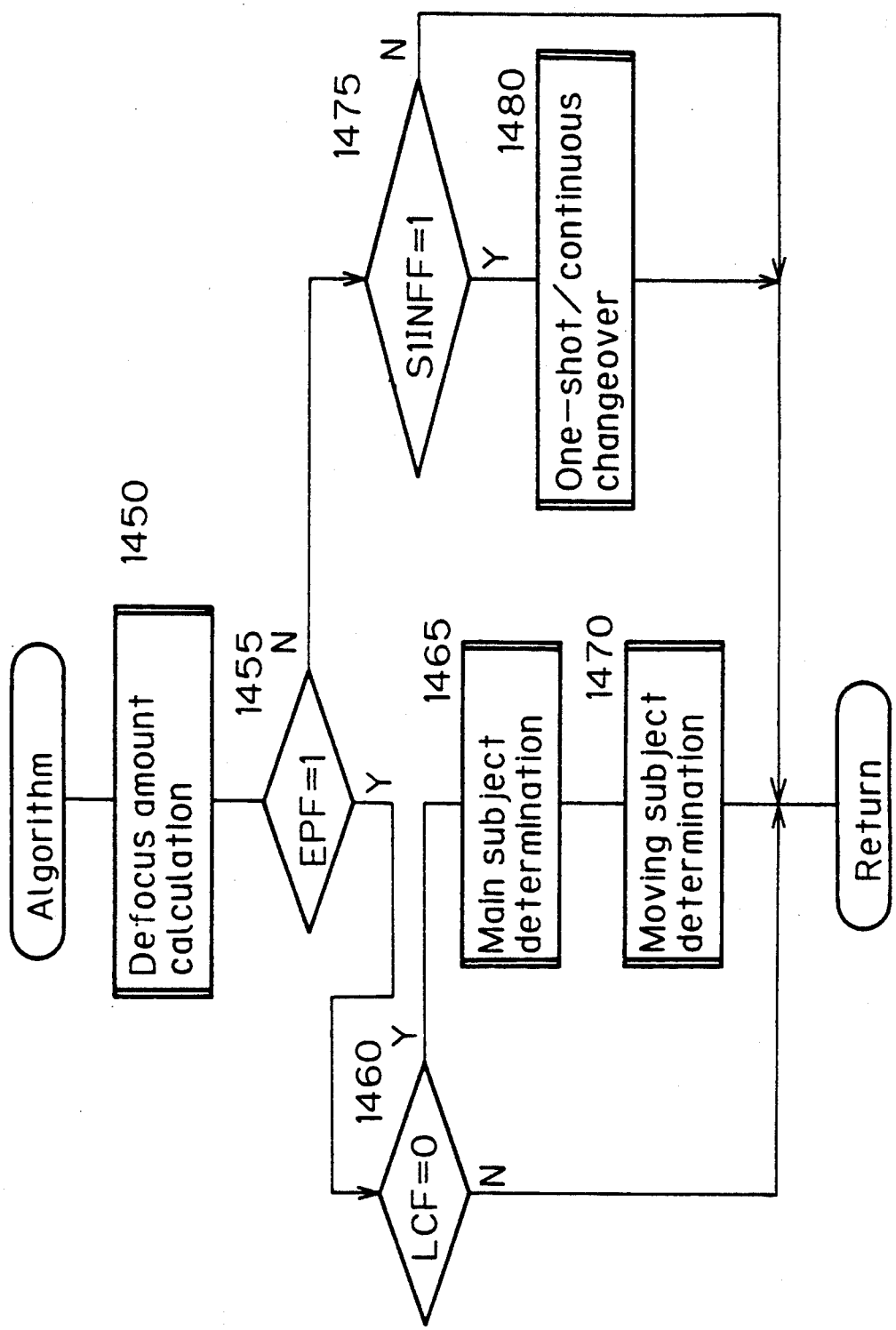
FIG. 29 shows a flow of an algorithm executed by the intra-body microcomputer of the first embodiment of the present invention.
Figure 30:
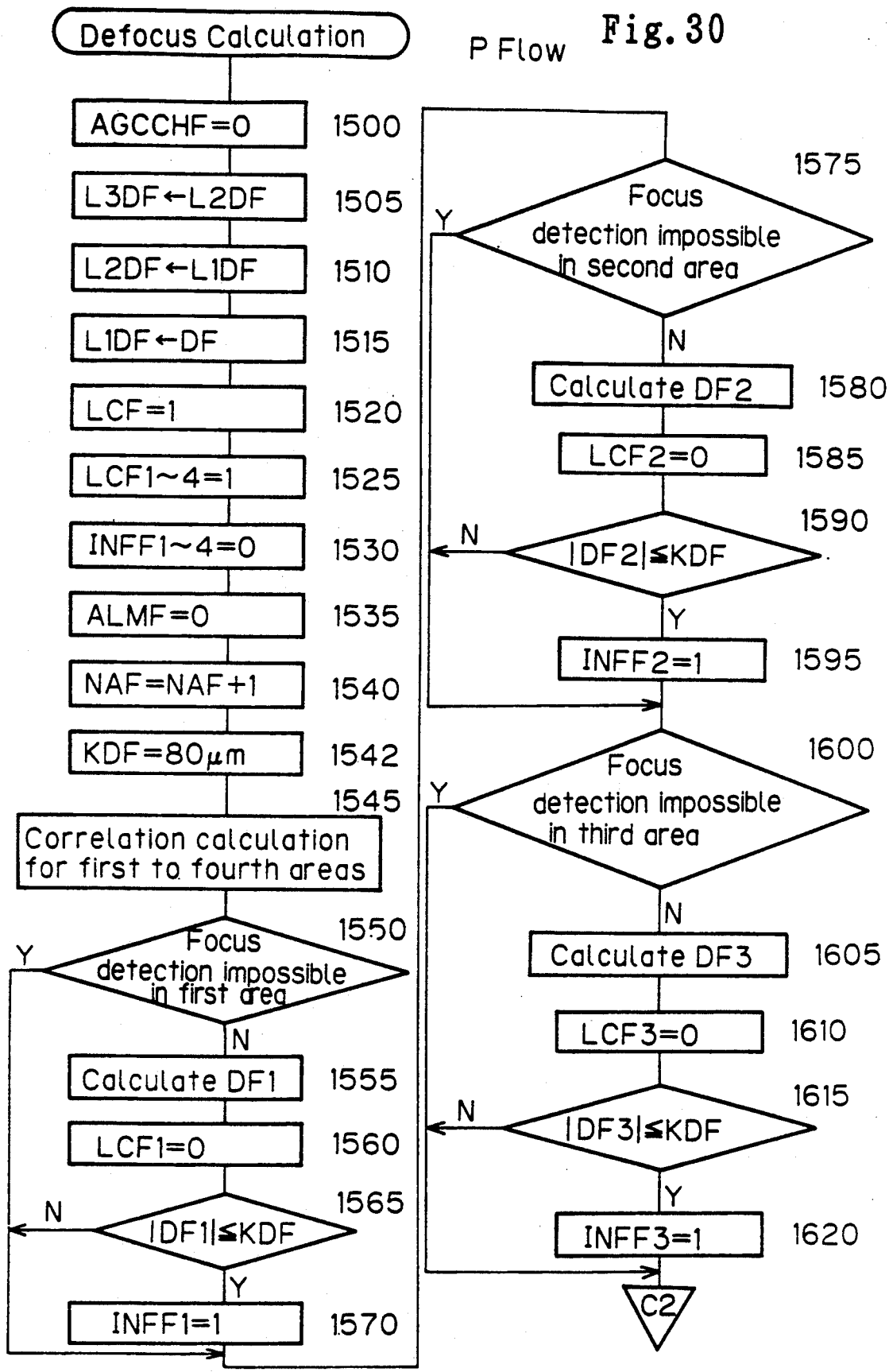
FIG. 30 is a flow chart of a P flow of a defocus amount calculation subroutine executed by the intra-body microcomputer of the first embodiment of the present invention.
Figure 31:
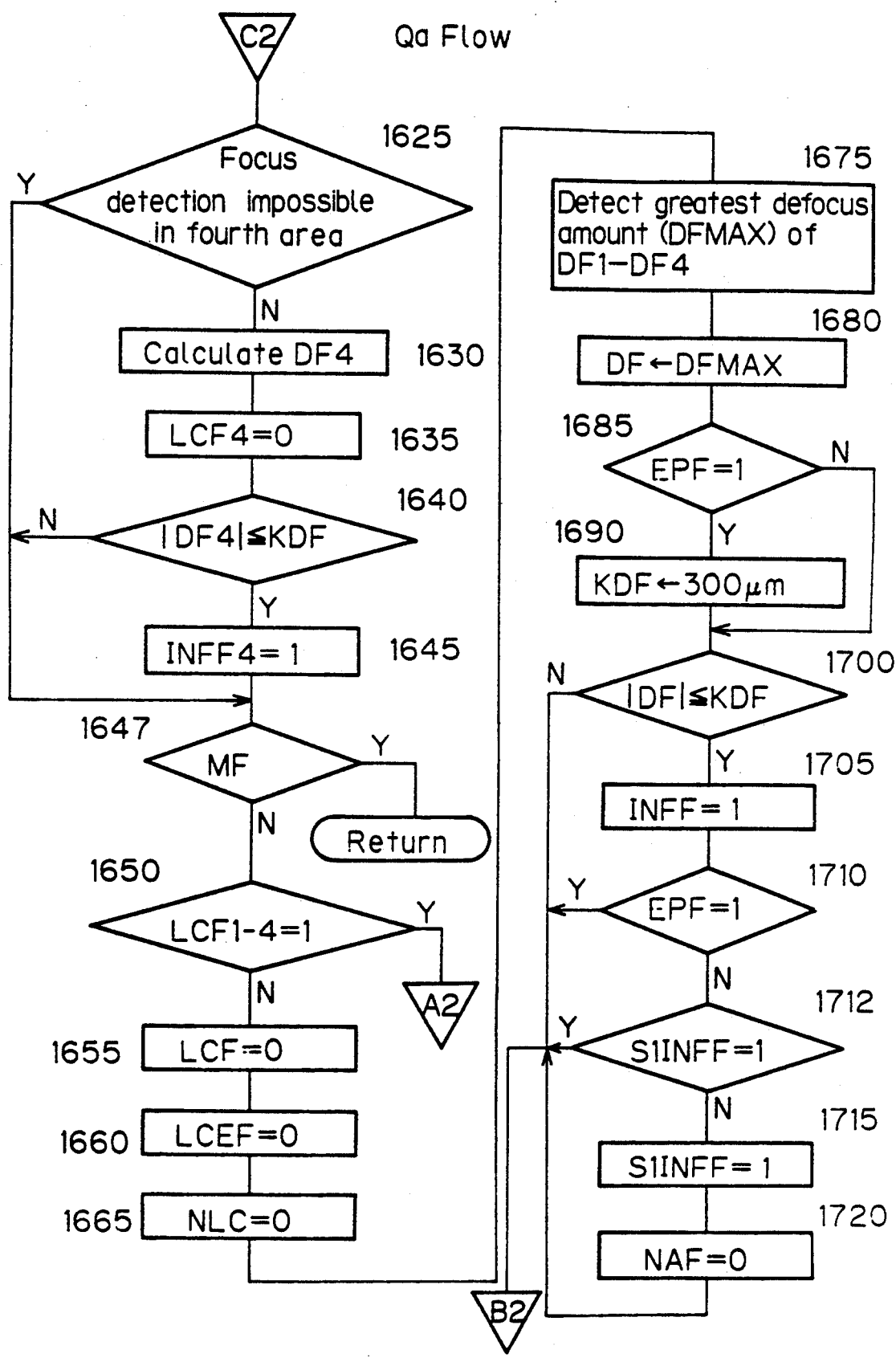
FIG. 31 is a flow chart of a Qa flow of the defocus amount calculation subroutine executed by the intra-body microcomputer of the first embodiment of the present invention.
Figure 35:
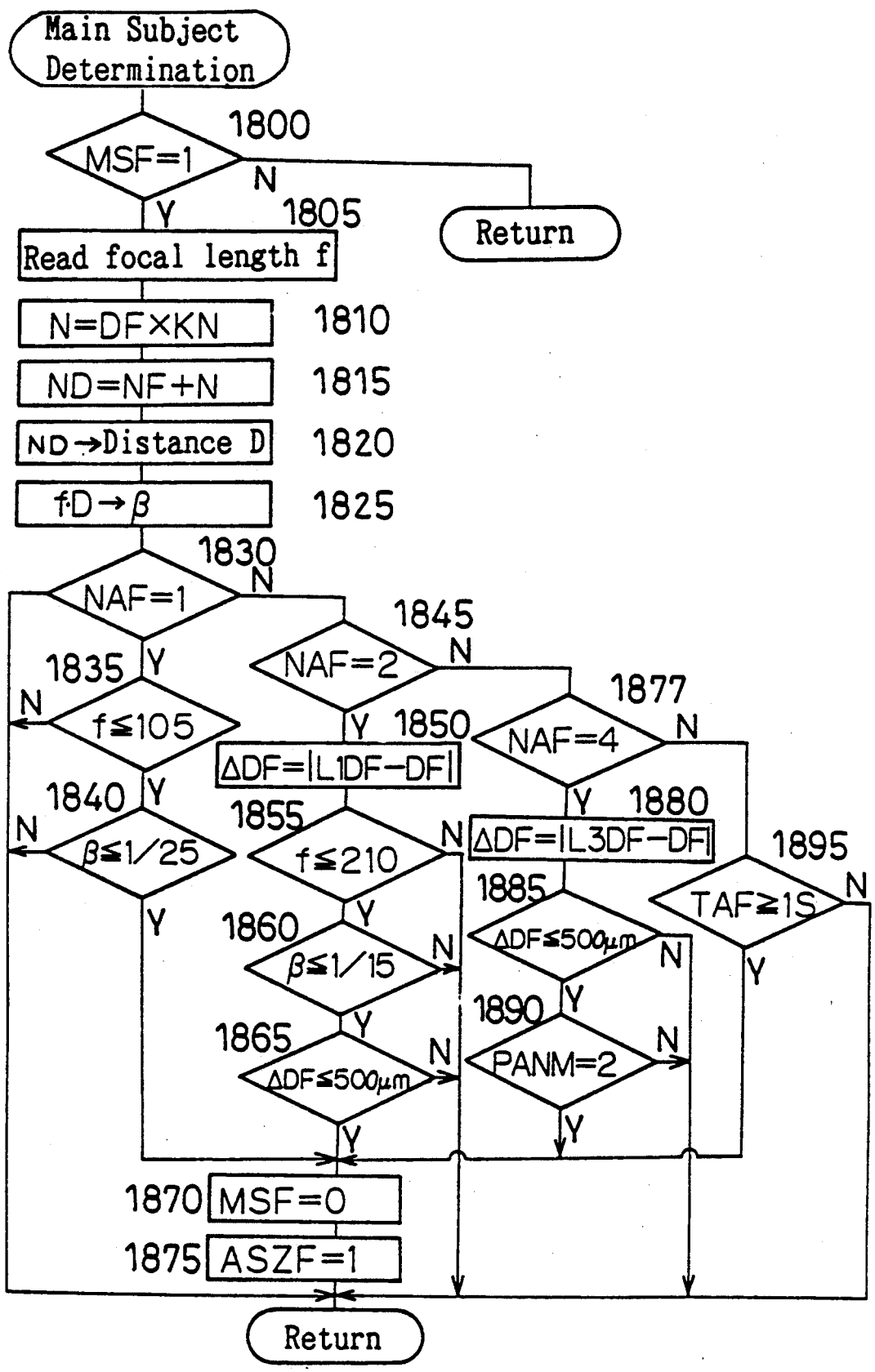
FIG. 35 is a flow chart of a main subject determination subroutine executed by the intra-body microcomputer of the first embodiment of the present invention.

Subsequently, the main subject determination subroutine executed at step #1465 of FIG. 29 will be described with reference to FIG. 35.

First, at step #1800, whether or not the flag MSF which is set when a main subject is determined has been set is determined.

When the flag MSF has not been set (MSF≠1), determining that the main subject has already been determined, the process returns at step #1805.

When the flag MSF has been set (MSF=1), the process proceeds to step #1805, where a focal length f is read from the zoom encoder. At step #1810, the lens movement amount N is obtained by multiplying the obtained defocus amount DF by a coefficient KN. The coefficient KN is a predetermined coefficient for converting the defocus amount DF to the drive amount N. At step #1815, the drive amount N which is obtained at step #1810 is added to the current moving-out amount NF to obtain the lens drive amount ND for causing the main subject to be in focus. Then, at step #1820, a distance D to the subject is obtained from the moving-out amount ND. As the method of obtaining the distance D, a method where a ROM table is used or a method where calculation is performed by use of a conversion coefficient may be employed. The method will not be described since it is irrelevant to this embodiment.

Then, at step #1825, a magnification $\beta$ is obtained from the obtained distance D and focal length f, and at step #1830, whether it is a first-time focus detection or not is determined.

When it is a first-time focus detection (NAF=1), whether or not the focal length f is 105 mm or smaller and whether or not the magnification $\beta$ is 1/25 or smaller are determined (steps #1835 and #1840). When both of the conditions are fulfilled, determining that the main subject has been determined, the flag MSF is reset (MSF=0, step #1870), the flag ASZF for performing the auto stand-by zoom is set (ASZF=1, step #1875), and the process returns. When one of the conditions is not fulfilled, the process returns.

In determining the main subject, that the magnification is small means that the main subject is small. Since it is easy to capture a subject within the image plane if the subject is small, the subject can fully be captured in a first-time AF operation. Moreover, if the focal length is short, the main subject is easy to capture, since it is less possible that the main subject moves out of the image plane when the camera is shaken to the right and left compared to the case where the focal length is long.

When it is not a first-time focus detection at step #1830, the process proceeds to step #1845, where whether it is a second-time focus detection or not is determined.

When it is a second-time focus detection (NAF=2), the difference Δ between the preceding and current defocus amounts is obtained by ΔDF=|L1DF−DF| at step #1850. At step #1855, whether the focal length f is 210 mm or smaller is determined.

When the focal length f is 210 mm or smaller (f≦210), whether or not the magnification β is 1/15 or smaller is determined at step #1860.

When the magnification β is 1/15 or smaller (β≦1/15), whether or not the difference ΔDF is 500 μm or smaller is determined at step #1865.

When the difference ΔDF is 500 μm or smaller (ΔDF≦500 μm), determining that the main subject has been determined, the flag MSF is reset (MSF=0) at step #1870, and the flag ASZF for performing the auto stand-by zoom is set (ASZF=1) at step #1875. Then, the process returns.

The process returns when at least one of the above three conditions (steps #1855, #1860 and #1865) is not fulfilled. The reason why the difference ΔDF is considered is that whether main subjects have been changed or not is determined. The level of the determination of the main subject is less strict than that of the first-time focus detection. This is because the main subject becomes easier to find as the in-focus condition is being approached (under the condition that the AF operation has been performed once).

When it is not a second-time focus detection at step #1845, the process proceeds to step #1877, where it is a fourth-time focus detection or not is determined.

When it is a fourth-time focus detection (NAF=4), the process proceeds to step #1880, where the difference ΔDF between the defocus amount L3DF of the third focus detection and the current defocus amount is obtained. At step #1885, whether or not the difference ΔDF is 500 μm or smaller is determined.

When the difference ΔDF exceeds 500 μm, determining that subjects have been changed, the process returns. When the difference is within 500 μm, whether panning has occurred or not is determined at step #1890.

When panning has not occurred (PANM=2), determining that the main subject has been determined, the process proceeds to step #1870. When panning has occurred (PANM≠2), determining that the main subject cannot be determined, the process returns.

Panning sensing is performed by a subsequently-described panning sensing interrupt TEPINT.

When it is not a fourth-time focus detection at step #1877, the process proceeds to step #1895, where whether or not one second has passed since the start of the focus detection is determined. When one second has passed (TAF≧1 sec), determining that the main subject has forcibly been determined, the process proceeds to step #1870, where the driving of the lens is enabled.

When one second has not passed (TAF<1 sec) at step #1895, the process returns.

Figure 36:
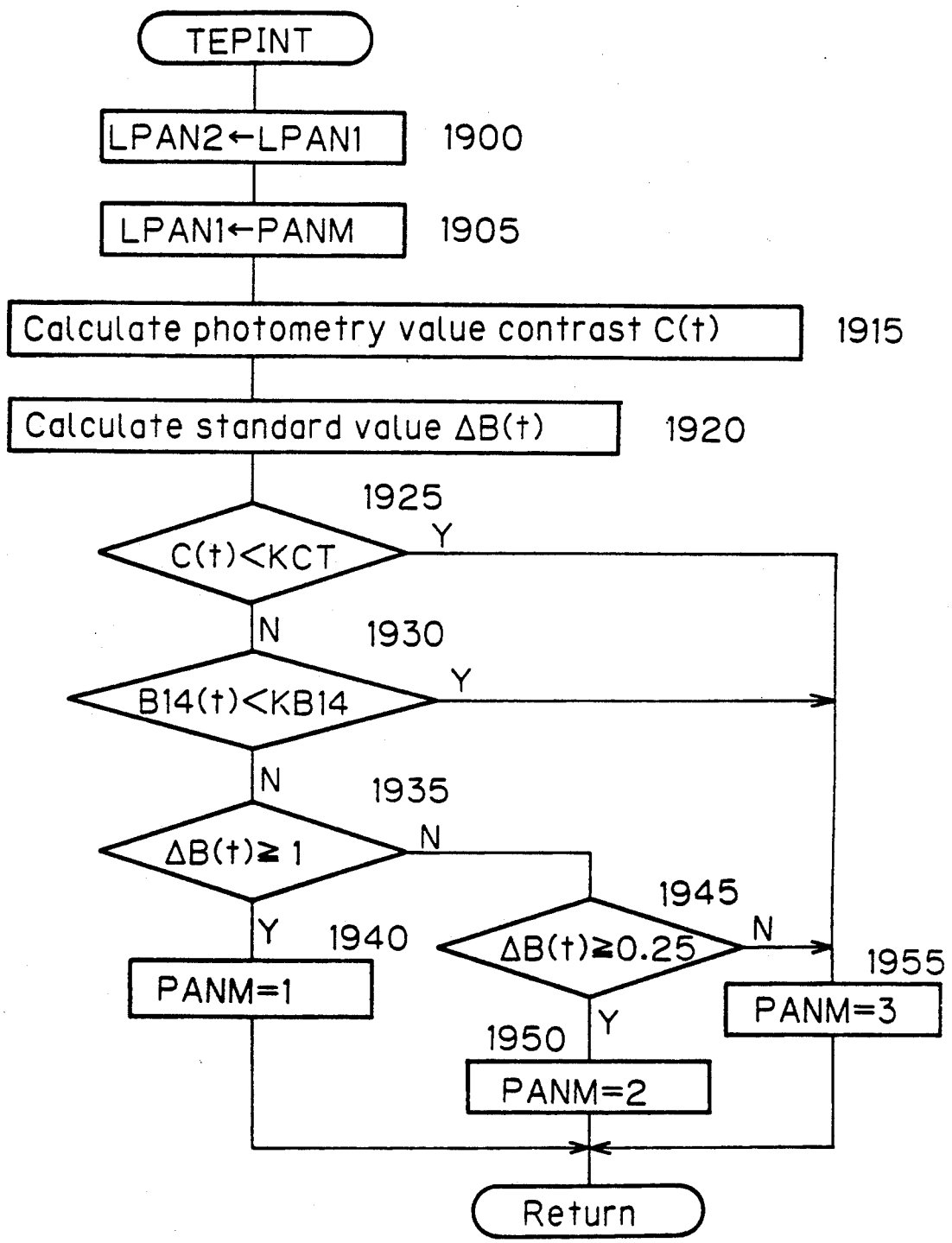
FIG. 36 is a flow chart of a panning detection interrupt subroutine executed by the intra-body microcomputer of the first embodiment of the present invention.

Subsequently, the panning sensing interrupt TEPINT which is performed every 250 msec will be described with reference to FIG. 36.

At steps #1900 and #1905, previous two modes where panning sensing was performed are stored (LPAN2, LPAN1). Then, a photometry value contrast C(t) and a standard value ΔB(t) are calculated (steps #1915 and #1920).

Figure 60:
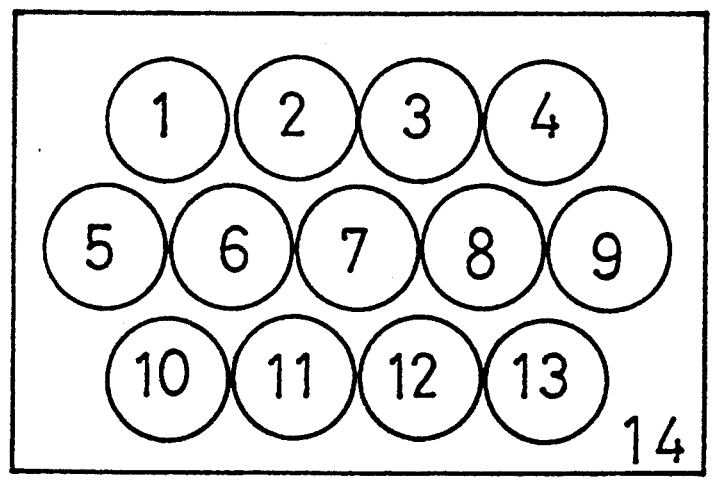
FIG. 60 shows a photometry pattern on the photographing image plane of the first embodiment of the present invention.

FIG. 60 shows a photometry pattern on the photographing image plane. The photometry pattern consists of portions 1 to 13 for spot photometry and a portion 14 for photometry of spaces among the portions 1 to 13 and the periphery thereof. In correspondence with the photometry pattern, a multi-segment photometry device is provided in the camera. The main subject is determined by use of a calculation result which is outputted from the multi-segment photometry device.

With respect to a photometry value Bn(t) (n=1 to 13) at a time t, the contrast C(t) of all directions including lateral and oblique directions is obtained by:

$$C(t) = (1/2) \times \{|B1(t) - B2(t)| + |B2(t) - B3(t)| +$$
$$|B3(t) - B4(t)| + |B5(t) - B6(t)| + |B6(t) - B7(t)| +$$
$$|B7(t) - B8(t)| + |B8(t) - B9(t)| + |B10(t) - B11(t)| +$$
$$|B11(t) - B12(t)| + |B12(t) - B13(t)| + |B1(t) - B5(t)| +$$
$$|B2(t) - B6(t)| + |B3(t) - B7(t)| + |B4(t) - B8(t)| +$$
$$|B6(t) - B10(t)| + |B7(t) - B11(t)| + |B8(t) - B12(t)| +$$
$$|B9(t) - B13(t)| + |B1(t) - B6(t)| + |B2(t) - B7(t)| +$$
$$|B3(t) - B8(t)| + |B4(t) - B9(t)| + |B5(t) - B10(t)| +$$
$$|B6(t) - B11(t)| + |B7(t) - B12(t)| + |B8(t) - B13(t)|\}.$$

If a luminance change amount ΔB(t) at a time t is standardized by the above contrast, ΔB(t) is represented by $$\Delta B(t) = \frac{\sum_{i=1}^{13} |Bi(t) - Bi(t - \Delta t)|}{C(t)}$$

where Δt=250 msec. ΔB(t) is a luminance change amount per a unit time based on an output of the multi-segment photometry device.

At step #1925, whether the contrast C(t) is lower than a predetermined value KCT or not is determined.

When it is lower than the predetermined value KCT (C(t)<KCT), determining that the subject is of low contrast and that the reliability of panning sensing is low, the process proceeds to step #1955, where the indetermination mode is set (PANM=3). Then, the process returns.

When the contrast C(t) is higher than the predetermined value KCT (C(t)>KCT), whether or not a photometry value B14(t) of a fourteenth photometry device which indicates the brightness of the entire photographing scene is lower than a predetermined value KB14 is determined.

When it is lower than the predetermined value KB14 (B14(t)<KB14), determining that reliability is low because of the dark photographing scene, the process proceeds to step #1955.

When the photometry value B14(t) is the predetermined value KB14 or higher (B14(t)≧KB14), the process proceeds to step #1935, where whether or not the standard value ΔB(t) is 1 or higher is determined.

When it is 1 or higher (ΔB<1), determining that a main subject image moves by at least one of the photometry devices of FIG. 60, a data showing the presence of panning (PANM=1) is set. When the standard value ΔB(t) is lower than 1 (ΔB(t)<1), whether or not the standard value ΔB(t) is 0.25 or lower is determined at step #1945.

When it is 0.25 or lower (ΔB(t)≦0.25), determining that the subject is stationary, a data (PANM=2) is set (step #1950), and the process returns. When the standard value ΔB exceeds 0.25 (ΔB(t)>0.25), a data showing the indetermination mode (PANM=3) is set (step #1955), and the process returns.

If a change corresponding to one photographing device can be detected when one photometry device is 5.2 mm, panning with a speed of 21 mm per second can be detected on the image plane since detection is made every 250 msec.

Subsequently, the moving subject determination routine will be described with reference to FIG. 37.

First, at step #2000, whether the AF mode is the AF lock mode (AFM=1) or not is determined. When it is the AF lock mode (AFM=1), the process returns. When it is not the AF lock mode (AFM≠1), the process proceeds to step #2005, where whether the in-focus condition has been obtained or not is determined.

When the in-focus condition has not been obtained (INFF≠1), the process returns. When the in-focus condition has been obtained (INFF=1), the process proceeds to step #2010, where whether the auxiliary light mode is ON or not is determined.

When the auxiliary light mode is ON (ALMF=1), since the moving subject determination is not made in the auxiliary light mode, after the AF lock mode (AFM=1) is set at step #2015, the process returns.

When the auxiliary light mode is not ON (ALMF≠1), speeds, of the moving subject, which were obtained in nine preceding operations are stored at steps #2020 to #2060. At step #2062, whether focus detection is impossible or not is determined.

When focus detection is impossible (LCF=1), a current speed V is set as a preceding speed LV1 at step #2063. Then, the process returns. When focus detection is not impossible (LCF≠1), the speed V of the moving subject is calculated by use of the defocus amounts DF, L1DF and L2DF of three preceding operations.

Then, at step #2070, whether the eye sensing mode is ON or not is determined.

When the eye sensing mode is not ON (EPF≠1), the process returns.

When the eye sensing mode is ON (EPF=1) and it is the eye sensing mode where the switch S1 has been turned from on to off (S1OFF=1), whether or not the moving subject mode is ON when the switch S1 is turned ON is determined (step #2071). When the moving subject mode is ON, the process returns so that the moving subject mode is maintained (step #2072). When it is not a mode where the switch S1 has been turned from on to off (S1OFF≠0), or even if it is a mode where the switch S1 has been turned from on to off, when the moving subject mode is not ON when the switch S1 is turned on, whether or not the obtained speed V of the moving subject is 0.75 mm/sec or higher on the image plane is determined (step #2075).

When the speed V is 0.75 mm/sec or higher (V≧0.75 mm/sec), the moving subject mode is set (AFM=3) at step #2080. Then, the process returns.

When the speed V is lower than 0.75 mm/sec (V<0.75 mm/sec), the process proceeds to step #2085, where the difference ΔDF between the defocus amount of the preceding operation and that of the current operation is obtained. At step #2090, whether or not the difference ΔDF is 1 mm or greater is determined.

When it is 1 mm or greater (ΔDF≧1 mm), the process proceeds to step #2110, where the AF lock is set (AFM=1). Then, the process returns.

When the difference ΔDF is less than 1 mm (ΔDF<1 mm) at step #2090, if panning was detected in all the three panning detections (steps #2095, #2100 and #2105), the process also proceeds to step #2110 to set the AF lock mode.

On the contrary, when panning was not detected in at least one of the three panning detections, the process proceeds to step #2115, where the AF mode is set to "2" (AFM=2). Then, the process returns.

Figure 38:
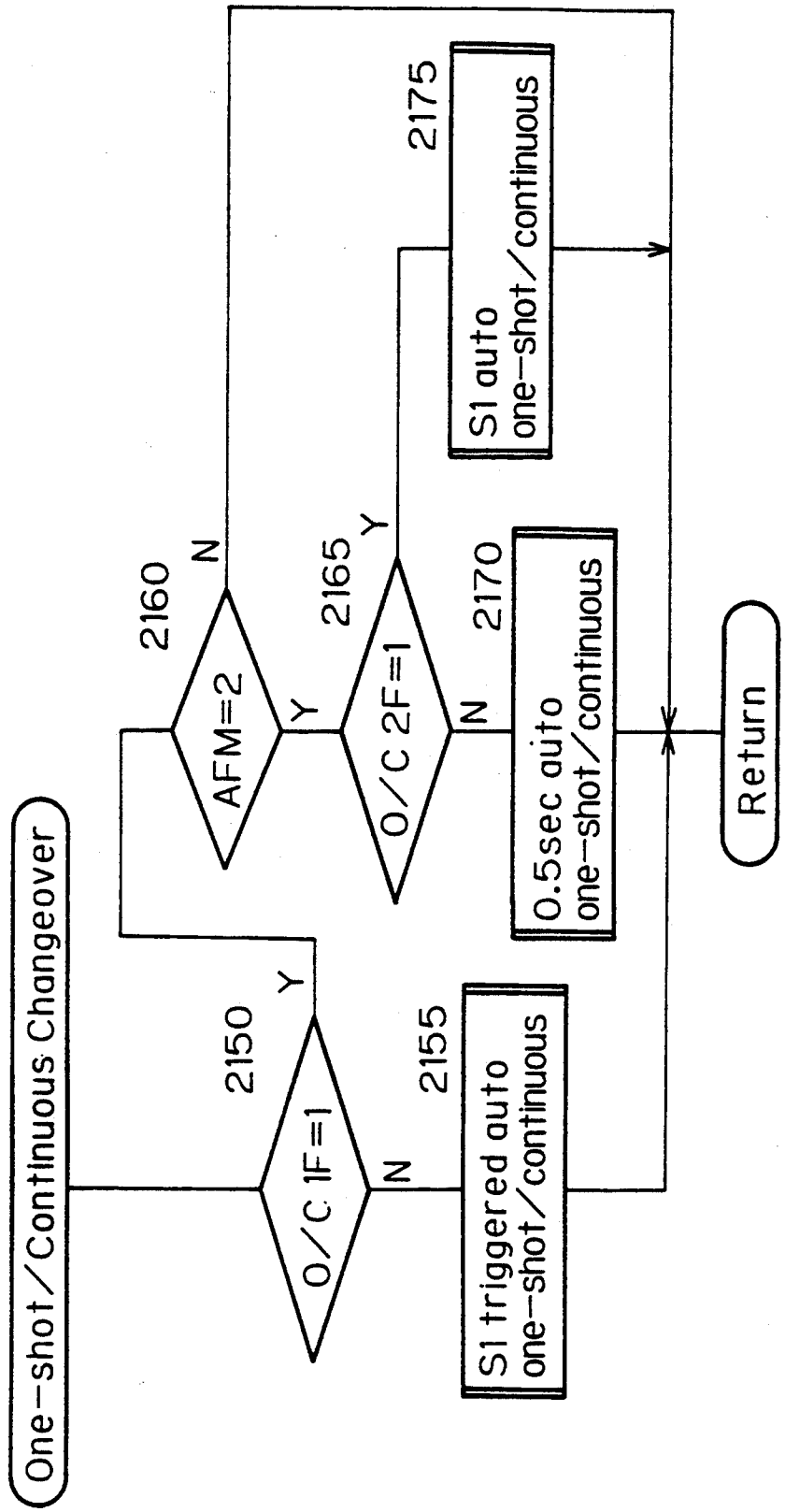
FIG. 38 is a flow chart of a one-shot/continuous change-over subroutine executed by the intra-body microcomputer of the first embodiment of the present invention.

Subsequently, the one-shot/continuous changeover routine will be described with reference to FIG. 38.

First, at step #2150, whether or not a flag O/C1F showing that the process has passed through an S1 triggered auto one-shot/continuous routine (to be described later) has been set is determined.

When it has not been set (O/C1F≠1), the S1 triggered auto one-shot/continuous routine is executed at step #2155. Then, the process returns.

When the flag O/CF1 has been set (O/C1F=1), the process proceeds to step #2160, where whether or not the AF mode (the AF lock mode or the continuous mode) has been decided is determined.

When it has been decided (AFM≠2), the process returns. When it has not been decided (AFM=2), the process proceeds to step #2165, where a 0.5 sec auto one-shot/continuous routine (to be described later) has been executed or not is determined.

When it has been executed, since a flag O/C2F showing that the 0.5 sec auto one-shot/continuous routine has been executed has been set (O/C2F=1), an S1 auto one-shot/continuous routine is executed at step #2175. Then, the process returns.

When the flag O/C2F has not been set (O/C2F≠1), the 0.5 sec auto one-shot/continuous routine is executed at step #2170. Then, the process returns.

Figure 39:
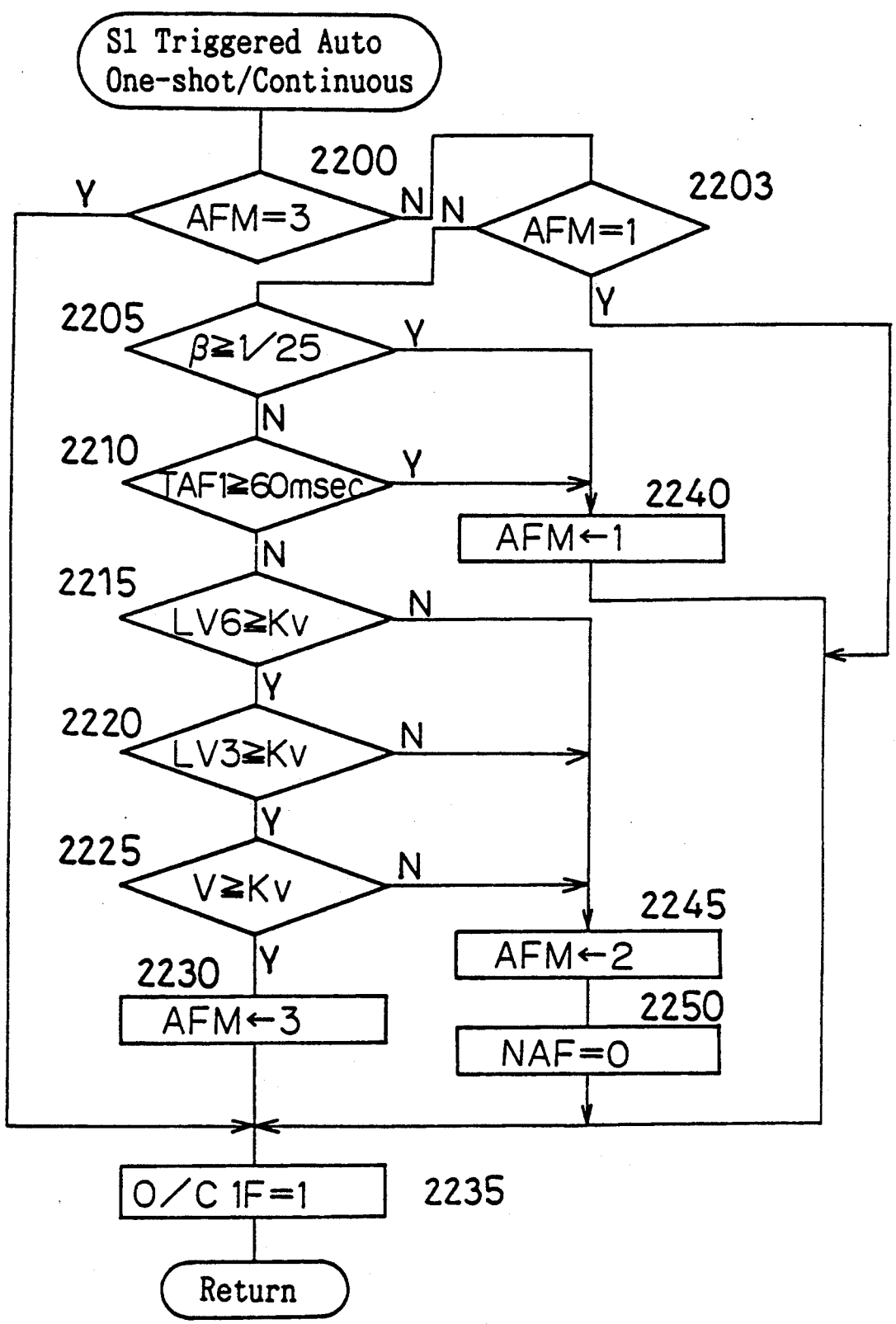
FIG. 39 is a flow chart of an S1 triggered auto one-shot/continuous subroutine executed by the intra-body microcomputer of the first embodiment of the present invention.

The above-mentioned S1 triggered one-shot/continuous routine will be described with reference to FIG. 39.

The routine is executed only once when the photographing preparation switch S1 is turned on in the eye sensing mode. In the routine, an AF lock mode determination, a continuous mode determination (in case of a moving subject), and an indetermination mode determination are made according to the condition of the subject.

First, at step #2200, whether or not the subject is moving (moving fast) when the eye sensing mode is ON is determined.

When the subject is moving (AFM=3), the flag O/C1F showing that the S1 triggered auto one-shot/- continuous routine has been executed is set (O/C1F=1) at step #2235. Then, the process returns.

When the subject is not moving (AMF≠3) at step #2200, the process proceeds to step #2203, where whether the AF lock mode is ON or not is determined.

When the AF lock mode is ON (AFM=1), the process proceeds to step #2235. When the AF lock mode is not ON (AFM≠1) at step #2203, the process proceeds to step #2205, where whether or not the magnification β is 1/25 or greater is determined.

When the magnification β is 1/25 or greater (β>1/25), determining that the number of moving subjects is small or that the moving subject cannot be captured (since the speed of the moving subject increases as the magnification increases on the image plane), the AF mode is set to the AF lock mode (AFM=1, step #2240). Then, the process proceeds to step #2235.

When the magnification β is smaller than 1/25 (β<1/25) at step #2205, the process proceeds to step #2210, where whether or not the integration time TAF1 is 60 msec or more is determined.

When it is 60 msec or more (TAF1>60 msec), since the reliability of data deteriorates because of insufficient brightness and the performance for capturing a moving subject deteriorates because of the long integration time, the AF mode is set to the AF lock mode (AFM=1). Then, the process proceeds to step #2235.

When the integration time TAF1 is less than 60 msec (TAF<60 msec) at step #2210, whether the subject is moving at a stable speed or not is determined by the subject speed of the sixth operation retroactively counted from the current, that of the third operation retroactively counted from the current and that of the current operation (steps #2215, #2220, and #2225).

When the speed is a predetermined speed KV or higher (for example, the speed KV is 0.5 mm/sec or higher on the image plane) in all the above three determinations, determining that the subject is moving, the AF mode is set to "continuous" (AFM=3, step #2230). Then, the process proceeds to step #2235.

When the speed is lower than the predetermined speed KV in at least one of the above three determinations, determining that the mode cannot be determined, the AF mode is set to "2" representative of the indetermination mode (AFM=2) at step #2245, and the counter NAF showing the number of times of focus detection is reset (NAF=0) at step #2250. Then, the process returns.

Subsequently, the 0.5 sec auto one-shot/continuous routine will be described with reference to FIG. 40. The 0.5 sec of the 0.5 sec auto one-shot/continuous routine is not an accurate value. This routine is named based on the fact that approximately 0.5 sec is required for performing a sequence, including focus detection, of a camera seven times.

First, at step #2300, whether or not a zooming operation was performed after the in-focus condition had been obtained after the turning on of the switch S1 is determined.

When a zooming operation was performed (ZMF=1), since the image has changed so that the moving subject cannot be detected with a sufficient accuracy, the AF mode is set to the AF lock mode (AFM=1) at step #2312, and the flag O/C2F showing that the 0.5 sec auto one-shot/continuous routine was executed is set (O/C2F=1). Then, the process returns.

When no zooming operation was performed (ZMF=0), whether focus detection became impossible four consecutive times or not is determined at step #2312.

When focus detection became impossible four consecutive times (NLC=4), determining that the moving subject determination is impossible, the process proceeds to step #2312 to set the AF lock mode (AFM=1). Then, at step #2375, the flag O/C2F showing that the 0.5 sec auto one-shot/continuous routine has been executed is set (O/C2F=1), and the process returns.

When focus detection did not became impossible four consecutive times (NLC≠4), after the previously-described moving subject determination (FIG. 37) is made at step #2310, whether the number NAF of times of focus detection is 7 or not is determined at step #2315.

When the number NAF of times of focus detection has not become 7, the AF mode is set to "2" representative of the indetermination mode (AFM=2) at step #2320. Then, the process returns.

When the number NAF of times of focus detection is 7, the process proceeds to step #2320. When the speed of the moving subject of the retroactively sixth operation and that of the retroactively third operation are the predetermined value KV or higher (steps #2320 and #2325) or when the moving subject speed of the retroactively third operation and that of the current operation are the predetermined value KV or higher (steps #2345 and #2350), determining that the subject is moving at a stable speed, the process proceeds to step #2340. After the continuous mode is set (AFM=3) at step #2340, the process proceeds to step #2375.

The level, relating to speed, of the moving subject determination is different among the S1 triggered auto one-shot/continuous routine, the 0.5 sec auto one-shot/continuous routine and the subsequently-described si auto one-shot/continuous routine. The level is less strict in the order of the S1 auto one-shot/continuous routine, the S1 triggered auto one-shot/continuous routine and the 0.5 sec auto one-shot/continuous routine (stricter in the reverse order).

The S1 auto one-shot/continuous routine is executed at an interval (0.5 msec or more) after the in-focus condition is obtained. Consequently, there is a possibility that the user is performing panning, and a moving subject which is not intended by the user may be detected. As a result, the subject determination accuracy may be poor. Therefore, the determination level of the S1 auto one-shot/continuous routine is strictest.

Thus, the moving subject determination can be performed more accurately by making the determination level stricter.

The 0.5 sec auto one-shot/continuous routine is executed in 0.5 sec after the switch S1 is turned on. Since the switch S1 is usually turned on after the subject to be photographed is firmly decided, the focus detection data are accurate and highly reliable in this routine. Therefore, the determination level is least strict in this routine.

In the S1 triggered auto one-shot/continuous routine, reliability (probability that the AF area sufficiently captures a subject that the user intends to photograph) is low since the focus detection data obtained in the eye sensing mode are used. Consequently, the reliability is not so low as that in the S1 auto one-shot/continuous routine. Therefore, the strictness of the determination level is between those of the other two routines.

Figure 40:
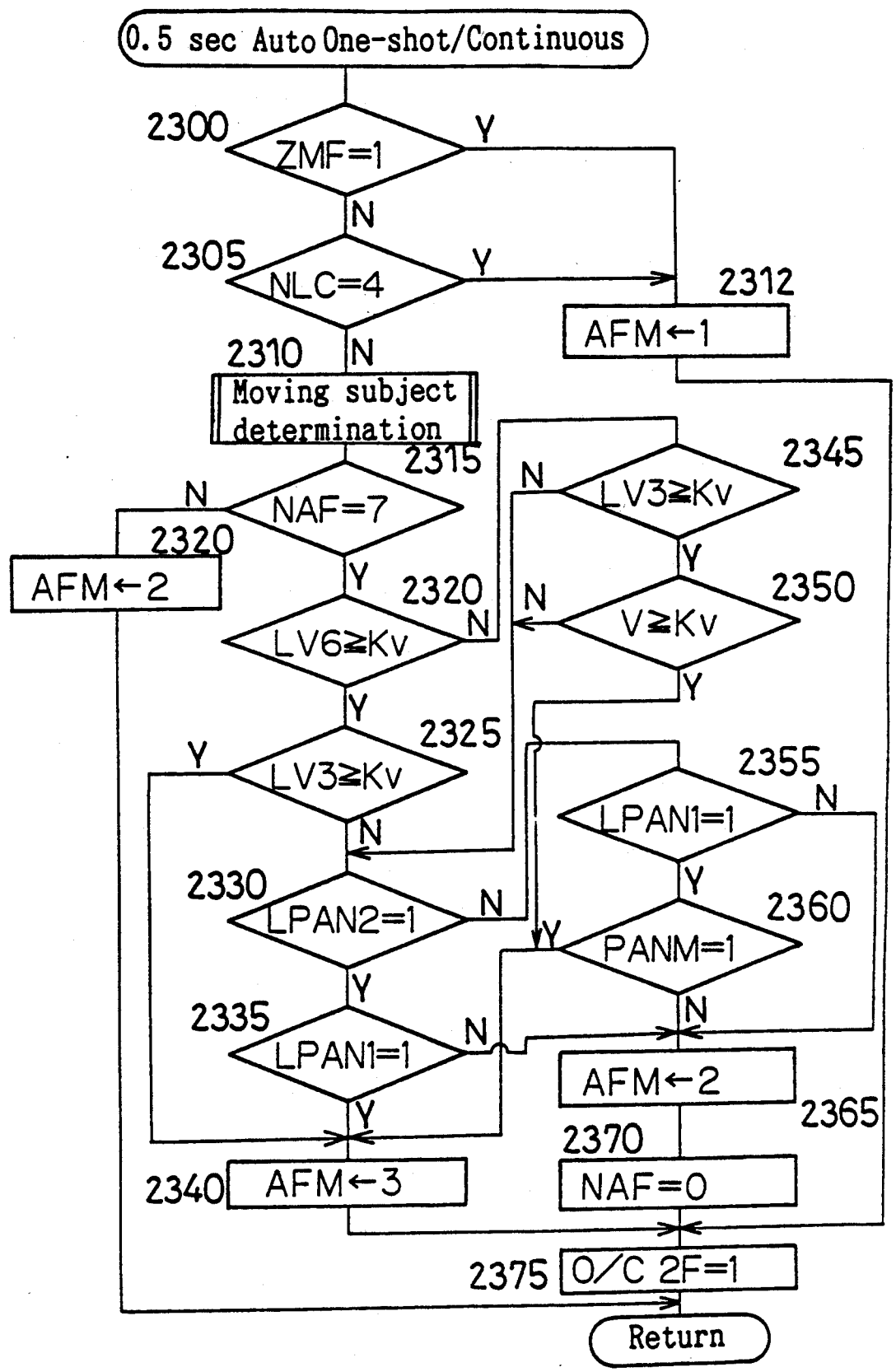
FIG. 40 is a flow chart of a 0.5 sec auto one-shot/continuous subroutine executed by the intra-body microcomputer of the first embodiment of the present invention.

Returning to the flow chart of FIG. 40, when at least one of the moving subject speeds is lower than the predetermined value KV in the moving subject mode determination where the moving subject speed is used, the process proceeds to step #2330. Then, when a panning mode is ON in both the retroactively first and second focus detections (LPAN2=1 at step #2330 and LPAN1=1 at step #2335), or when the panning mode is ON in the retroactively first focus detection and the current focus detection (LPAN1=1 at step #2355 and LAPNM=1 at step #2360), determining that a subject cannot be determined so that a moving subject cannot be detected, the process proceeds to step #2340 in order to set the continuous mode (AFM=3), since the AF lock mode cannot be set.

When the panning mode is not ON in the determination of at least one of steps #2330, #2335, #2355 and #2360, the process proceeds to step #2365, where the AF mode is set to the indetermination mode (AFM=2). At step #2370, the number NAF of times of focus detection is reset (NAF=0). Then, the process proceeds to step #2375.

Figure 41:
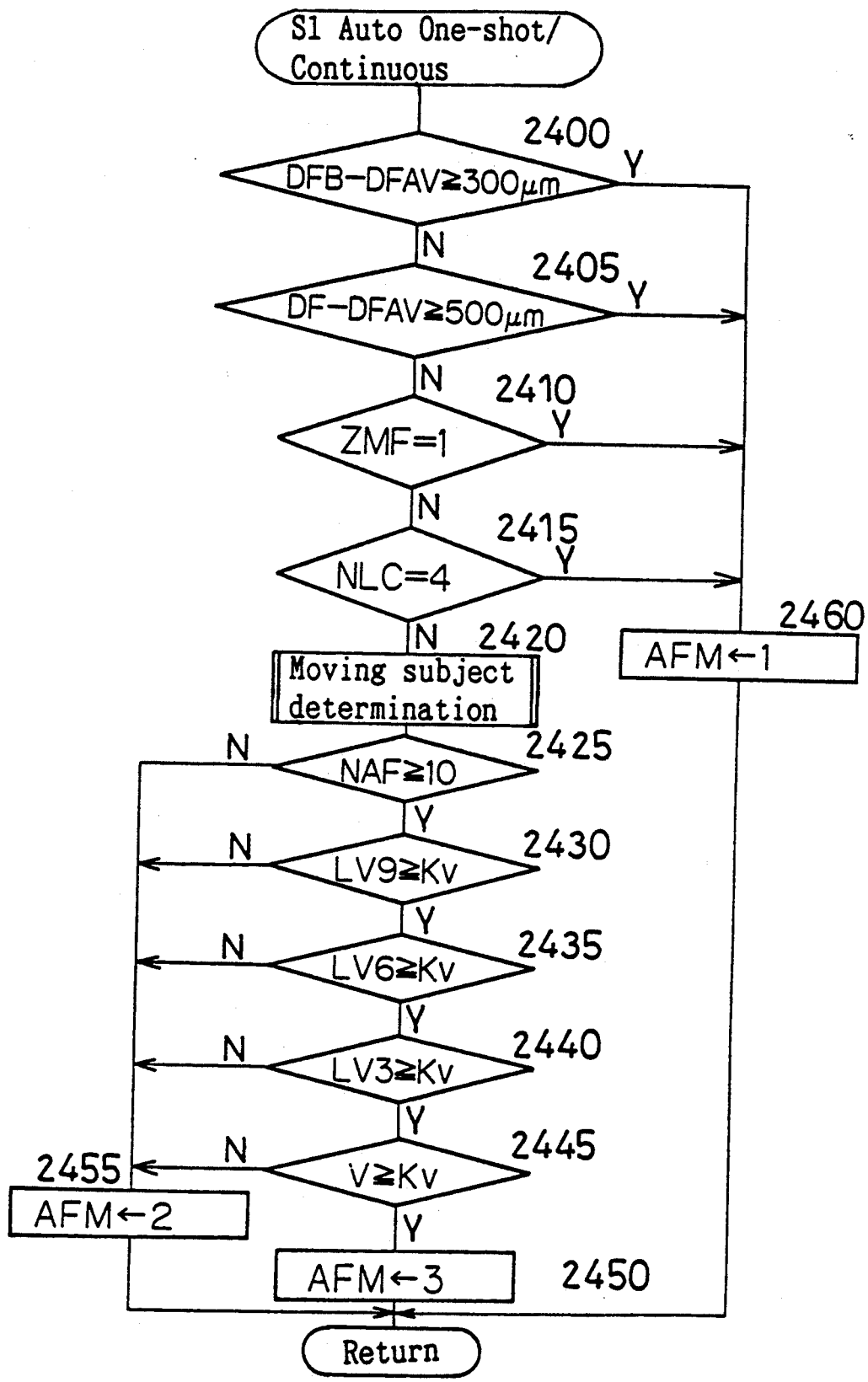
FIG. 41 is a flow chart of an S1 auto one-shot/continuous subroutine executed by the intra-body microcomputer of the first embodiment of the present invention.

Subsequently, the S1 auto one-shot/continuous routine will be described with reference to FIG. 41.

First, at step #2400, whether or not the difference between the latest average defocus amount DFAV and the average defocus amount obtained when the in-focus condition is obtained after the switch S1 is turned on is 300 μm or more in infinity direction is determined.

When the difference is 300 μm or more (DFB-DFAV≧300 μm) in infinity direction, the AF lock mode is set (AFM=1) at step #2460, and the process returns. This operation is to cope with, so that the user's intention is met, a phenomenon which occurs when the camera is shaken to the right and left in order to set the AF lock mode, that is, a phenomenon which occurs when the focus is suddenly changed from a main subject to the background. The same phenomenon occurs when the main subject is slowly moving away (when the subject is moving fast, the moving subject mode has already been set). However, since there is not much probability that the main subject is slowly moving away and since, in the AF system of this embodiment, the eye sensing mode is set to enter the continuous mode as soon as the release button is turned off, if the camera is focused on another subject, the camera is immediately focused on the main subject by a quick and easy operation. Therefore, the AF lock method is adopted. The defocus amount DF is set so as to be smaller as the main subject is farther from the camera.

When the main subject is not moving away under the above-described condition (DFB-DFAV<300 μm), the process proceeds to step #2405, where whether or not an irrelevant subject passed across the image plane is determined by determining whether or not the difference between the current defocus amount and the latest average defocus amount DFAV is 500 μm or more. The AF lock mode is set when an irrelevant subject passed.

When the difference is 500 μm or more (DF-DFAV<500 μm), determining that an irrelevant subject passed, the process proceeds to step #2460 to set the AF lock mode.

When the difference is less than 500 μm (DF-DFAV<500 μm), whether or not zooming was performed simultaneously with the 0.5 sec auto one-shot/continuous routine and whether or not focus detection was impossible four consecutive times are determined at steps #2410 and #2415, respectively.

When zooming was performed (ZMF=1) at step #2410 or focus detection was impossible four consecutive times (NLC=4) at step #2415, the process proceeds to step #2460 to set the AF lock mode.

When the results of both determinations are "No", the process proceeds to step #2420, where the previously-described moving subject determination routine (FIG. 37) is executed.

Then, the process proceeds to step #2425. At step #2425, whether or not focus detection was performed ten or more times in the auto one-shot/continuous routine is determined.

When focus detection was not performed ten or more times (NAF≧10), determining that the AF mode is the indetermination mode, the process proceeds to step #2455, where the AF mode is set to "2". Then, the process returns.

When NAF is ten or more (NAF≧10), the process from step #2430 is executed. When all of the moving subject speed of the retroactively ninth focus detection, that of the retroactively sixth focus detection, that of the retroactively third focus detection and that of the current focus detection are the predetermined speed KV or higher, determining that the moving subject mode is required (steps #2430 to #2445), and the process proceeds to step #2450, where the AF mode is set to "3". Then, the process returns.

When the speed is lower than the predetermined speed KV in at least one of the above determinations, the process proceeds to step #2455, where the AF mode is set to the indetermination mode.

Figure 42:
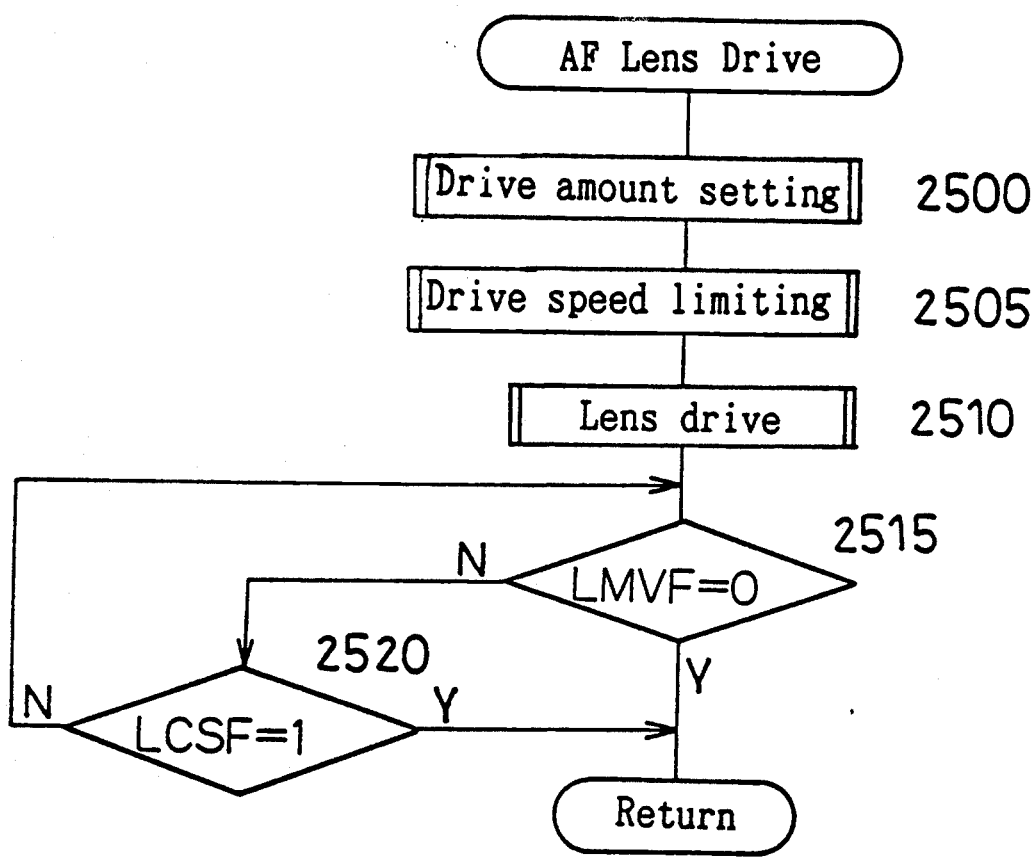
FIG. 42 is a flow chart of an AF lens drive subroutine executed by the intra-body microcomputer of the first embodiment of the present invention.

Finishing the description of the routines of the algorithm, an AF lens drive routine (executed at step #1310 of FIG. 23) will subsequently be described with reference to FIG. 42.

First, at step #2500, the amount by which the lens has to be driven is set. At step #2505, a flow for limiting, according to the currently set photographing mode (for example, the eye sensing mode), a drive speed obtained based on the set amount is executed. Then, the lens is driven (step #2510, the lens drive subroutine of FIG. 21), and whether the driving of the lens has been completed or not is determined (step #2515).

When the driving has not been completed (LMVF≠0), whether the low contrast scanning is being performed or not is determined (step #2520). When the low contrast scanning is being performed (LCSF=1), the process returns to perform focus detection while driving the lens. When the scanning is not being performed (LCSF=0), after waiting until the driving of the lens is completed (LMVF=0), the process returns. The process also returns when the driving has been completed (LMVF=0) at step #2515.

Figure 44:
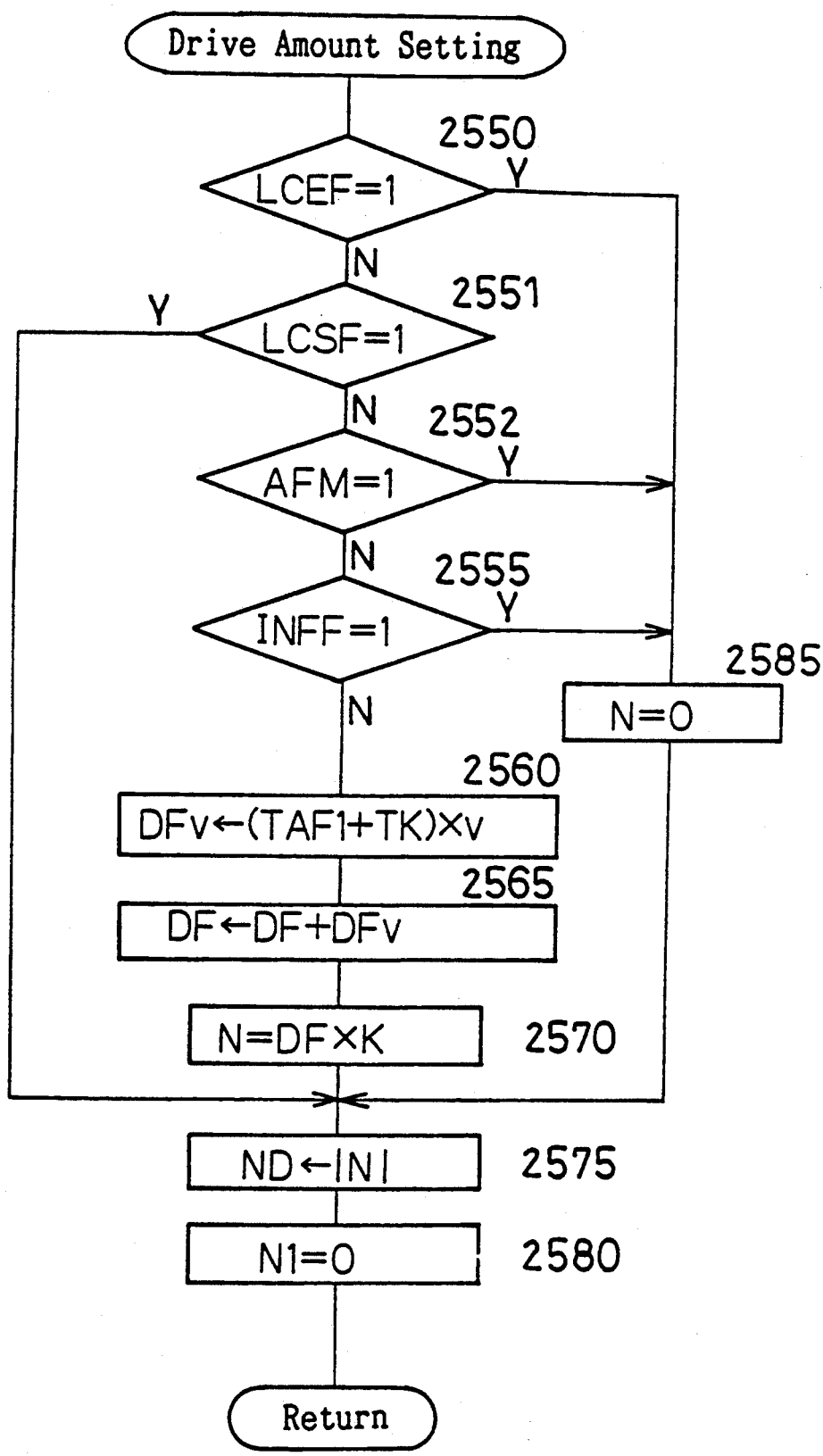
FIG. 44 is a flow chart of a drive amount setting subroutine executed by the intra-body microcomputer of the first embodiment of the present invention.

The above-mentioned drive amount setting routine (executed at step #2500 of FIG. 42) will be described with reference to FIG. 44.

At step #2550, whether focus detection is determined to be impossible or not is determined. When it is determined to be impossible (LCEF=1), the process proceeds to step #2585, where the drive amount N is set to "0". Then, the process proceeds to step #2575.

When the flag LCEF has not been set (LCEF≠1) at step #2550, whether the low contrast scanning mode is ON or not is determined at step #2551.

When the low contrast scanning mode is ON (LCSF=1), the process proceeds to step #2575. When the low contrast scanning mode is not ON (LCSF=0), whether the AF lock mode is ON or not is determined at step #2552. When the AF lock mode is not ON (AFM≠1), whether the in-focus condition has been obtained or not is determined at step #2555.

When the in-focus condition has not been obtained (INFF≠1) at step #2555, a defocus amount DFV which a subject moves during a total time of the integration time TAF1 and the time TK required for the defocus amount calculation is obtained at step #2560. Then, at step #2565, a new defocus amount DF is obtained based on the defocus amount DFV and the calculated defocus amount DF. Then, the lens drive amount N is obtained (N=DF×K) at step #2570, ND is set to |N| at step #2575, and a driven amount N1 of the lens is set to 0 at step #2580. Then, the process returns.

When the AF lock mode is ON (AFM=1) at step #2550 or when the in-focus condition has been obtained (INFF=1) at step #2555, after the drive amount is set to "0" at step #2585, the process proceeds to step #2575.

Figure 43:
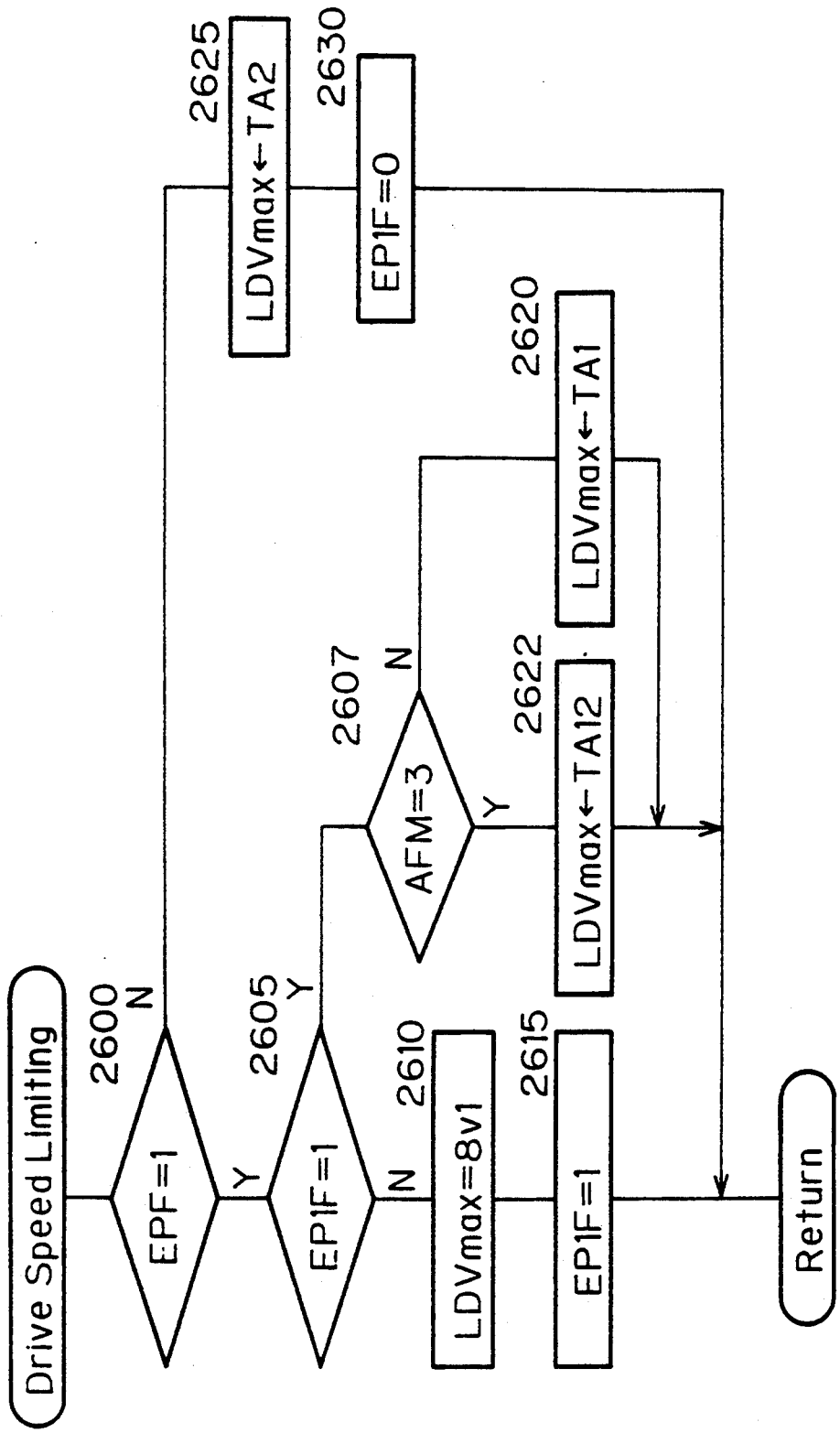
FIG. 43 is a flow chart of a drive speed limiting subroutine executed by the intra-body microcomputer of the first embodiment of the present invention.

Subsequently, a drive speed limiting routine will be described with reference to FIG. 43.

First, at step #2600, whether the eye sensing mode is ON or not is determined.

When the eye sensing mode is not ON (EPF≠1), a drive speed corresponding to the rotation number ND which is set at the above-described step is limited to LDVmax based on Table 1 (TA2). At step #2630, a subsequently-described flag EP1F is reset (EP1F=0). Then, the process returns.

When the eye sensing mode is ON (EPF=1), whether it is a first-time lens drive in the eye sensing mode or not is determined at step #2605.

When it is a first-time lens drive (EP1F=0), at step #2615, the speed limit is set to 8V1 which is the maximum speed in the eye sensing mode in order to provide an effect of the one-shot AF. At step .#2615, the flag EP1F is set (EP1F=1). Then, the process returns.

When it is not a first-time lens drive (EP1F=1), the maximum speed LDFmax which is in accordance with the rotation number is set based on Table 1 (TA1) if the moving subject mode is not ON (AFM≠3) (step #2620) and based on Table 1 (TA12) if the moving subject is ON (AFM=3) (step #2622). Then, the process returns.

In order to quietly move the lens when only the user's looking through the finder starts the lens drive, the maximum speed LDVmax is set to be lower when the eye sensing mode is ON (that is, when EPF=1 at step #2600) than when the switch S1 is depressed without the user's looking through the finder (that is, when EPF≠1 at step #2600). Moreover, in order to capture a subject as soon as possible, the maximum speed LDVmax is set to high when the moving subject mode is ON.

Actually, the lens drive is more frequently started by the user's looking through the finder than by the depression of the switch S1. However, the lens drive speed is strictly limited in order to ordinarily move the lens during an AF operation. On the other hand, when the lens drive is started by the depression of the switch S1, priority is given to focusing speed rather than to quietness or ordinary, since, in this case, the user intends to perform focusing as a photographing preparation.

Returning to the flow chart of FIGS. 13, 14 and 15, when the process returns from the previously-mentioned AF control subroutine (step #540 of FIG. 14), the process proceeds to step #542 where the zoom control subroutine is executed. After zooming is completed, the process proceeds to step #560. Moreover, when it is determined that the photographing preparation switch S1 is not ON at step #535, the process proceeds to step #545, where whether or not the flag LMVF showing that the lens is being moved has been set is determined. When the flag LMVF has been set, after the AF lens stop subroutine (FIG. 9) is executed at step #550, the process proceeds to step #542. When the flag LMVF has not been set, skipping step #550, the process proceeds to step #542.

The zoom control subroutine will be described with reference to FIG. 45.

Firstly, at step #2650, the zoom drive speed is set to I (low speed). Then, at step #2655, whether the auto stand-by zoom is ON or not is determined.

The auto stand-by zoom is a zooming operation which is performed based on a focal length determined according to a subject size estimated based on a distance to a main subject determined in the main subject determination subroutine in focus detection in the eye sensing mode. The auto stand-by zoom is performed only once.

When the auto stand-by zoom is ON (ASZF=1), an appropriate focal length f1 is obtained, by use of a ROM table, from the distance D obtained for the auto stand-by zoom (steps #2657, and #2660).

Figure 46:
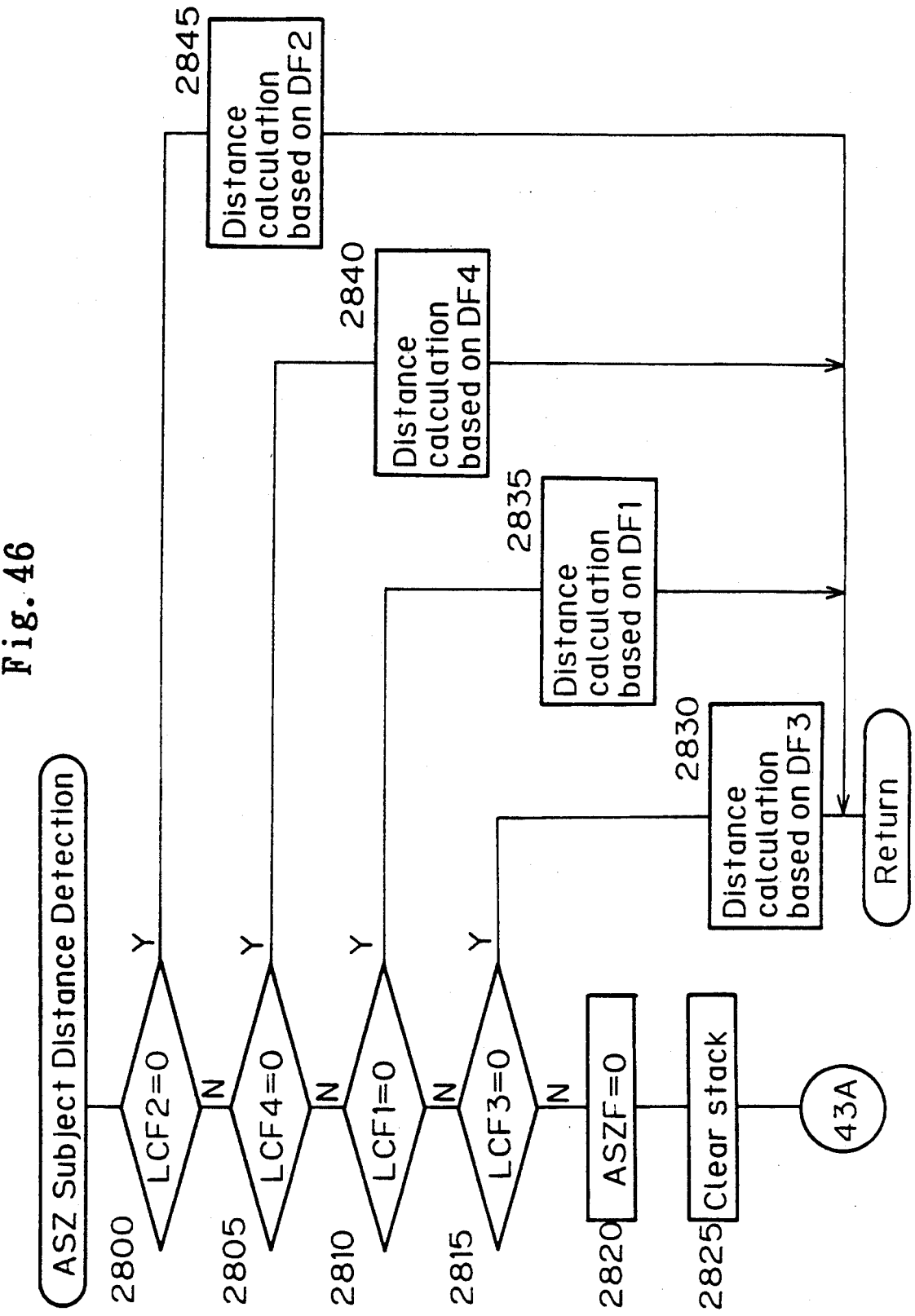
FIG. 46 is a flow chart of an ASZ subject distance determination executed by the intra-body microcomputer of the first embodiment of the present invention.

Now, an ASZ (auto stand-by zoom) subject distance detection subroutine (step #2657) will concretely be described with reference to FIG. 46.

In focus detection, a multi-point distance measurement of four points is performed as shown in FIGS. 18 and 19. In the auto stand-by zoom, a subject can be out of the image plane, for example, if a distance measurement is performed with respect to the distance measurement areas c and d of FIG. 18 and zooming-up is performed based on a distance measurement value thereof. Therefore, for the auto stand-by zoom, zooming is preferably performed based on distance measurement data obtained with respect to a central distance measurement area when the distance measurement has been performed with respect to the central distance measurement area. For this reason, the data obtained in the flow of FIGS. 30, 31, 32, 33 and 34 are checked again in the flow of FIG. 46. In this routine, a first, a second, a third and a fourth distance measurement positions correspond to the left, central, right and upper positions of FIG. 19, respectively, and DF1, DF2, DF3 and DF4 are distance measurement data with respect to respective positions. The determination of the distance measurement data is made in the order of DF2, DF4, DF1 and DF3. When the distance measurement data DF2 with respect to the second distance measurement position is obtained (step #2800), the subject distance is calculated based on the data DF2 (step #2845), and the process returns. When the central position is of low contrast and the distance measurement data DF4 with respect to the fourth distance measurement position is obtained (step #2805), the subject distance is calculated based on the data DF4 (step #2840), and the process returns. Subsequently, the determination of DF1 of the left position and DF3 of the right position and calculation of the subject distance based on respective data are performed in the same manner (steps #2810, #2835, #2815 and #2830). Then, the process returns.

Figure 45:
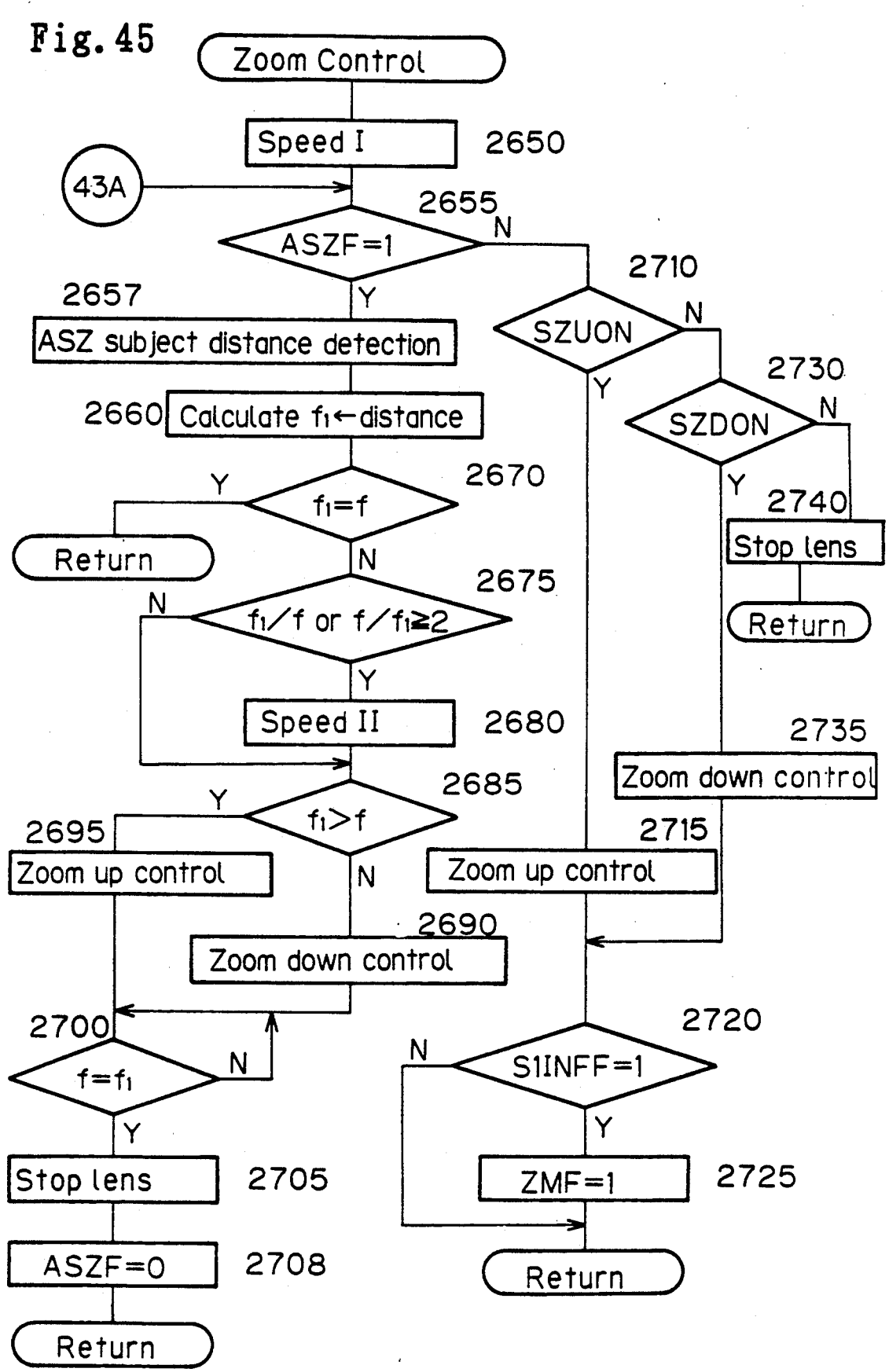
FIG. 45 is a flow chart of a zoom control subroutine executed by the intra-body microcomputer of the first embodiment of the present invention.

When all of the four positions are of low contrast, the flag ASZF is reset (ASZF=0) in order to inhibit the auto stand-by zoom at step #2820, a stack of the microcomputer is cleared at step #2825, and the process jumps to 43A to return to the flow chart of FIG. 45. That is, the subject distance is calculated based on a data obtained with respect to a distance measurement area which is as close to the optical axis of the taking lens as possible, and the auto stand-by zoom is performed based on the subject distance; the auto stand-by zoom is not performed when the distance measurement is impossible. Moreover, in only the auto stand-by zoom, priority is given to the data obtained with respect to the central distance measurement position.

Then, whether the current focal length f is equal to the focal length f1 or not is determined (step #2670). When it is equal to f1, the process returns. When it is not equal to f1, whether or not a ratio between f and f1 (f/f1 or f1/f) is 2 or higher is determined (step #2675). When it is 2 or higher, the zoom speed is set to II (high speed) at step #2680 and the process proceeds to step #2685. When the ratio is lower than 2, the process proceeds directly to step #2685.

At step #2685, whether f1>f or not is determined. When f1>f, zoom up control is performed (step #2695). When f1<f, zoom down control is performed (step #2690). Then, zooming is performed at the speed which is set at the above-mentioned step, and the process waits until f=f1. When f=f1, the lens is stopped (step #2705), and the flag ASZF is reset (step #2708). Then, the process returns.

When the flag ASZF has not been set (ASZF≠1) at step #2655, whether or not the zoom up switch SZU or the zoom down switch SZD has been operated is determined (steps #2710 and #2730). When the switch SZU or SZD has been operated, zooming up (step #2715) or zooming down (#2735) is performed at a low speed. Then, the process proceeds to step #2720, where whether or not the in-focus condition has been obtained after the switch S1 had been depressed is determined. When the in-focus condition was obtained after the switch S1 had been depressed (S1INFF=1), a flag ZMF showing that zooming has been performed is set (ZMF=1, step #2725), and the process returns. Otherwise (S1INFF≠1), the process directly returns.

When neither switch SZU or SZD has been operated at steps #2710 and #2730, the process proceeds to step #2740, where the zoom lens is stopped. Then, the process returns.

Returning to the V flow of FIG. 14, at step #560, a film sensitivity SV is inputted from the film sensitivity reading circuit DX. At step #565, a luminance BV0i (i=1, to 14) of a subject at open aperture is inputted from the photometry circuit LM.

The data input will be described with reference to the previously-mentioned FIG. 4. First, the level of the terminal CSDX or CSLM is set to low, and a circuit from which a data is inputted is selected (between DX and LM). Then, the data is inputted through the terminal SIN. When the data input is completed, the level of the terminal CSDX or CSLM is changed to high to finish the data input.

Figure 22:
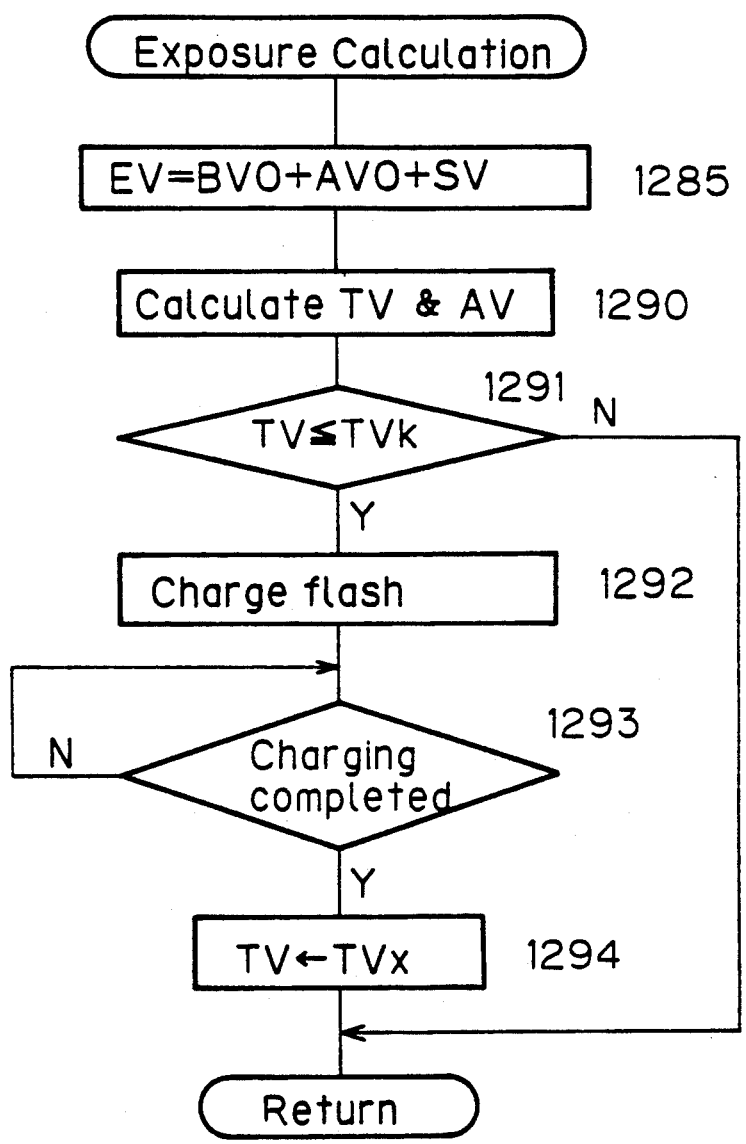
FIG. 22 is a flow chart of an exposure calculation executed by the intra-body microcomputer of the first embodiment of the present invention.

At step #570, a photometry value BV0 is calculated based on the BV0i (i=1 to 14). At step #575, an exposure calculation subroutine (FIG. 22) is executed.

When the exposure calculation subroutine is called, first, an exposure value EV is obtained by EV=BV0+AV0+SV at step #1285. BV0 is a subject luminance value obtained in an exposure measurement at open aperture, AV0 is an open aperture value and SV is a film sensitivity. A shutter speed TV and an aperture value AV are calculated from the exposure value EV based on a predetermined AE program line (step #1290). Then, whether or not the obtained shutter speed TV is a predetermined value TVk or lower is determined (step #1291). When it is the predetermined value TVk or lower, determining that hand shake will easily occur, the flash is charged in order to control flash (step #1292). The process waits until the charging is completed (step #1293). When a signal indicating that the charging is completed is transmitted from the flash control portion FL, the shutter speed is set to a synchronizing speed TVx, and the process returns (step #1294). Conversely, when TV>TVK, the process immediately returns. The AE program line is a program line for providing a relationship between the shutter speed and the aperture value. The description and drawing thereof will be omitted.

Returning to FIG. 14, after the exposure calculation is completed, data on a control shutter speed TVC, a control aperture value AVC, an AF area, focus condition, presence/absence of a moving subject and impossibility of focus detection are serially outputted to the display control circuit DISPC. Based on the inputted data, the display control circuit DISPC causes the display portion DISPI, the display portion DISPII and the display portion DISPIII to provide a display (step #590).

After the display, whether the release switch S2 is ON or not is determined at step #595.

When the release switch S2 is ON, whether the in-focus condition has been obtained or not is determined by the flag INFF at step #610. When the in-focus condition has been obtained (INFF=1), the process proceeds to step #615. When the in-focus condition has not been obtained, the process proceeds to step #638 without a release operation being performed.

At step #615, all the interrupts are inhibited. At step #620, exposure control is performed. After the exposure control is completed, film is advanced by one frame at step #625. Then, in order to show that the S1ON subroutine is completed, the flag S1ONF is reset (S1ONF=0) at step #630. At step #632, the interrupt STINT applied by the turning on of the switch S1 is permitted. At step #634, the timer interrupt I for eye sensing is permitted at step #634. After the timer for the timer interrupt I is reset and started (step #635), the process returns.

When it is determined that the release switch S2 is not ON at step #595, the process proceeds to step #638 similarly to the case where it is determined that the in-focus condition has not been obtained at step #610. At step #638, whether the photographing preparation switch S1 is ON or not is determined.

When the photographing preparation switch S1 is ON, a timer T2 for maintaining power source is reset and started at step #640, and the process returns.

When it is determined that the photographing preparation switch S1 is not ON at step #638, whether or not the flag EPF showing that it has been sensed that the user is looking through the finder has been set is determined (step #644). When it has been set (EPF=1), the process returns to step #500.

When the flag EPF has not been set (EPF≠1), the process proceeds to step #650, where whether zooming is being performed or not is determined based on a zoom switch data.

When zooming is being performed, the process proceeds to step #640, where the timer T2 for maintaining power source is reset and started in order to extend a power source maintaining time. Then, the process returns. When it is determined that zooming is not being performed at step #650, the process proceeds to step #655, where whether or not five seconds have passed since the timer T2 was started is determined. When five seconds have not passed, the process returns. When five seconds have passed, the process proceeds to step #630, where photographing completion control initiated by the turning off of the switch S1 is performed.

Returning to the flow chart of FIG. 5, when it is determined that the main switch SM is not ON at step #20, the process proceeds to step #80, where interrupts other than the interrupt SMINT which is applied by the turning on of the main switch SM are inhibited. Then, the AF lens moving-in subroutine is executed (step #90).

Thereby, the AF lens is moved to the most moved-in position. This operation is not described here, since it has already been described.

After the AF lens moving-in subroutine (FIG. 6) is executed, the level of the terminal PW1 is set to low in order to disable the transistor Tr1 which supplies power to circuits provided in the camera body BD and to the zoom motor M3 provided in the lens LE (step #120). Further, the level of the terminal PW0 is set to low in order to disable the DC/DC converter DD (step #125). Then, after interrupts other than the interrupt SMINT applied by the turning on of the main switch SM are inhibited (step #130), the process halts (enters the sleep condition).

In-image-plane displays and out-of-image-plane AF condition displays which are provided when the AF mode is ON (where a wide area is selected) will be described with reference to FIG. 47.

(a) is a display provided when the main switch is OFF.

(b) is a display provided when the main switch is ON.

(c) is a display when it is sensed that the user is looking through the finder after the main switch is turned on. At this time, the wide area is displayed. In the spot mode, the central portion is displayed.

(d) is a display provided when the in-focus condition is obtained by an AF operation. At this time, an out-of-image-plane display <o> is turned on.

(e) is a display provided when the moving subject mode is ON. Out of the image plane, o is turned on and only < > blinks.

(f) is a display provided until the in-focus condition is obtained by an AF operation not in the eye sensing mode but under the S1ON condition.

(g) is a display provided in the AF lock mode or during the auto one-shot/continuous detection which is made after the switch S1 is turned on. When the subject is moving, (e) is displayed. Out of the image plane, o is turned on.

(h) is a display provided during the 0.5 sec auto one-shot/continuous detection. Out of the image plane, <o> is turned on.

(i) is a display provided when focus detection is impossible (LCEF=1). The central o blinks.

Next, displays provided when a manual focusing mode is ON will be described with reference to FIGS. 48A and 48B.

(J) is a display provided in an FA (focus aid) mode (when the wide area is selected).

(K) is a display provided when the switch S1 is turned on. An in-focus area is displayed, if any, while the user is looking through the finder. The presence/absence of the in-focus area is determined by the flags INFF1 to INFF4.

(L) is a display, similar to (K), provided when the switch S1 is turned on.

(N) is a display provided in the spot AF mode (while the user is looking through the finder).

(O) is a display, similar to (N), provided when the switch S1 is turned on.

In this embodiment, as described above, the in-focus condition is immediately obtained when the user looks through the finder during an eye-start AF operation. That is, an AF operation is performed at a high speed until the first-time in-focus condition is obtained. The in-focus display is not provided at this time.

After the first-time in-focus condition is obtained, the in-focus condition is always maintained even if the subject distance is varied, and an AF operation is quietly performed during focusing without causing the user to be conscious of AF operation. As a result, framing is smoothly performed. This is because a silent continuous AF is performed at a low speed after the first-time in-focus condition is obtained. Therefore, the user realizes that the camera is always under a stand-by condition so that release can be performed at any time. After the first-time in-focus condition is obtained, the in-focus display is turned on so far as the in-focus is obtained. Simultaneously therewith, the release is enabled.

Subsequently, variations (second to fourth embodiments) of the above-described first embodiment will be described.

The variations are different from the first embodiment in:

(i) that no low contrast scanning is performed when the eye sensing mode is ON;

(ii) that no auxiliary light is emitted when the eye sensing mode is ON; and (iii) that AF lock mode (continuous AF) is not set when the eye sensing mode is ON.

The reason for the above differences will be described.

Concerning (i), the reason is that, when the eye sensing mode is inadvertently set, it is not desirable that the lens is driven in the entire range when focus detection is determined to be impossible by eye sensing which is performed, for example, while the user is holding the camera by the grip portion about he or her waist or when the eye sensing portion senses something other than the user's eye and the periphery thereof.

This causes problems such as an increase in power consumption and a noise caused by an unintended lens drive.

Concerning (ii), the reason is that power consumption increases if auxiliary light is emitted every time an AF operation is performed in the eye sensing mode where the AF mode is usually set to "continuous".

Concerning (iii), the reason is that, since the subject is usually securely captured when the switch S1 (which is always depressed to perform photographing) is depressed, if the subject which was determined therebefore is AF-locked, it is often impossible to focus the camera on a subject intended by the user.

Moreover, when the switch S1 is not being operated, subjects are frequently changed since the user is looking through the finder to look for a subject. When subjects have been changed, trouble is caused if the subject which was determined therebefore is AF-locked. Therefore, the AF lock mode is not set.

The second to fourth embodiments will be described with reference to the drawings where only portions different from the first embodiment are shown.

In the second embodiment, the defocus amount calculation subroutine and the moving subject determination subroutine are partly different from those (FIGS. 30 to 34, and FIG. 37) of the first embodiment.

In the second embodiment, the defocus amount calculation subroutine consists of the P flow (FIG. 30), the Qa flow (FIG. 31), an Rb flow (FIG. 49), an Sb flow (FIG. 50) and the T flow (FIG. 34). That is, the Rb flow of FIG. 49 and the Sb flow of FIG. 50 are variations of the Ra flow of FIG. 32 and the Sa flow of FIG. 33 of the first embodiment, respectively. First, the different portions will be described.

Figure 49:
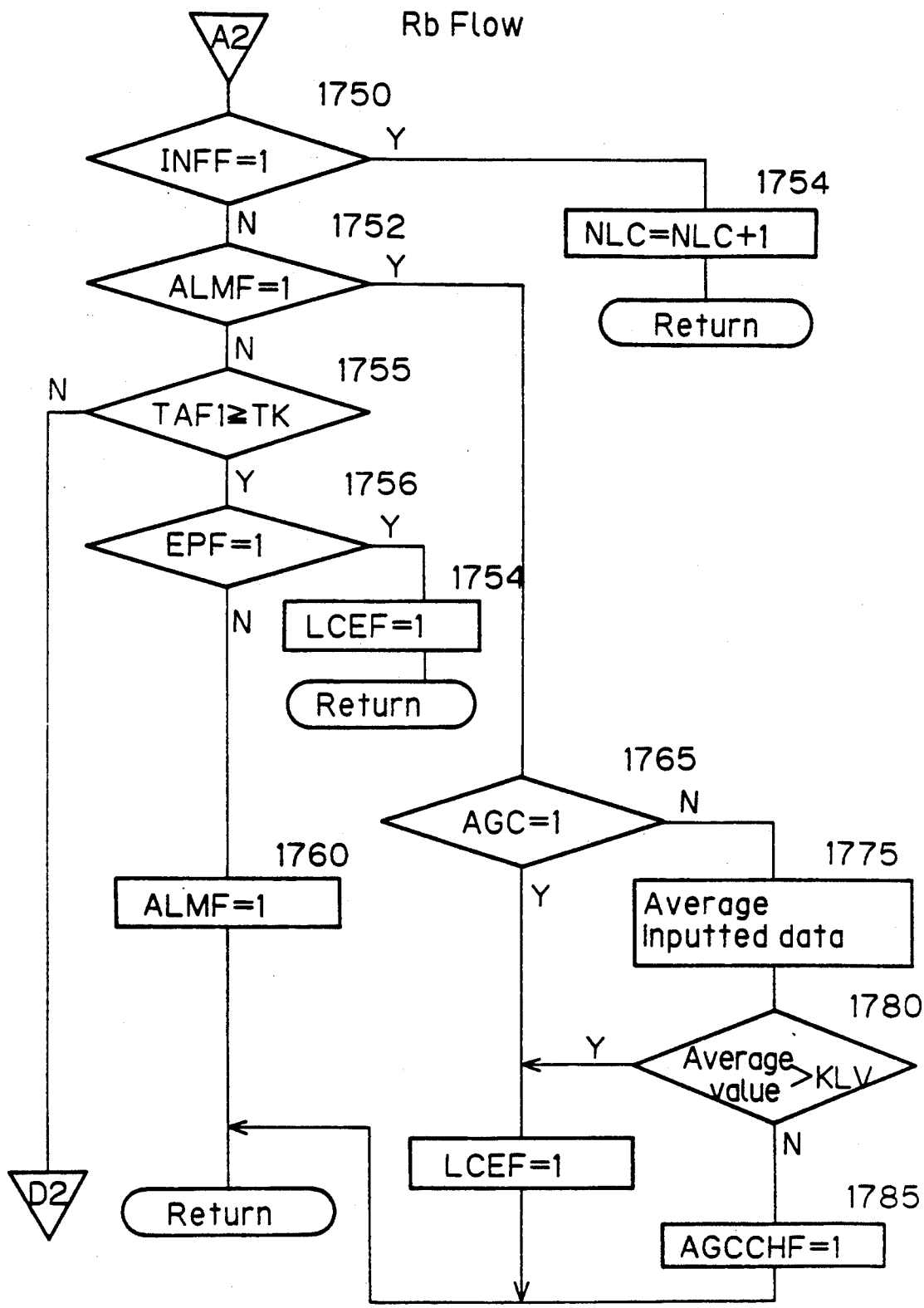
FIG. 49 is a flow chart of an Rb flow, which is a variation of the Ra flow (FIG. 32) of the first embodiment of the present invention, executed by the intra-body microcomputer of a second embodiment of the present invention.
Figure 50:
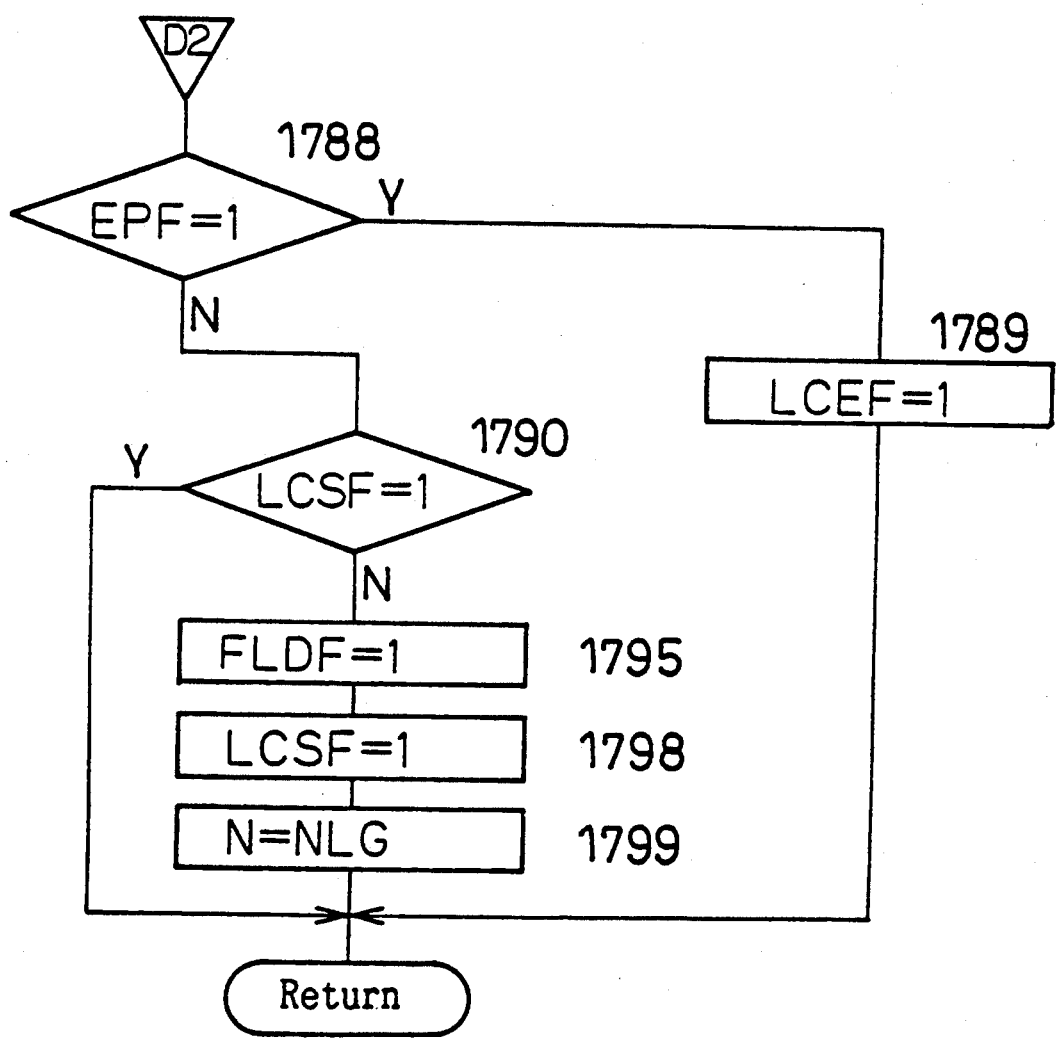
FIG. 50 is a flow chart of an Sb flow, which is a variation of the Sa flow (FIG. 33) of the first embodiment of the present invention, executed by the intra-body microcomputer of the second embodiment of the present invention.

In FIG. 49, when the integration time TFA1 is the predetermined time TK or more (TAF1≧TK) at step #1755, the process proceeds to additional step #1756, where whether the eye sensing mode is ON or not is determined.

When the eye sensing mode is ON (EPF=1), the flag LCEF is set (LCEF=1) in order to provide a display showing that focus detection is impossible so that the auxiliary light mode is not set, and then, the process returns.

Figure 32:
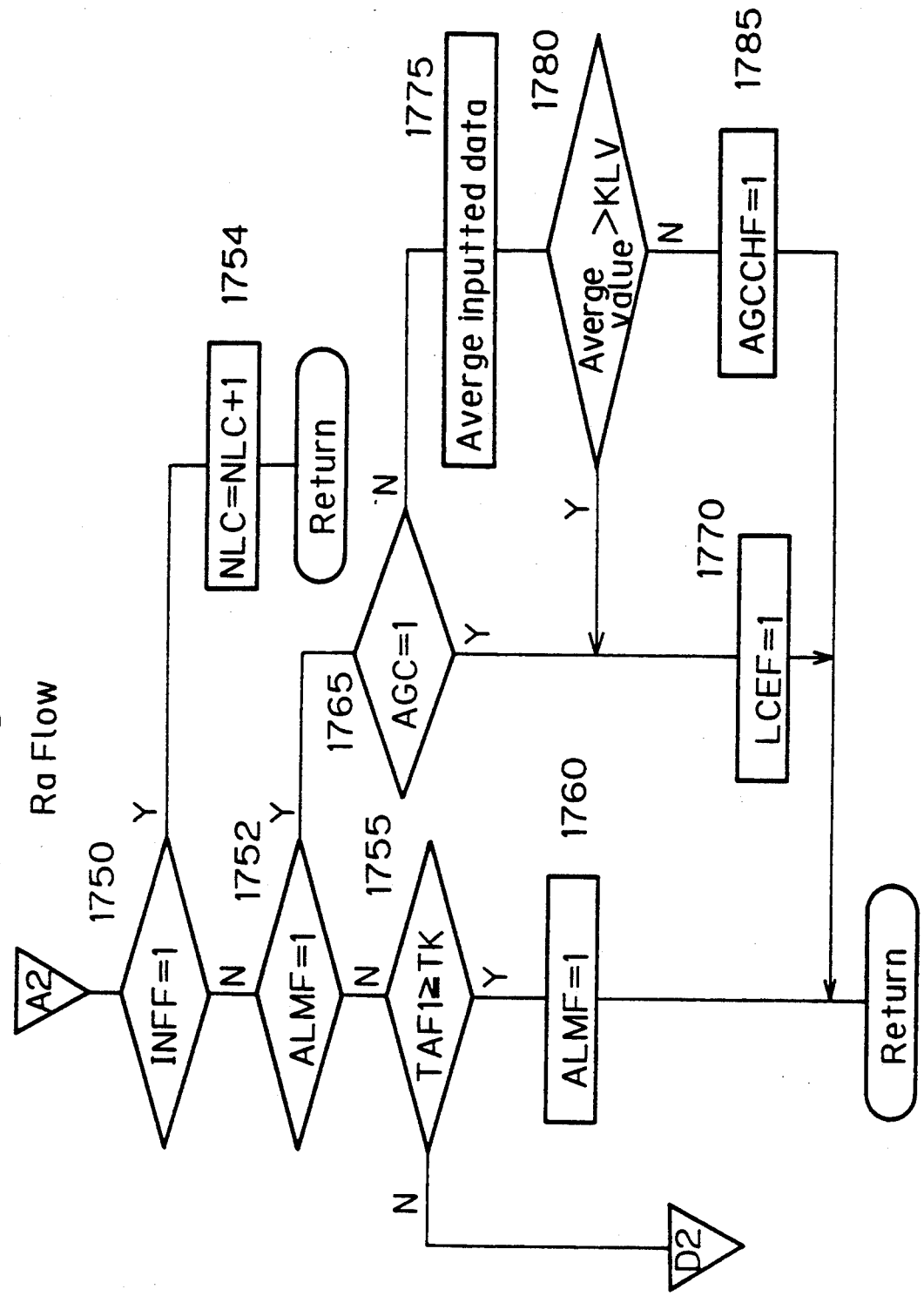
FIG. 32 is a flow chart of an Ra flow of the defocus amount calculation subroutine executed by the intra-body microcomputer of the first embodiment of the present invention.

When the eye sensing mode is not ON (EPF≠1), the previously-described process from step #1760 is executed (FIG. 32).

When the integration time is less than the predetermined time TK (TAF1<TK) at step #1755, the process proceeds to step #1788 of the Sb flow (FIG. 50). At step #1788, whether the eye sensing mode is ON or not is determined.

When the eye sensing mode is ON (EPF=1), the flag LCEF is set (LCEF=1) in order to provide a display showing that focus detection is impossible so that the low contrast scanning mode is not set, and then, the process returns.

Figure 33:
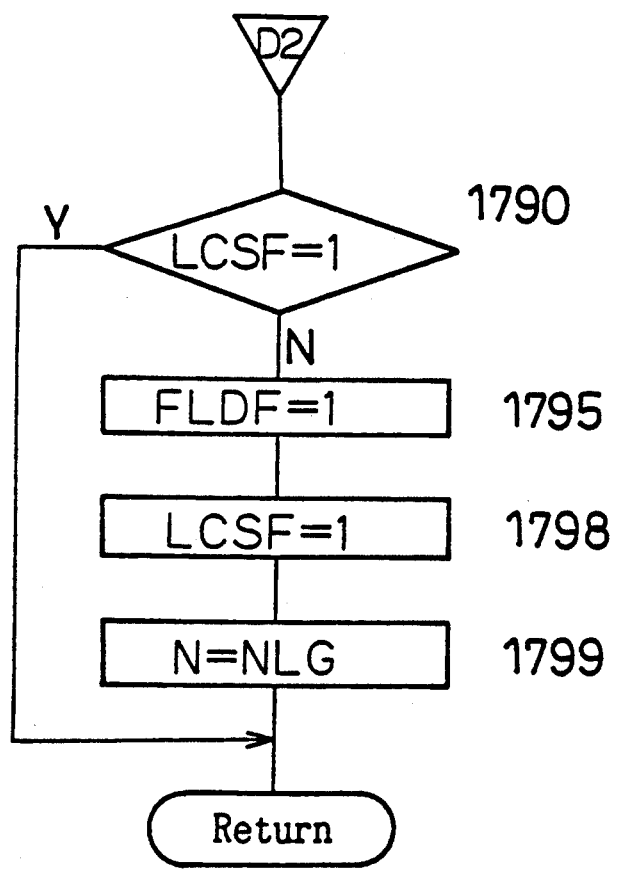
FIG. 33 is a flow chart of an Sa flow of the defocus amount calculation subroutine executed by the intra-body microcomputer of the first embodiment of the present invention.
Figure 34:
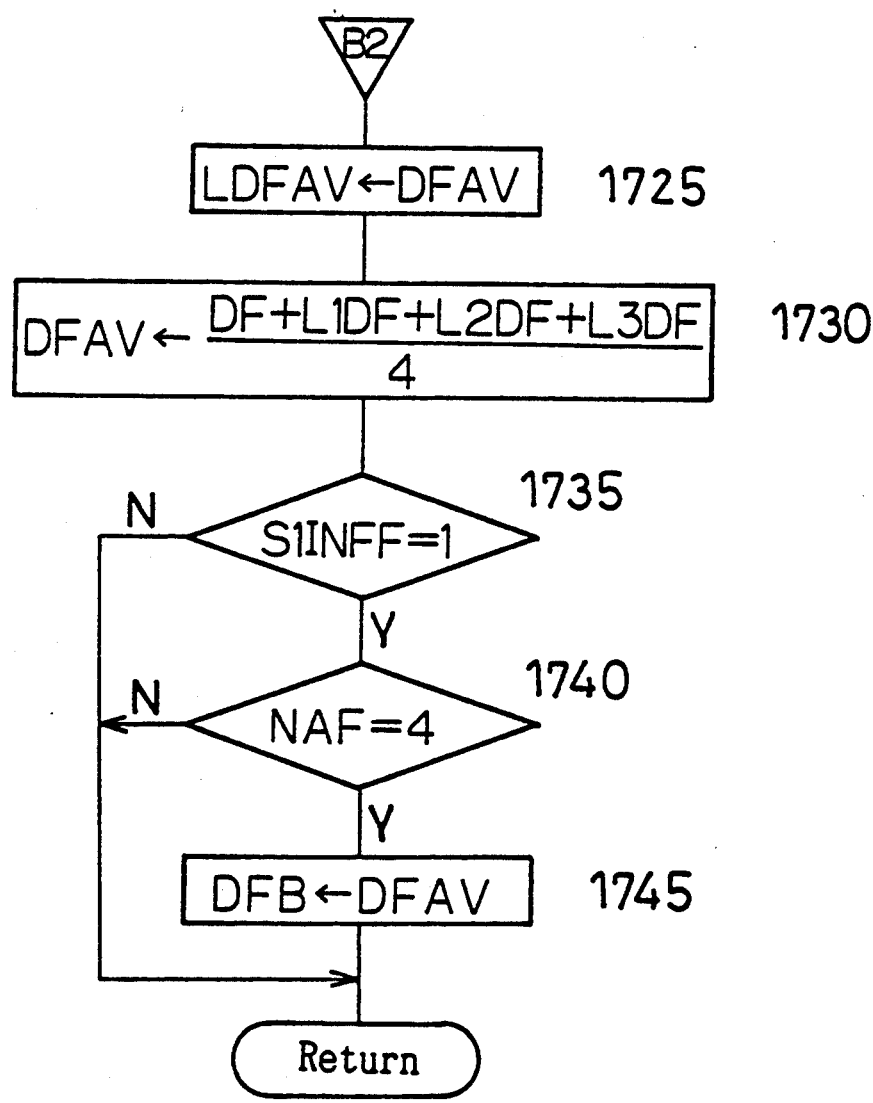
FIG. 34 is a flow chart of a T flow of the defocus amount calculation subroutine executed by the intra-body microcomputer of the first embodiment of the present invention.

When the eye sensing mode is not ON (EPF≠1), the previously-described process from step #1790 is executed (FIG. 33).

Figure 37:
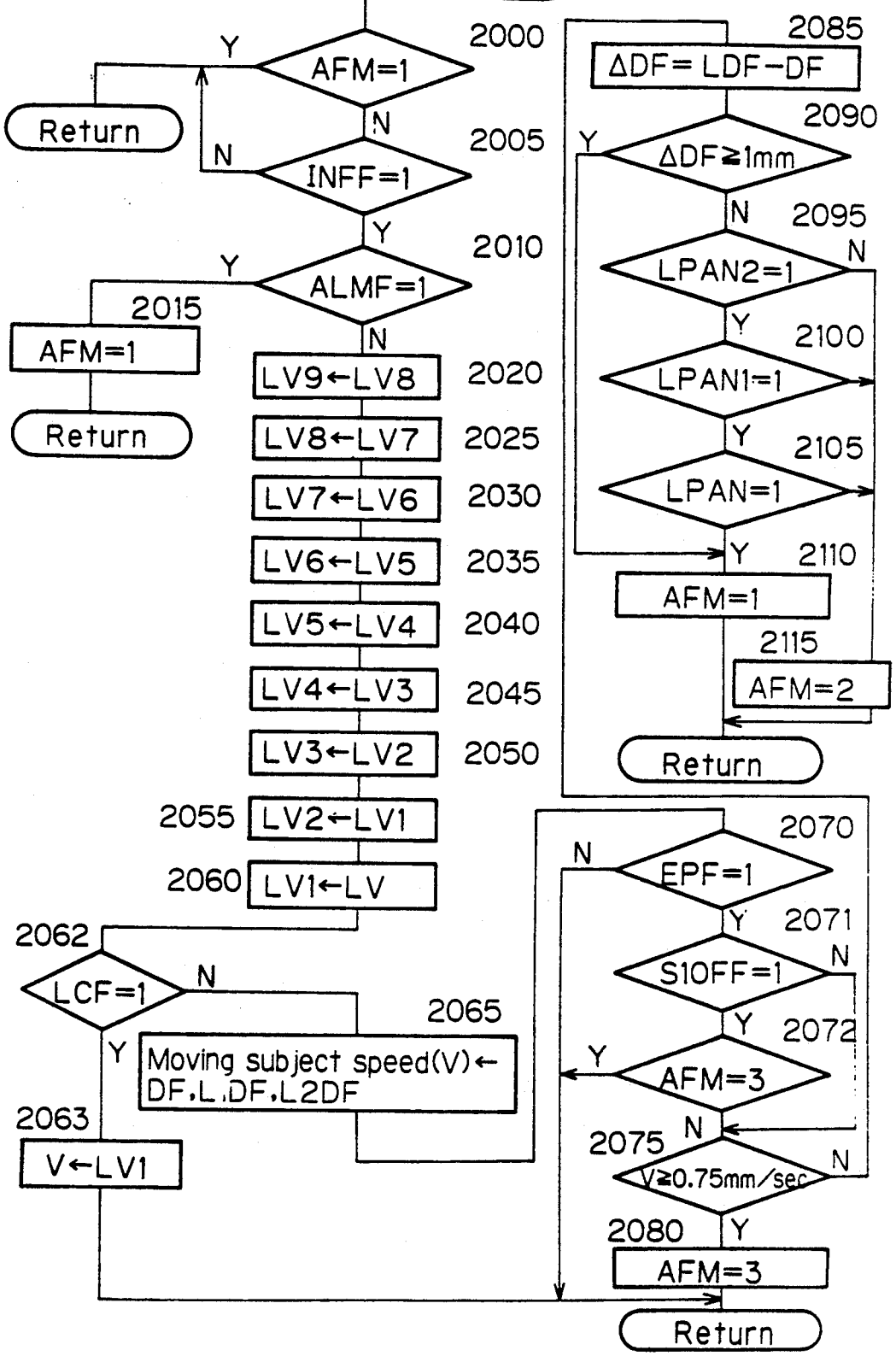
FIG. 37 is a part of a flow chart of a moving subject determination subroutine executed by the intra-body microcomputer of the first embodiment of the present invention.
Figure 51:
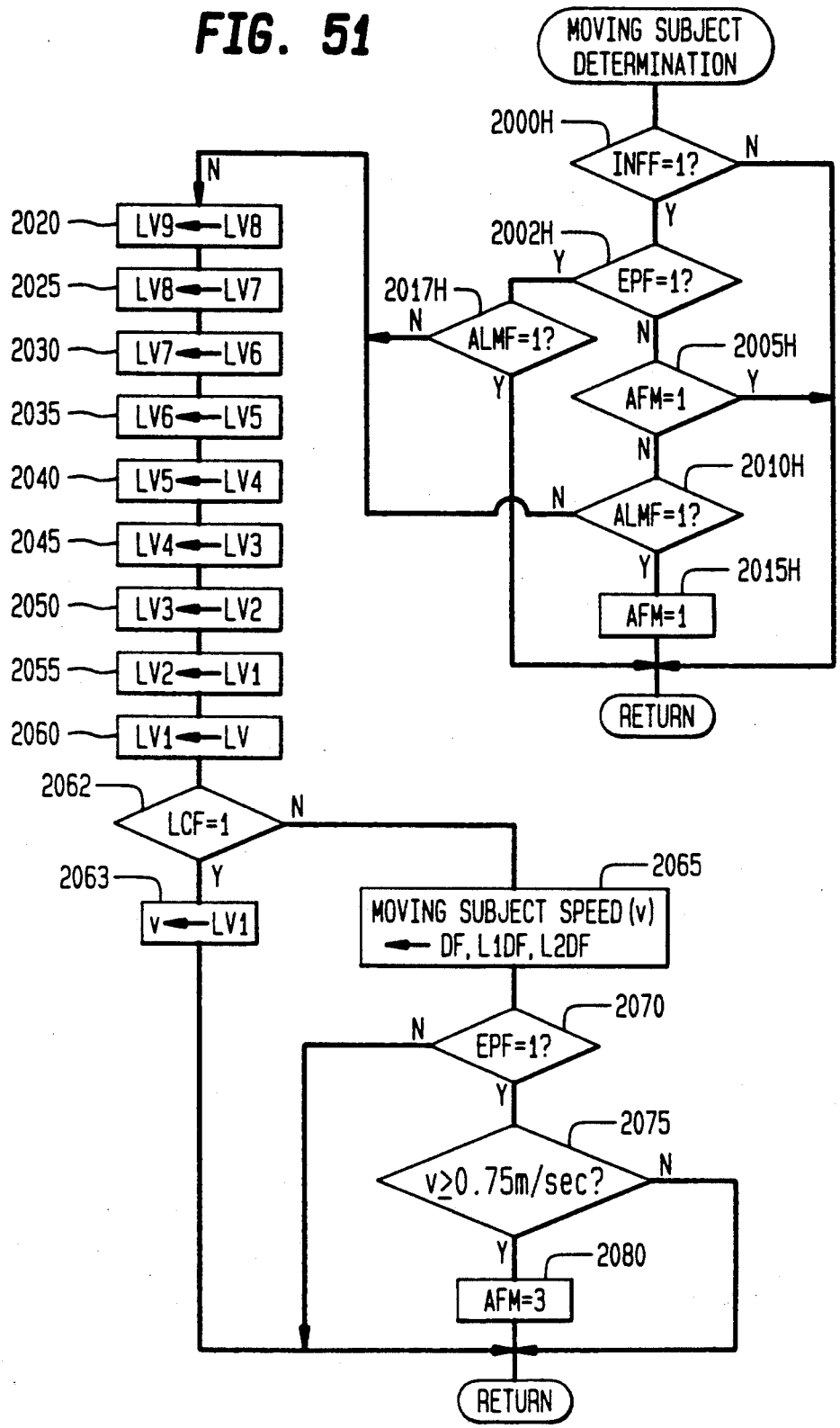
FIG. 51 is a flow chart of a subroutine, which is a variation of the flow chart of the moving subject determination subroutine (FIG. 37) of the first embodiment of the present invention, executed by the intra-body microcomputer of the second embodiment of the present invention.

FIG. 51 shows a variation of the moving subject determination of FIG. 37. Only the portions different from those of the flow of FIG. 37 will be described.

First, at step #2000H, whether the in-focus condition has been obtained or not is determined. When the in-focus condition has not been obtained (INFF=0), the process returns. When the in-focus condition has been obtained (INFF=1), whether the eye sensing mode is ON or not is determined (step #2002H).

When the eye sensing mode is ON (EPF=1), the process proceeds to step #2017H, where whether the auxiliary light mode is ON or not is determined. When the auxiliary light mode is ON (ALMF=1), the process returns without the moving subject determination being made. The AF lock mode is not set at this time. When the auxiliary light mode is not ON (ALMF=0), the process proceeds to step #2020, where the process similar to that of FIG. 37 is executed.

When the eye sensing mode is not ON (EPF=0), whether the AF lock mode is ON or not is determined at step #2005H. When the AF lock mode is ON (AFM=1), the process returns. When the AF lock mode is not ON (AFM=0), whether the auxiliary light mode is ON or not is determined at step #2010H.

When the auxiliary light mode is ON (ALMF=1), after the AF lock mode is set (AFM=1) at step #2015H, the process returns. When the auxiliary light mode is not ON (ALMF≠1), the process proceeds to step #2020.

In FIG. 37 of the first embodiment, the determination of the AF lock is made after step #2075. On the contrary, in FIG. 51, the process returns when the speed V on the image plane is lower than 0.75 mm/sec at step #2075. This is for preventing the setting of the AF lock by deleting the determination of the AF lock.

Figure 47:
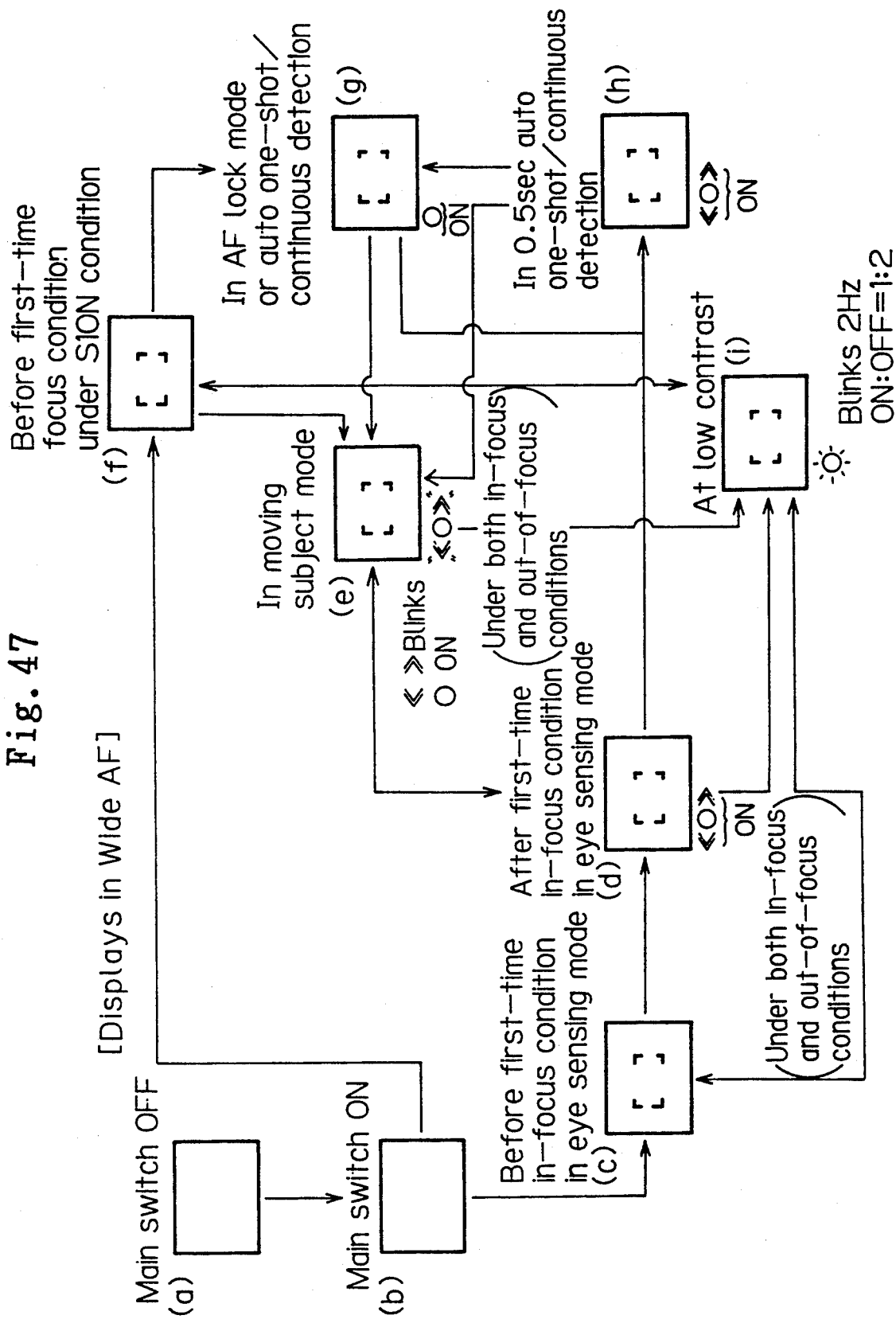
FIG. 47 shows displays provided within the finder and AF condition displays provided out of the finder in an AF mode (where a wide area is selected) in the first embodiment of the present invention.
Figure 52:
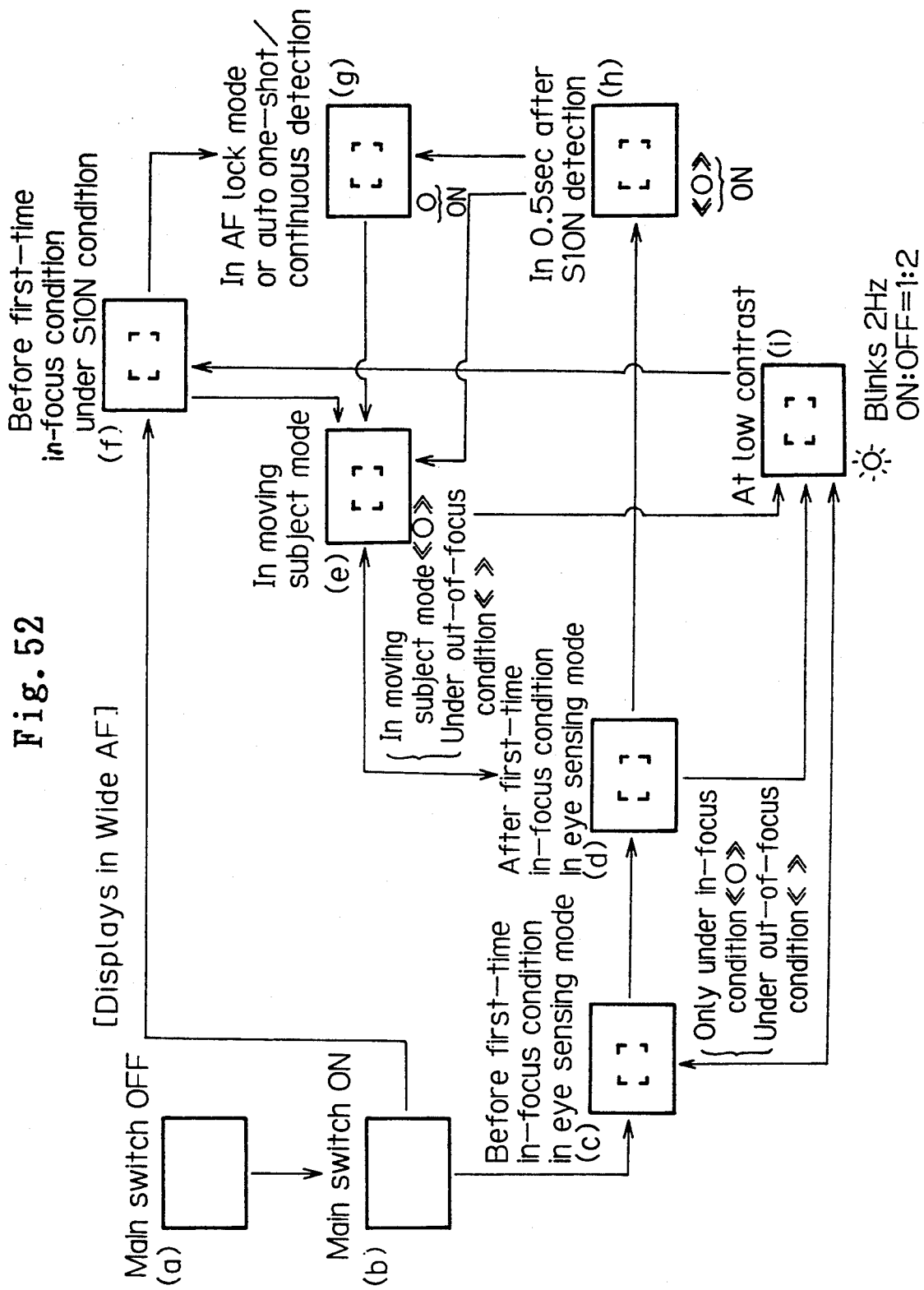
FIG. 52 shows displays provided within the finder and AF condition displays provided out of the finder in the AF mode (where the wide area is selected) in the second embodiment of the present invention.

Concerning the displays, they are partly different from those of FIG. 47. The shift from (d) to (g) is deleted as shown in FIG. 52.

Moreover, when (d) is displayed, after a first-time in-focus condition is obtained, <○> is displayed under the in-focus condition and < > is displayed under the out-of-focus condition. Further, similar displays are provided with respect to (e) and (d) when the moving subject mode is ON.

In the above-described second embodiment, low contrast scanning is not performed when the eye sensing mode is ON. However, in the subsequently-described third embodiment, low contrast scanning is performed only when it is necessary, and thereby the number of times thereof is reduced. Low contrast scanning is necessary when focus detection possible range DFEN along the optical axis is smaller than a defocus range DFRA (from a minimum object distance to infinity) of the lens.

Figure 53:
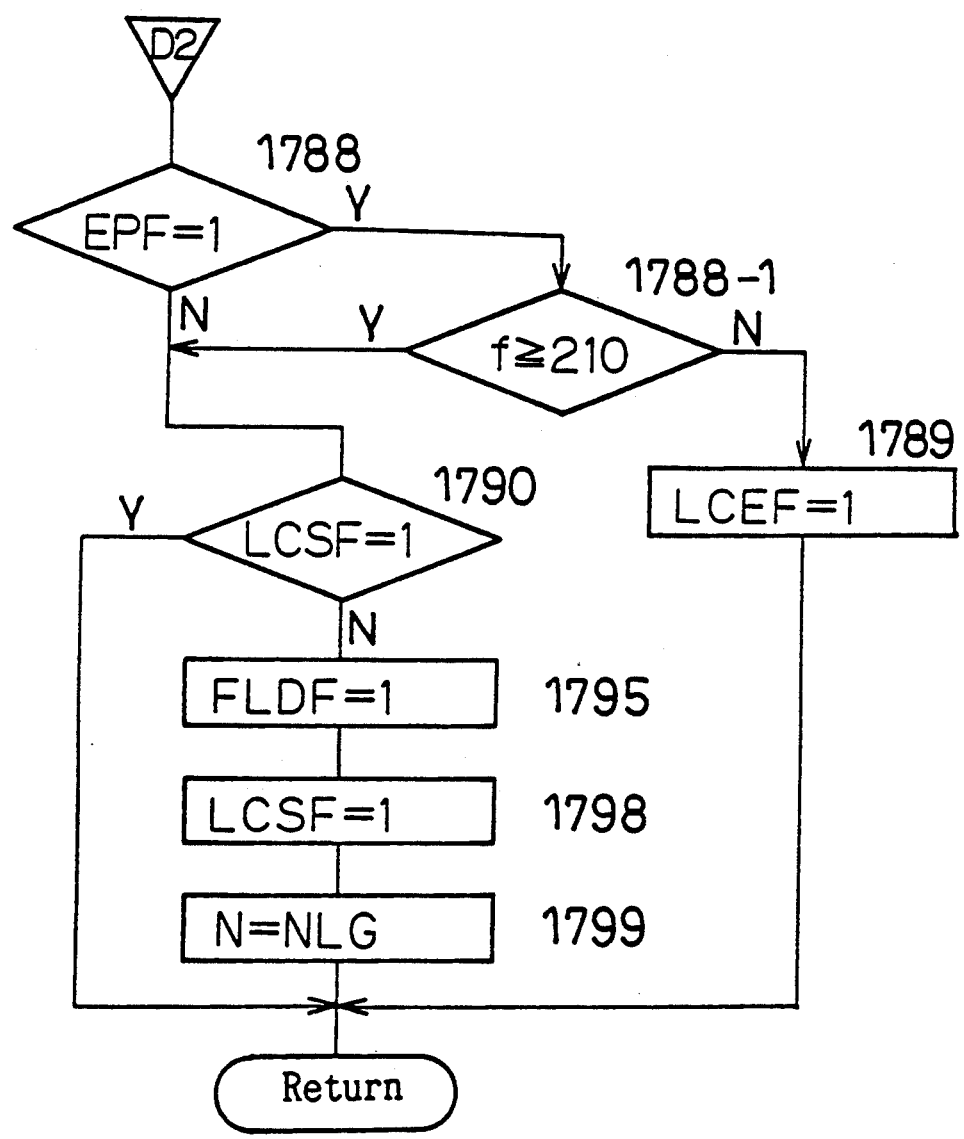
FIG. 53 is a flow chart of an Sc flow, which is a variation of the Sb flow (FIG. 50) of the second embodiment of the present invention, executed by the intra-body microcomputer of a third embodiment of the present invention.

This case is shown in an Sc flow of FIG. 53. The Sc flow is a flow, of the third embodiment, which corresponds to the Sb flow (FIG. 50) of the above-described second embodiment. In the Sc flow, when it is determined that the eye sensing mode is ON (EPF=1) at step #1788, the process proceeds to additional step #1788-1, where whether or not the focal length is a predetermined value (f=210 mm) or larger is determined.

When the focal length is 210 mm or larger (f≧210), DFEN is equal to or smaller than DFRA (DFEN≦DFRA), and the process proceeds to step #1790 to perform low contrast scanning. While the focal lengths are compared in this embodiment since the lens is not an interchangeable lens, in case of an interchangeable lens, DFRA may be read from the lens to compare it with DFEN.

Subsequently, the fourth embodiment will be described.

The auxiliary light mode is inhibited in the second and third embodiments where the AF mode is basically set to "continuous". However, the emission of auxiliary light is effective for AF when focus detection is impossible due to insufficient brightness or low contrast.

However, as described above, the emission of auxiliary light increases power consumption. In this embodiment, by using auxiliary light at the rate of one every plural times of focus detection, power consumption is restrained to an amount by which no problems are caused. Specifically, in the auxiliary light mode where auxiliary light is emitted every ten focus detections, auxiliary light is emitted every 1 to 1.5 sec since the integration time is long (because of low brightness).

Figure 54:
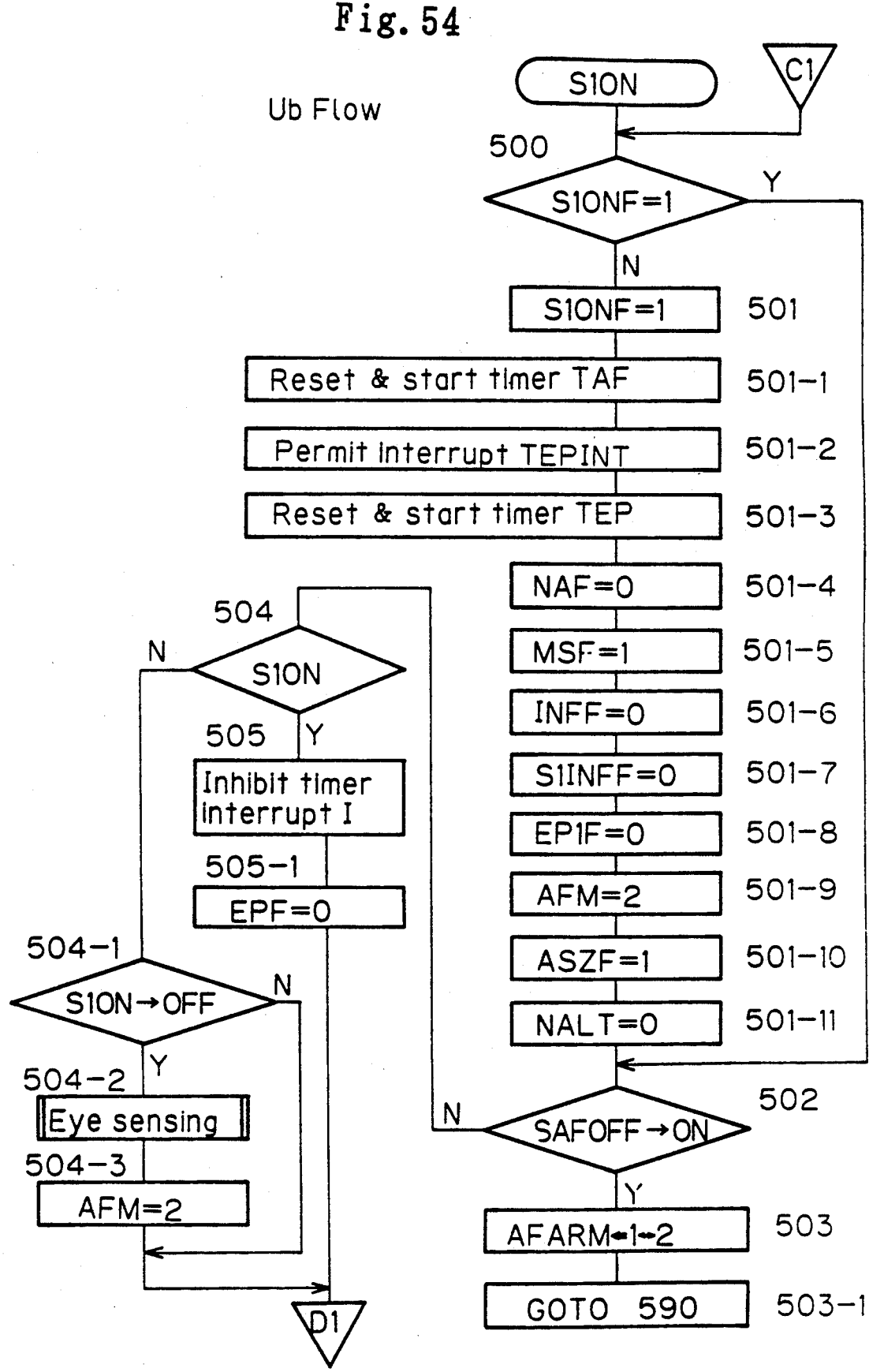
FIG. 54 is a flow chart of a Ub flow, which is a variation of the Ua flow (FIG. 13) of the first embodiment of the present invention, executed by the intra-body microcomputer of a fourth embodiment of the present invention.

In the fourth embodiment, the S1ON subroutine consists of a Ub flow (FIG. 54), the V flow (FIG. 14) and the W flow (FIG. 15). The Ub flow of FIG. 54 is a variation of the Ua flow of FIG. 13 of the S1ON subroutine of the first embodiment. The difference of FIG. 54 from FIG. 13 is that step #501-11 is added where a counter NALT for counting, as an initial setting, the number of times of focus detection in the auxiliary light mode is reset to 0. By this additional step, the auxiliary light AF is controlled again after the switch S1 is turned on.

Figure 55:
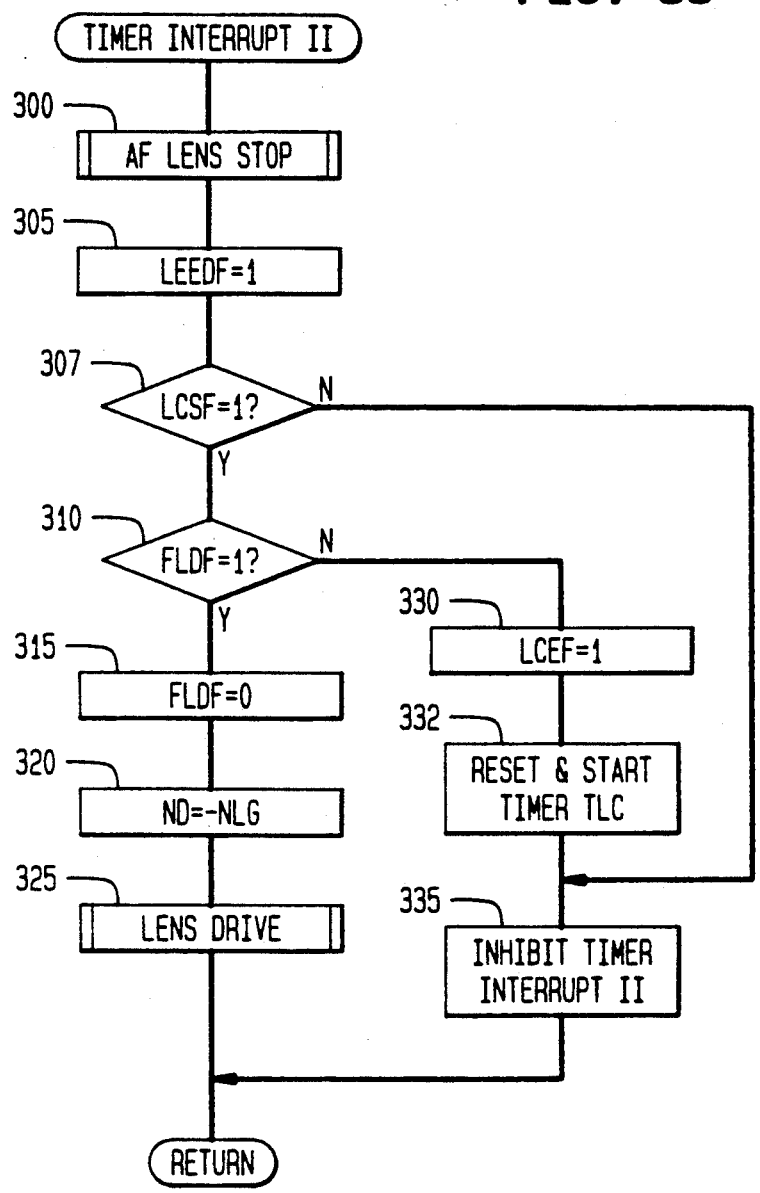
FIG. 55 is a flow chart of a subroutine, which is a variation of the flow chart of the timer interrupt II (FIG. 8) of the first embodiment of the present invention, executed by the intra-body microcomputer of the fourth embodiment of the present invention.

FIG. 55 shows a variation of the timer interrupt II of FIG. 8. Step #332 is added where a timer TLC for counting a time from when focus detection cannot be made even if low contrast scanning is performed is reset and started. This step is added in order to prevent low contrast scanning from not being performed when photographing scenes are changed under a condition where focus detection is impossible even if low contrast scanning is performed once or when focus detection is impossible.

Figure 56:
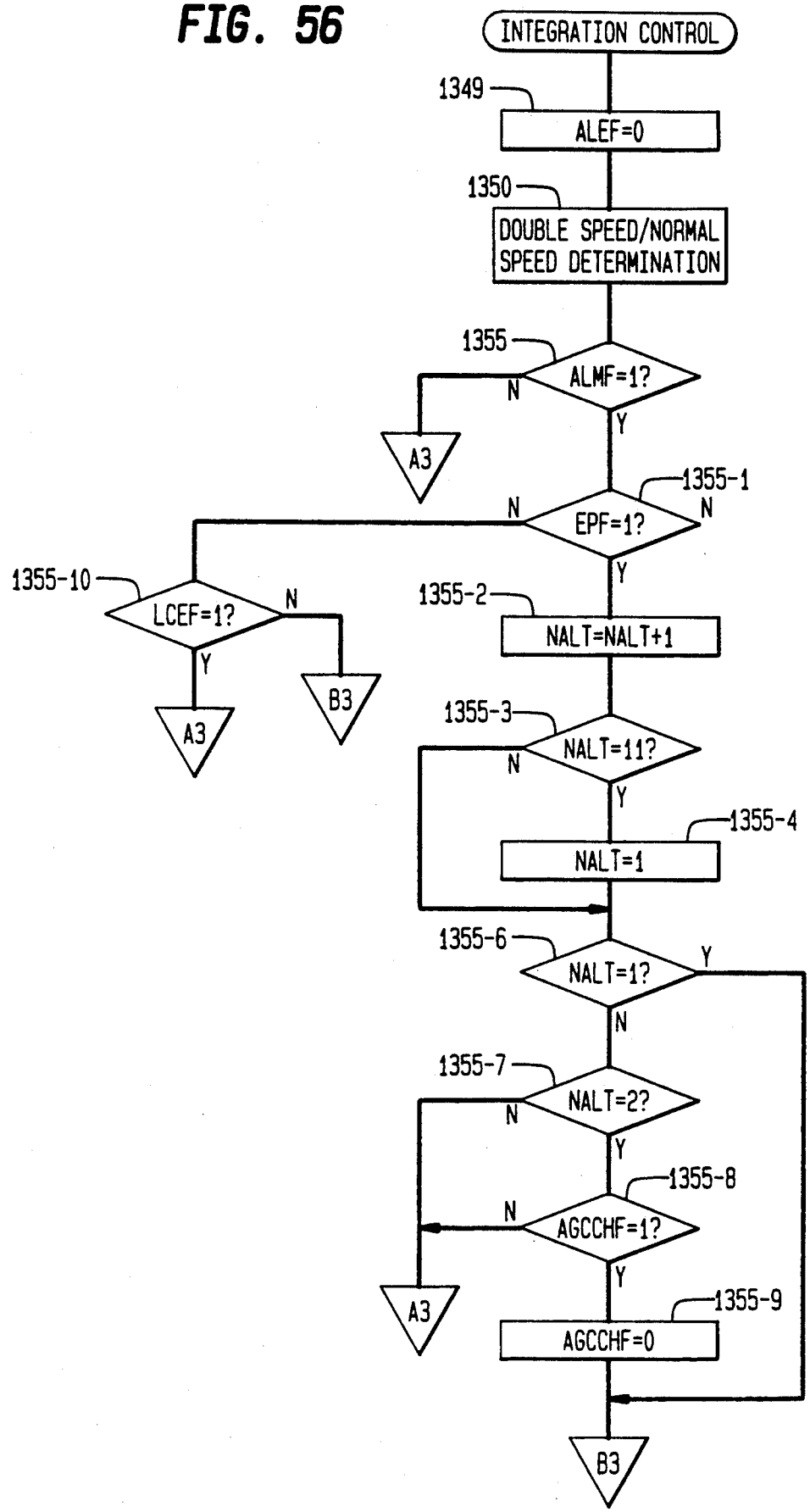
FIGS. 56 and 57 show a flow chart of a subroutine, which is a variation of the flow chart of the integration control subroutine of FIG. 24 in the first embodiment of the present invention, executed by the intra-body microcomputer of the fourth embodiment of the present invention.
Figure 57:
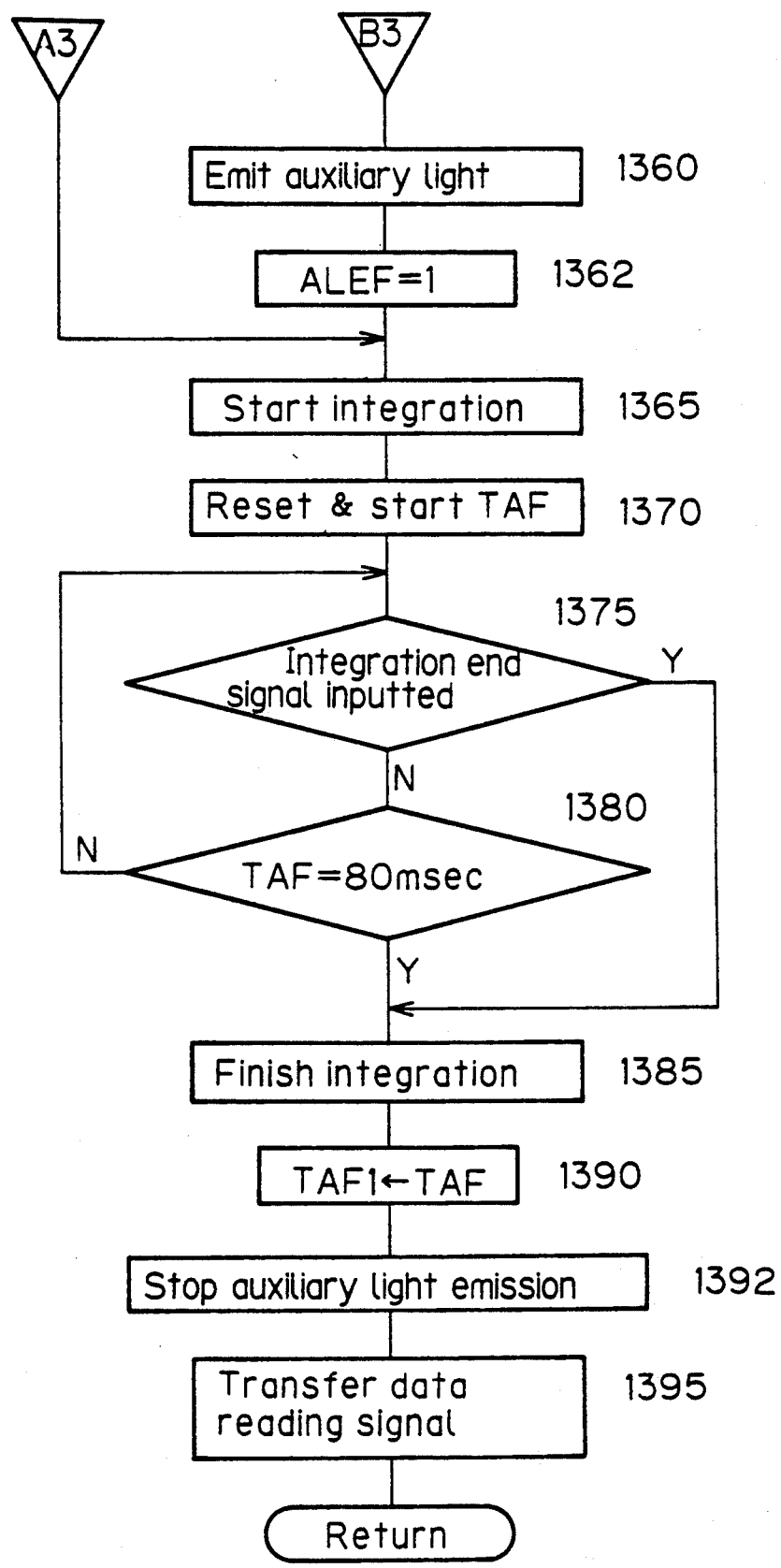

FIGS. 56 and 57 show a variation of the integration control subroutine of FIG. 24.

Step #1349 is inserted before step #1350. Steps #1355-1 to #1355-4 and #1355-6 to #1355-10 are inserted after step #1355. Step #1362 is inserted after step #1360.

At step #1349, an auxiliary light emission flag ALEF is reset to 0.

When the auxiliary light mode is ON (ALMF=1) at step #1355, the process proceeds to step #1355-1, where whether the eye sensing mode is ON or not is determined.

When the eye sensing mode is not ON (EPEF≠1), the process proceeds to step #1355-10, where whether or not focus detection is impossible even if auxiliary light is emitted is determined.

When focus detection is impossible (LCEF=1), the process proceeds to step #1365 without auxiliary light being emitted.

When focus detection is not impossible (LCEF=0), the process proceeds to step #1360, where the emission of auxiliary light is controlled.

When the eye sensing mode is ON (EPF=1) at step #1355-1, the NALT representative of times of focus detection in the auxiliary light mode is set to NALT+1, (steps #1355-2), and whether the NALT is 11 or not is determined (#1355-3).

When the NALT is 11, the NALT is set to I (step #1355-4), and the process proceeds to step #1355-6. When the NALT is not 11, skipping step #1355-4, the process proceeds to step #1355-6.

At steps #1355-2 to -4, whether it is a first-time focus detection or a tenth-time focus detection after an emission of the auxiliary light is determined. Whether the NALT is 1 or not is determined at step #1355-6. When it is 1, the process proceeds to step #1360 to emit auxiliary light. When the NALT is not 1, whether the NALT is 2 or not is determined (step #1355-7). When it is 2, the flag AGCCHF for changing the gain has been set or not is determined (#1355-8). When it has been set, determining that focus detection becomes possible if the gain is changed, the process proceeds to step #1355-9. At step #1355-9, the flag AGCCHF is reset (AGCCHF=0), and the light emission is controlled (steps #1355-7 and -8).

When NALT≠2 at step #1355-7 or when the flag AGCCHF has not been set (AGCCHF≠1) at step #1355-8, the light emission control is not performed so as to increase the interval of light emission, and the process proceeds to step #1365.

At the additional step #1362, the flag ALEF showing the time when auxiliary light is emitted is set (ALEF=1).

In the fourth embodiment, the defocus amount calculation subroutine consists of the P flow (FIG. 30), a Qb flow (FIG. 58), an Rc flow (FIG. 59), the Sc flow (FIG. 53) and the T flow (FIG. 34). The Qb flow of FIG. 58 and the Rc flow of FIG. 59 are variations of the Qa flow of FIG. 31 and the Rb flow of FIG. 49, respectively.

Figure 58:
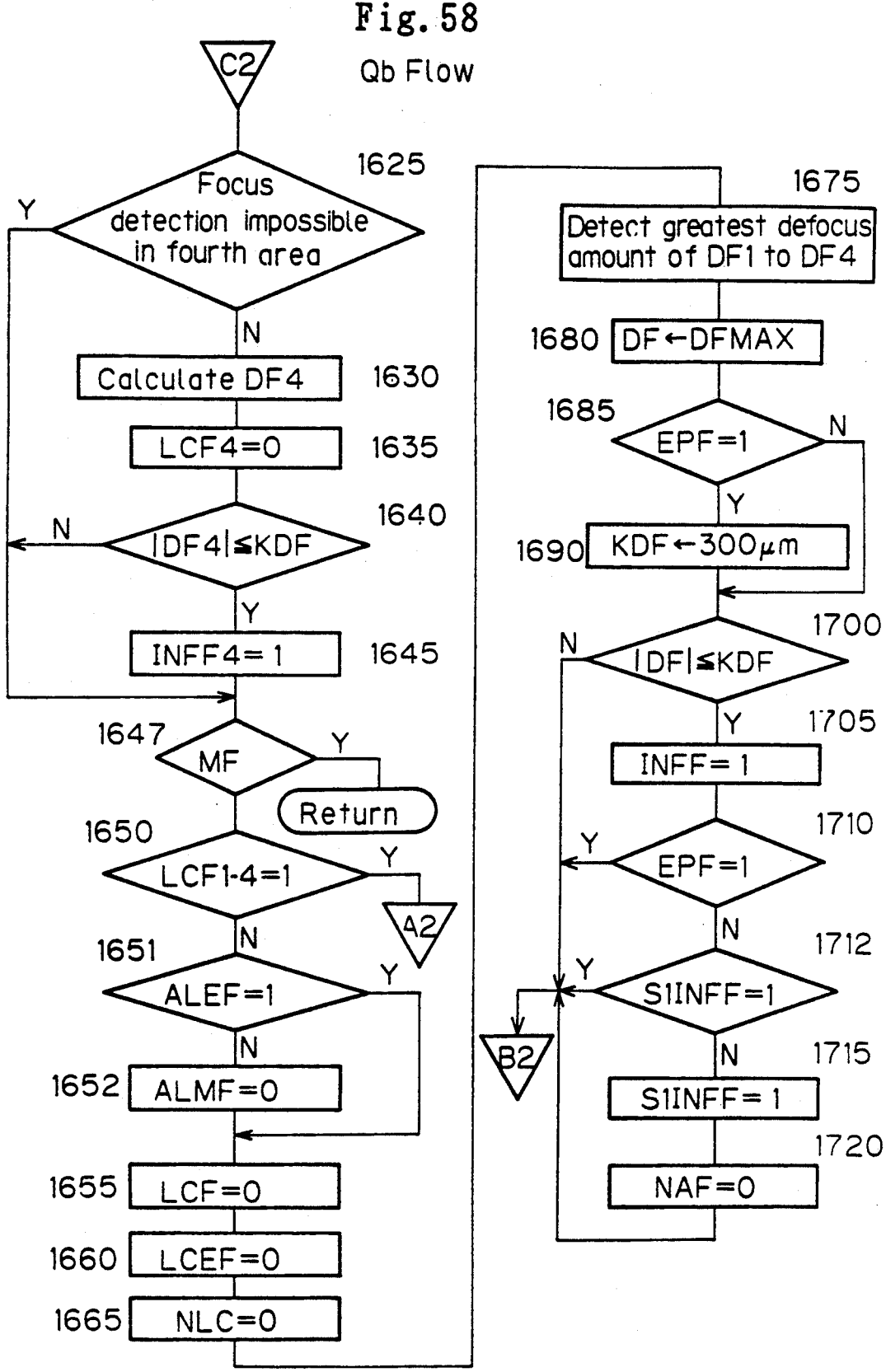
FIG. 58 is a flow chart of a Qb flow, which is a variation of the Qa flow (FIG. 31) of the first embodiment of the present invention, executed by the intra-body microcomputer of the fourth embodiment of the present invention.
Figure 59:
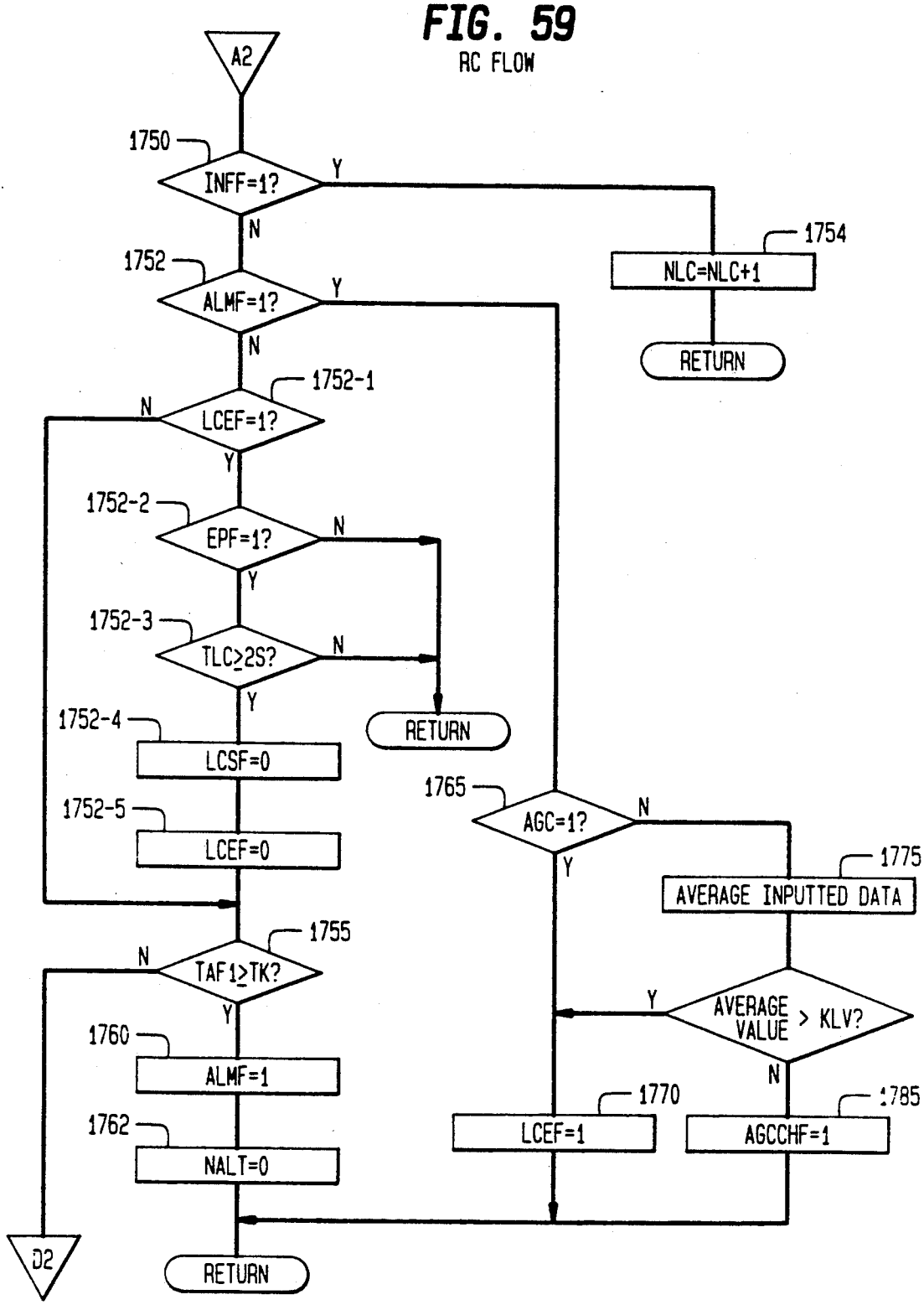
FIG. 59 is a flow chart of an Rc flow, which is a variation of the Rb flow (FIG. 49) of the second embodiment of the present invention, executed by the intra-body microcomputer of the fourth embodiment of the present invention.

In the Qb flow of FIG. 58, when none of the flags LCF1 to LCF4 showing that focus detection is impossible is 1 at step #1650, the process proceeds to additional step #1651, where whether the auxiliary light has been emitted or not is determined.

When no auxiliary light has been emitted (ALEF=0), the flag ALMF is reset in order to reset the auxiliary light mode (ALMF=0, step #1652). Then, the process proceeds to step #1655.

This is for resetting the auxiliary light mode in a case where focus detection becomes possible without auxiliary light being emitted when both the eye sensing mode and the auxiliary light mode are ON. When the ALEF has been set (ALEF=1) at step #1651, the process proceeds directly to step #1655.

In the Rc flow of FIG. 59, steps #1752-1 to #1752-5 are inserted after step #1752, and step #1762 is inserted after step #1760.

First, when it is determined that the auxiliary light mode is not ON at step #1752, the process proceeds to step #1752-1, where whether low contrast scanning is completed or not is determined.

When it is not completed (LCEF≠1), the process proceeds to step #1755. When it is completed (LCEF=1), the process proceeds to step #1752-2, where whether or not the flag EPF showing the eye sensing mode has been set is determined.

When the flag EPF has not been set (EPF≠1), the process returns. When the eye sensing mode is ON (EPF=1), whether or not two seconds have passed since the low contrast scanning was performed is determined (step #1752-3).

When two seconds have passed (TLC≧2 sec), the low contrast scanning flag LCSF is reset (LCSF=0, step #1752-4) so that low contrast scanning is performed again if necessary, and the flag LCEF showing that low contrast scanning is completed is reset (LCEF=0, step #1752-5). Then, the process proceeds to step #1755. When two second have not passed, the process returns.

At the additional step #1762, the NALT representative of times of focus detection in the auxiliary light mode is reset (NALT=0).

Tables 3 and 4 show the meanings of the flags used in the above-described embodiments. Table 5 shows the meaning of the interrupts. Tables 6, 7 and 8 show the meanings of the variables and reference designations.

Next, the fifth embodiment of the present invention will be described with reference to FIGS. 61 to 70.

Figure 62A:
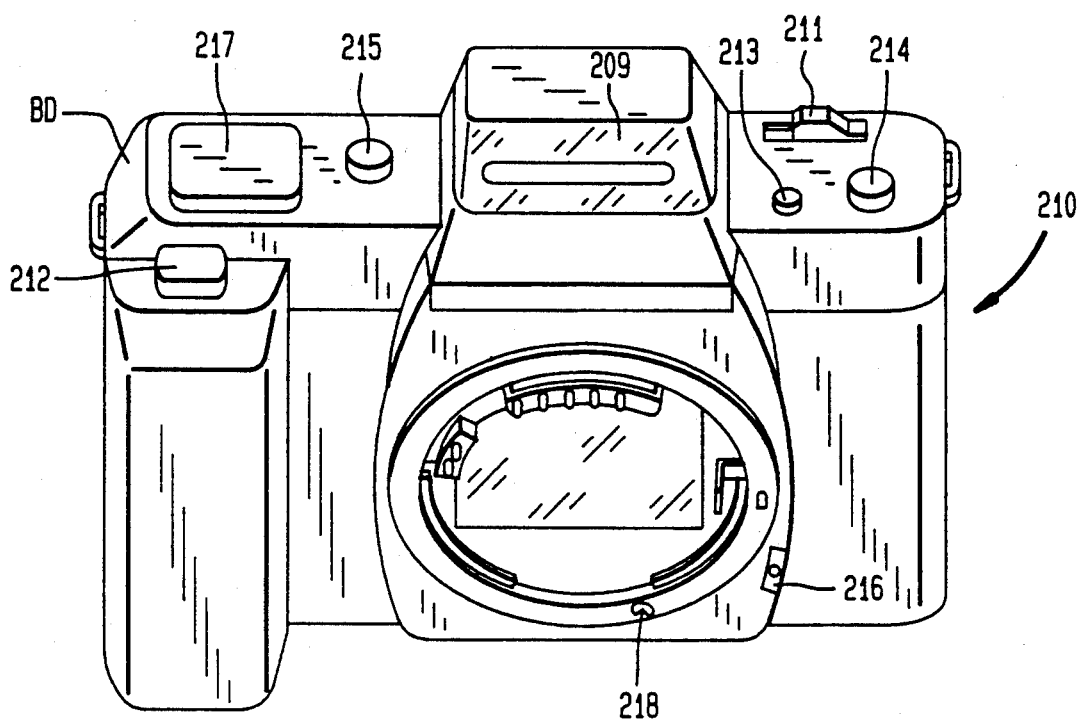
FIG. 62A shows an arrangement of a camera body of the AF camera of the fifth embodiment of the present invention.
Figure 62B:
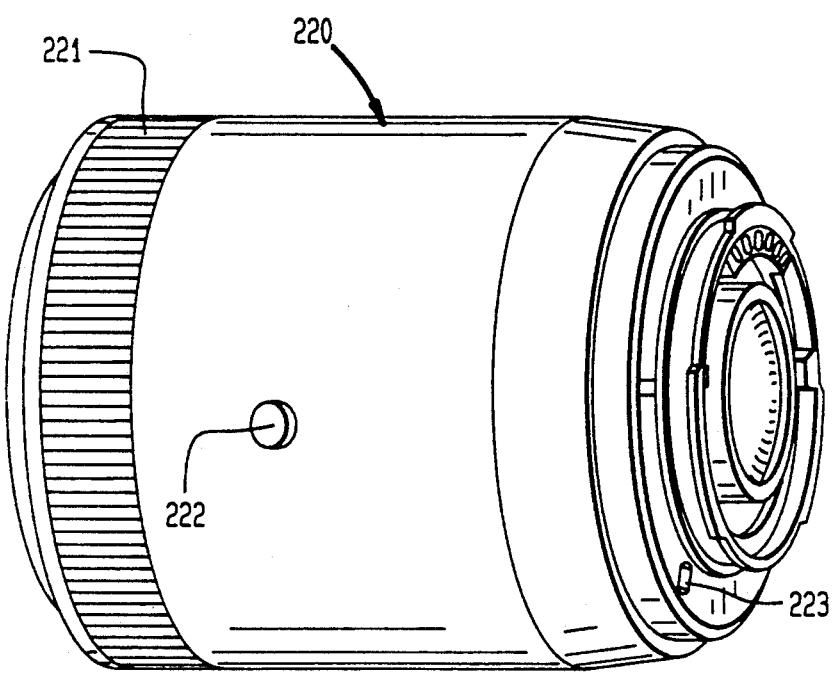
FIG. 62B shows an arrangement of a taking lens of the AF camera of the fifth embodiment of the present invention.

FIG. 62A shows an arrangement of the fifth embodiment. FIG. 62B shows an arrangement of a taking lens of the fifth embodiment.

In the figures, a slider 211 for turning on a main switch is arranged at an appropriate position on the upper surface of a camera body 210. The camera is under an operable condition when the slider 211 is placed at ON position, and is under an inoperable condition when the slider 211 is placed at OFF position. The numeral 212 is a release button. By depressing it halfway, a photographing preparation switch S1 is turned on to start photographing preparation operations such as photometry, exposure calculation and AF. By depressing the release button 212 all the way down, a release switch S2 is turned on to perform an exposure control operation. On the back surface of the camera body 210, a finder (not shown) is provided.

The numeral 213 is an APZ button for setting auto program zoom (hereinafter referred to as APZ). The APZ is a zooming method where, by automatically varying a focal length according to a subject distance, a subject image is always maintained at a desired magnification which is previously set according to the subject distance. The numeral 214 is an ASZ button for setting ASZ (auto stand-by zoom). As described above, the ASZ is a zooming method where a zoom lens is previously set in the photographing preparation operations at an initial position where a desired magnification previously set according to a subject distance is obtained. The numeral 215 is a WV button for setting wide view finder (hereinafter referred to as WV). The WV is a zooming method where the zoom lens is moved toward a wide (shorter focal length) direction by a predetermined amount in order to cause a field within a photographing range to coincide with a wide finder frame 231 (see FIG. 63) which is slightly smaller compared to a normal field frame 230 (see FIG. 63) so that a condition of a periphery of the photographing range can simultaneously be confirmed through the finder. In exposure, the zoom lens is returned to an original position.

The numeral 216 is an AF/FA changeover switch for changing over between AF (auto focus) and FA (focus aid). The numeral 217 is an on-body display portion, consisting of liquid crystal device, for providing displays such as a shutter speed, an aperture value, information on various switches, the kind of a selected zooming method and marks showing focus conditions. The display of the marks showing focus conditions is significant in an FA operation as well as in an AF operation. The numeral 218 is a coupler which engages with a coupler 223 of a subsequently-described taking lens 220 when the taking lens 220 is attached to the camera body 210. The coupler 218 transfers, to a lens drive mechanism, driving force from a drive motor (not shown), of the camera body 210, for driving a focusing lens and a zoom lens. When the FA is selected, the coupler 218 retracts toward the camera body 210 side to release the engagement. Moreover, concerning a camera system having different drive motors for the focusing lens and the zoom lens, respectively, one of the motors may be provided in the taking lens.

The numeral 220 is an interchangeable taking lens which is designed so as to be removably attachable to the front surface of the camera body 210. The numeral 221 is a zoom ring which moves the zoom lens in a direction corresponding to a rotation direction thereof at a zoom speed which is set in accordance with a rotation amount thereof. Moreover, the zoom ring 221 can be slightly slid toward the right in the figure. It is designed so that the focusing lens can be moved to perform power focusing when rotated by a predetermined amount under a slid condition in a manner similar to the above.

An image lock button 222 is provided at an appropriate position on the side of the taking lens 220. By depressing it when a desired zoom position (magnification) is obtained while the zoom lens is being moved, the desired magnification is locked. The zooming method employed for this embodiment is one where a focal length is automatically varied according to a subject distance while the image lock button 222 is ON so that a magnification of a subject is always locked.

A number of pin-shaped portions arranged on the attachment portions of the camera body 210 and the taking lens 220 are power supply connection terminals and various data communication terminals. Inside of the taking lens 220, a ROM (not shown) where a maximum focal length, a minimum focal length, a minimum F number and a conversion coefficient K for converting a defocus amount to a lens drive amount are stored. Memory contents of the ROM are transferred to the camera body 210 at need.

Figure 61:
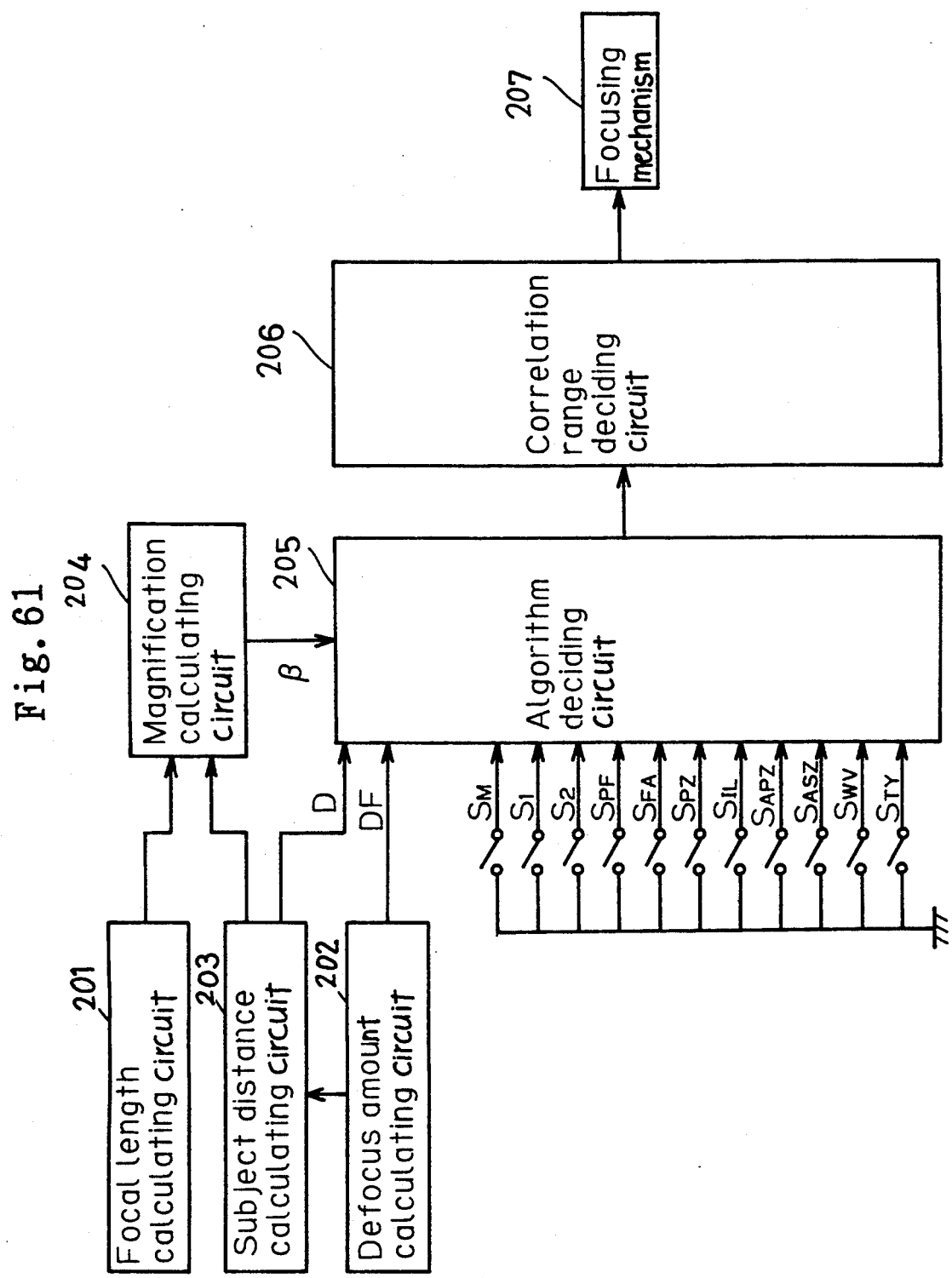
FIG. 61 is a block diagram of a circuit of a camera of a fifth embodiment of the present invention.

FIG. 61 is a block diagram of a circuit of the camera of the fifth embodiment.

In the figure, the numeral 201 is a focal length calculating circuit for calculating a focal length of the zoom lens. It includes: a rotary encoder arranged at an appropriate position in the periphery of a rotary drive member of the zoom lens and used for detecting a rotation amount corresponding to a movement amount of the zoom lens; and a decoder used for decoding an output code from the rotary encoder.

The numeral 202 is a defocus amount calculating circuit for calculating, by a phase difference detection method, a defocus amount by directing a subject image having passed through the taking lens to a distance measurement condenser lens and to a distance measurement device which includes a reference portion and a comparison portion.

Figure 63:
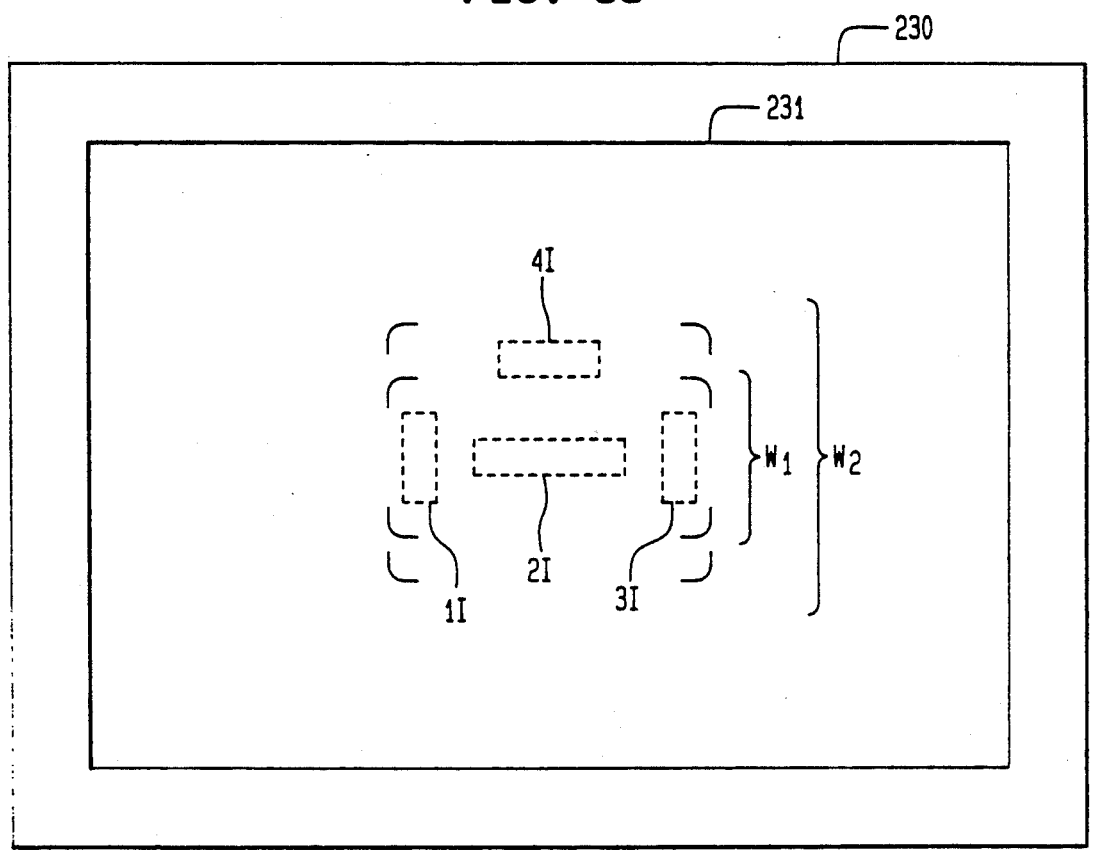
FIG. 63 shows an arrangement of distance measurement areas of the fifth embodiment of the present invention.

FIG. 63 shows an arrangement of distance measurement areas.

A plurality of distance measurement areas, that is, four areas which are a central, a left, a right and an upper central areas are provided within the normal field frame 230. The central, the left, the right and the upper central distance measurement areas are designated as a second island 2I, a first island 1I, a third island 3I and a fourth island 4I, respectively. To each of the islands, a solid-state image sensor CCD, consisting of a pair of the reference and the comparison portions, is arranged in an array form. The subject image which has been divided in two directions through the condenser lens is directed to the reference and the comparison portions.

The defocus amount is decided by obtaining a phase difference between the subject image directed to the reference portion and that directed to the comparison portion. The calculation of the phase difference is performed firstly with respect to, for example, a position where the image shift amount is smallest, and then, is performed alternately in a plus and a minus directions where the image shift gradually increases. In this camera, a defocus amount of up to approximately ±20 mm can be obtained. A phase difference obtained when the correlation between a subject image of the reference portion and that of the comparison portion is highest is decided as the defocus amount.

W1 is a wide area displayed when the camera is in a longitudinal position (that is, longitudinally held). W2 is a wide area displayed when the camera is in a lateral position (that is, laterally held). When the wide area W1 or W2 is selected, a predetermined value is selected, for focus detection, amount defocus amounts obtained with respect to the plural distance measurement islands within the area in a subsequently-described manner. Concerning the longitudinal and lateral positions of the camera, they will be described later.

The numeral 203 is a subject distance calculating circuit for calculating a subject distance based on a defocus amount obtained by the defocus amount calculating circuit 202. The subject distance is calculated based on a current lens position and a defocus amount with respect to each distance measurement island. The numeral 204 is a magnification calculating circuit for calculating a magnification based on each subject distance and a focal length of the taking lens. A defocus amount Df, a subject distance D and a magnification $\beta$ which are obtained by the above-mentioned circuits 202, 203 and 204, respectively, are transferred to an algorithm deciding circuit 205.

Subsequently, switches will be described.

SM is a main switch for activating and deactivating the camera. The ON and OFF thereof is changed over by the slider 211.

S1 is a photographing preparation switch which is turned on by the halfway depression of the release button 212.

S2 is a release switch which is turned on by the all-the-way-down depression of the release button 212.

SPF is a switch for setting power focus.

SFA is a switch for setting focus aid.

SPZ is a switch for setting power zoom.

SIL is a switch for setting image lock. It is turned on when the image lock button 222 is depressed.

SAPZ is a switch for setting the APZ. it is turned on when the APZ button 213 is depressed.

SASZ is a switch for setting the ASZ. It is turned on when the ASZ button 214 is depressed.

SWV is a switch for setting wide view finder. It is turned on when the WV button 215 is depressed.

STY is a switch for indicating a positional condition of the camera (that is, whether the camera is held longitudinally or laterally).

The positional condition of the camera is sensed by a camera position sensor. That is, for some subjects, it is desirable that the camera be longitudinally held in photographing; in this case, the camera's being longitudinally held is detected so that a subsequently-described setting of distance measurement islands can be changed to a suitable one. For the detection of the positional condition of the camera, for example, a T-shaped sealed tube which contains a predetermined quantity of conductive liquid and where an electrode is formed at each terminal (at three positions) is arranged in the camera. By identifying an electrode, of the T-shaped sealed tube, which shorts with a common electrode according to an inclination condition of the camera, the camera position sensor detects a lateral position of the camera and two kinds of longitudinal positions of the camera. Moreover, various types of camera position sensors may be employed where inclination conditions of the camera are detected by use of the working of gravity.

The algorithm deciding circuit 205 is designed so that a calculation algorithm for focusing is set based on the above-mentioned information and subsequently-described conditions of switches. The algorithm deciding circuit 205 includes: an algorithm determining circuit for determining which of a 2I priority algorithm and a multi algorithm is to be used; a circuit portion (see FIG. 64) for deciding which algorithm should be used when it is determined that the multi algorithm is to be used; and a storing circuit where each calculation algorithm is stored.

The numeral 206 is a correlation range deciding circuit for deciding a correlation range in the previously-described subject image correlation process of the reference and the comparison portions. The time required for the correlation process can be reduced by decreasing the correlation range. Thereby, the speed of a photographing operation can be increased.

The numeral 207 is a focusing mechanism for directing the taking lens to an in-focus position based on the obtained defocus amount.

Figure 64:
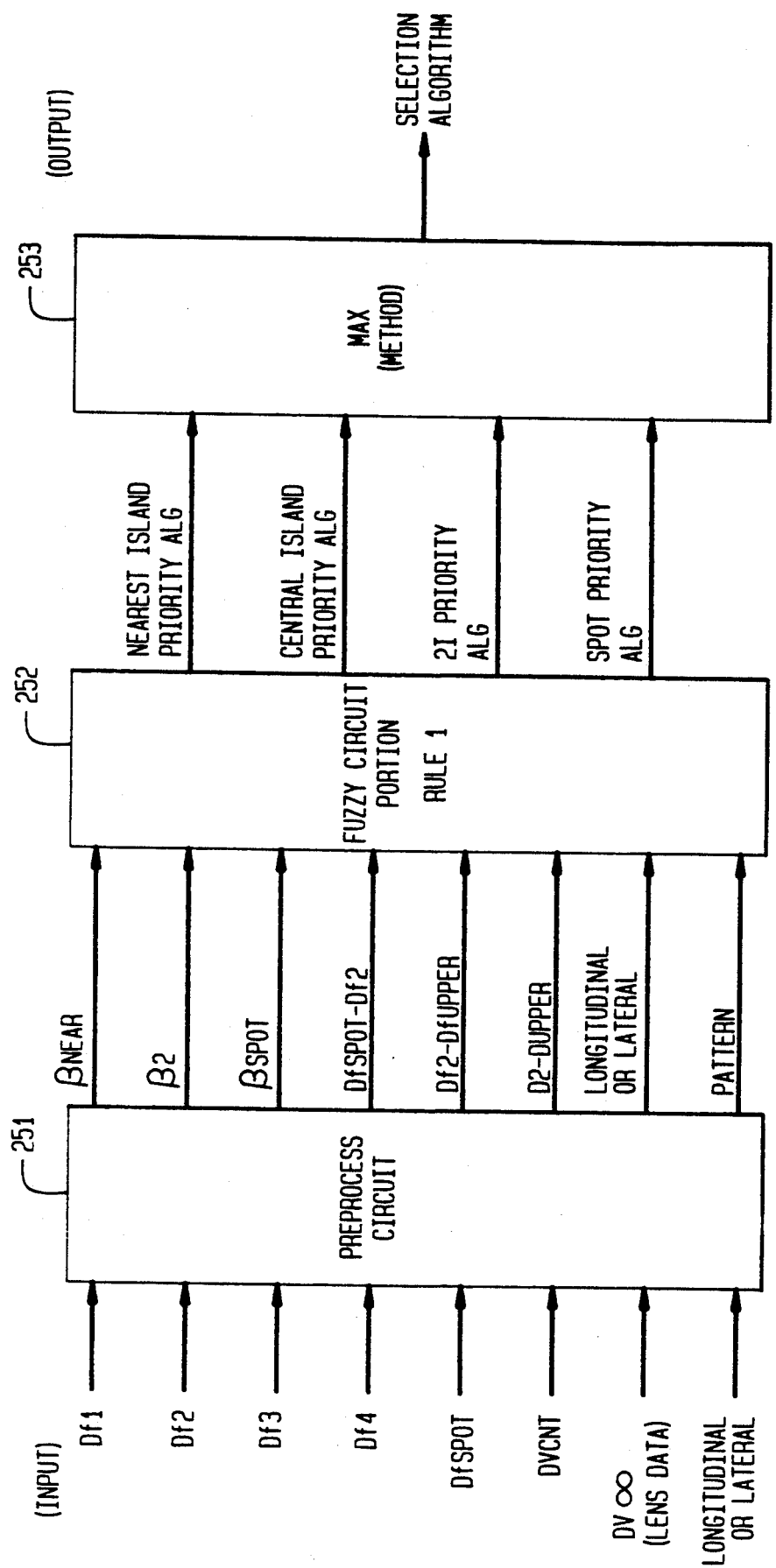
FIG. 64 is a block diagram of a circuit for deciding a multi algorithm of the fifth embodiment of the present invention.

FIG. 64 is a block diagram of the circuit portion, for deciding a multi algorithm, of the algorithm deciding circuit 205.

The numeral 251 is a preprocess circuit for forming a subsequently-described predetermined data based on an input data. The numeral 252 is a fuzzy circuit portion, provided with subsequently-described membership functions shown in FIG. 67 and subsequently-described rules shown in FIG. 68, for outputting a suitableness of each calculation algorithm based on an input data. The numeral 253 is a method (for example, a MAX method) of selecting a calculation algorithm of highest suitableness based on the suitableness, of each calculation algorithm, obtained by the fuzzy circuit portion 252.

Concerning data inputted to the preprocess circuit 251, Df1 to Df4 are defocus amounts obtained with respect to the islands 1I to 4I, respectively; Dfspot is a defocus amount obtained by use of a part (hereinafter referred to as spot island) of distance measurement devices arranged in the central portion of the second island 2I; DVCNT is a count value indicating a lens position; and DV∞ value is a lens movement amount per one count value. The lens position is decided based on both DVCNT and DV∞.

The preprocess circuit 251 outputs the following data: $\beta_{NEAR}$ is a magnification of a nearest subject; $\beta_2$ is a magnification of a subject in the second island; $\beta_{SPOT}$ is a magnification of a subject in the spot island; |Dfspot−Df2| is a difference of the defocus amount of the spot island and that of the island 2I; and |Df2−Dfupper| and |D2−Dupper| are a difference of defocus amounts and that of subject distances, respectively. "Upper" of the Dfupper and Dupper indicates the fourth island 4I when the camera is in a lateral position, the first island 1I when it is in a longitudinal position where the first island is arranged in the upper, and the third island 3I when it is in another longitudinal position where the third island 3I is arranged in the upper. Moreover, a pattern signal is one relating to subject positional relations shown in the second row of FIG. 68.

The fuzzy circuit portion 252 outputs the suitableness of each calculation algorithm. As the calculation algorithm, a nearest island priority ALG (algorithm), a central island priority ALG, a 2I priority ALG and a spot priority ALG are employed.

A method of deciding a calculation algorithm will hereinafter be described.

First, in accordance with the kind of zooming, which of the 2I priority algorithm and the multi algorithm is to be used is determined.

Figure 65:
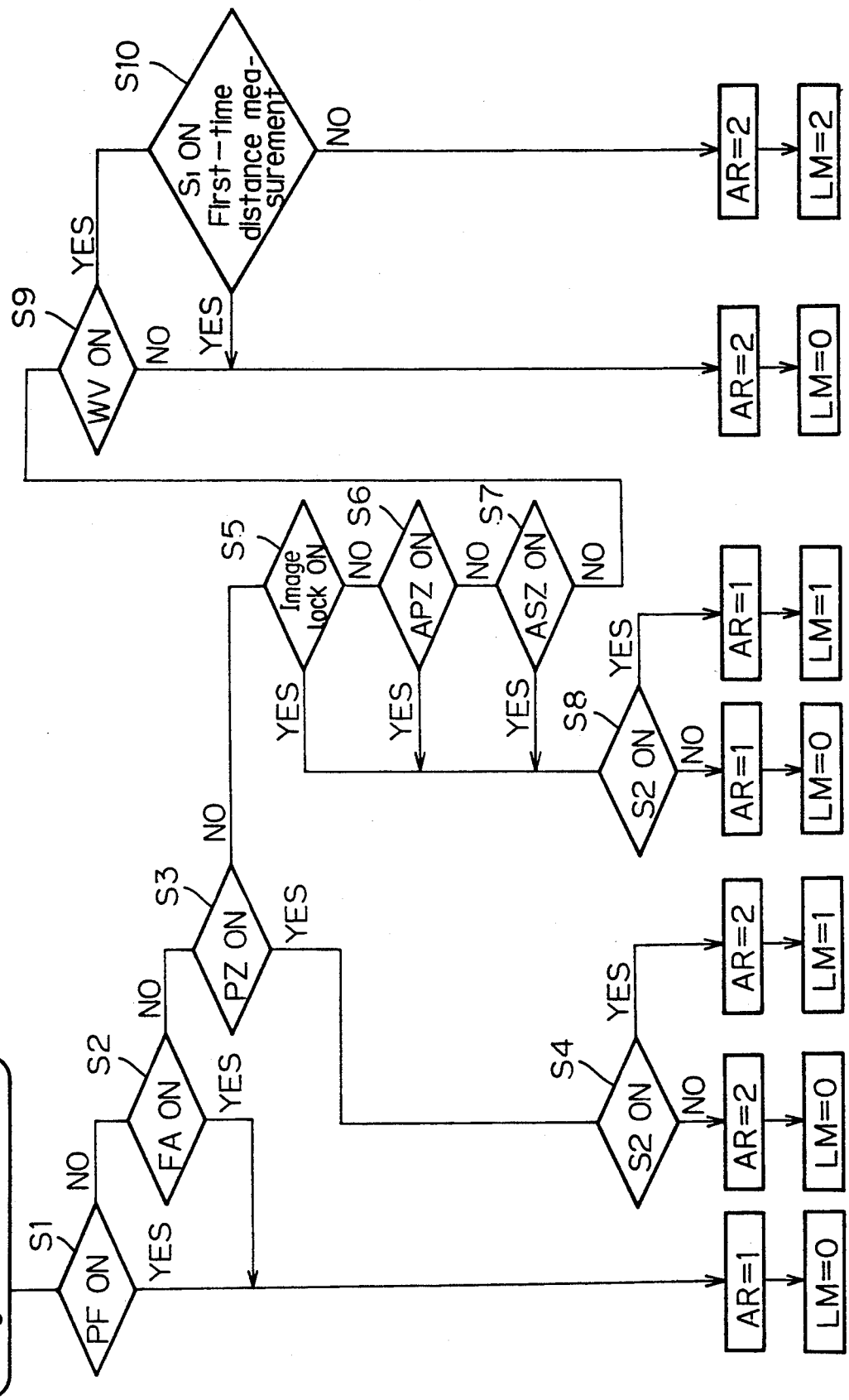
FIG. 65 is a flow chart of a procedure for determining an algorithm of the fifth embodiment of the present invention.

FIG. 65 is a flow chart of a procedure for the determination.

In the flow chart, AR=1 is the 2I priority algorithm, AR=2 is the multi algorithm, and LM is a correlation range (no limit when LM=0, between −2 mm and 4 mm when LM=1, and between −2 mm and 2 mm when LM=2).

First, whether power focus is ON or not is determined (step S1). When power focus is ON, AR=1 and LM=0 are selected. When power focus is not ON, whether focus aid FA is ON or not is subsequently determined (step S2). When focus aid FA is ON, AR=1 and LM=0 are selected similarly to the above case. When focus aid FA is not ON, whether power zoom is ON or not is subsequently determined (step S3). When power zoom is ON, whether the release switch S2 is ON or not is determined (step S4). When the release switch S2 is not ON, AR=2 and LM=0 are selected. On the other hand, when the release switch S2 is turned on while power zoom is ON, AR=2 and LM=1 are selected.

When power zoom is not ON, whether image lock is ON or not, whether APZ is ON or not and whether ASZ is ON or not are subsequently determined (steps S5 to S7). When any of the above is ON, the process proceeds to step S8, where the condition of the release switch S2 is determined. When the release switch S2 is not ON, AR=1 and LM=0 are selected. When the release switch S2 is ON, AR=1 and LM=1 are selected. When none of the above is ON at steps S5 to S7, whether wide view finder WV is ON or not is subsequently determined (step S9). When WV is not ON, AR=2 and LM=0 are selected. When WV is ON, whether or not the current distance measurement is a first-time distance measurement after the turning on of the photographing preparation switch S1 is subsequently determined (S10). When it is a first-time distance measurement after the turning on of the photographing preparation switch S1, AR=2 and LM=0 are determined similarly to the above case. When it is a second- or subsequent-time distance measurement, AR=2 and LM=2 are selected.

The above-mentioned relations are shown in Table 9.

Figure 66:
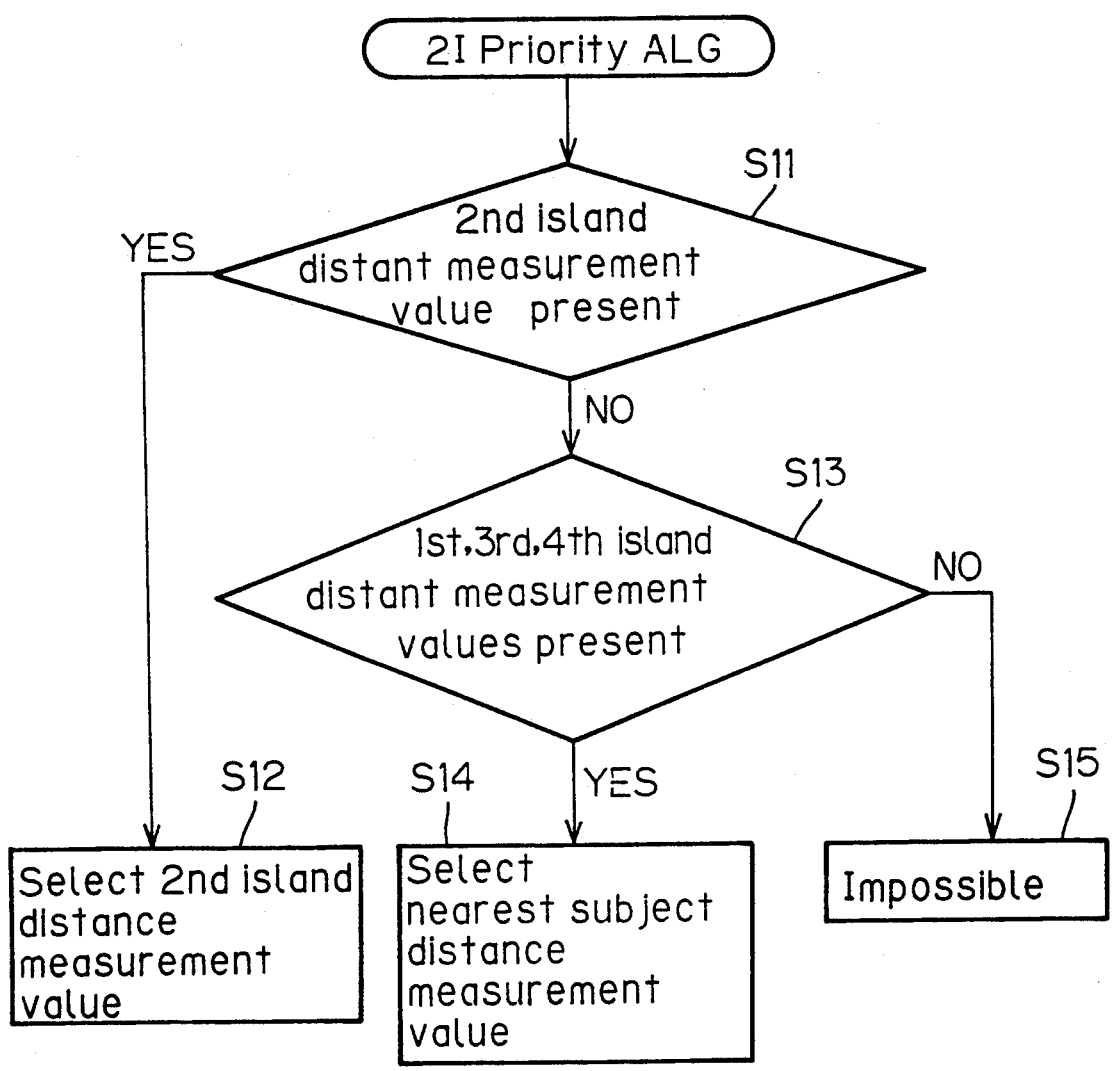
FIG. 66 is a flow chart of a focus detection process executed in a case where a second island priority algorithm of the fifth embodiment of the present invention is selected.

Subsequently, a focus detection process executed in a case where the 2I priority algorithm is selected will be described with reference to FIG. 66.

In the 2I priority algorithm, first, the presence/absence of a distance measurement value of the second island 2I is determined (step S11). When a distance measurement value has been obtained with respect to the second island 2I, the value is employed as a distance measurement value for focusing (step S12). When a distance measurement value has not been obtained with respect to the second island, that is, when reliability of a desired level has not been obtained because of insufficient luminance and low contrast, the presence/absence of distance measurement values of other islands 1I, 3I and 4I (step S13) is determined. When distance measurement values are present with respect to at least two islands, a nearest subject distance measurement value of a nearest subject is selected among them (step S14). When a distance measurement value has been obtained with respect to only one island, the value is employed. When a distance measurement value has obtained with respect to none of the islands, it is determined that distance measurement is impossible (step S15).

Subsequently, a process executed in a case where the multi algorithm is selected will be described with reference to FIGS. 67 to 70.

Figure 67:
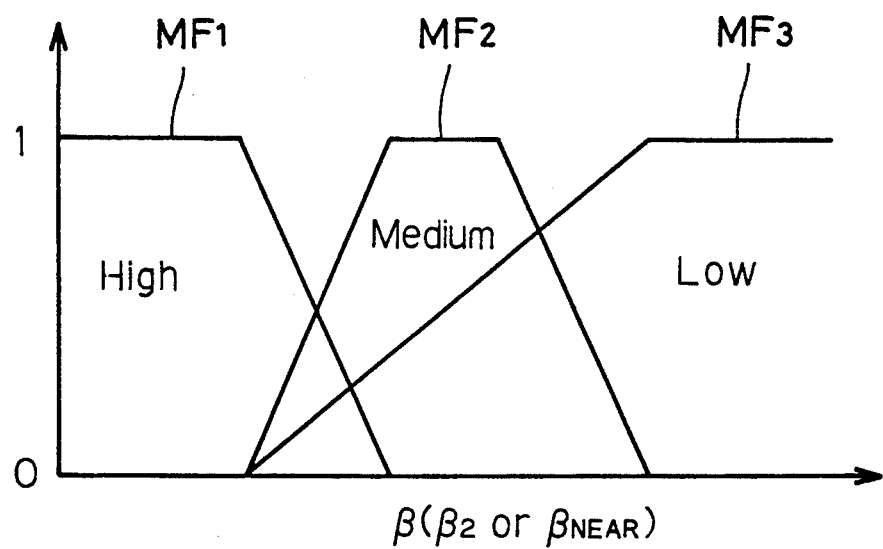
FIG. 67 shows membership functions for selecting a suitable algorithm among multi algorithms of the fifth embodiment of the present invention.

FIG. 67 shows membership functions for selecting a suitable algorithm among multi algorithms. The membership functions show a relation between a suitableness and a magnification, and are set so that: when the magnification $\beta$ ($\beta_2$, $\beta_{NEAR}$) is high, the suitableness of a membership function MF1 representative of a subsequently-described macro ALG is high; when the magnification $\beta$ ($\beta_2$, $\beta_{NEAR}$) is medium, the suitableness of a membership function MF2 representative of a subsequently-described central island priority ALG is high; and when the magnification $\beta$ ($\beta_2$, $\beta_{NEAR}$) is low, the suitableness of a membership function MF3 representative of a subsequently-described nearest island priority ALG is high.

Figure 68:
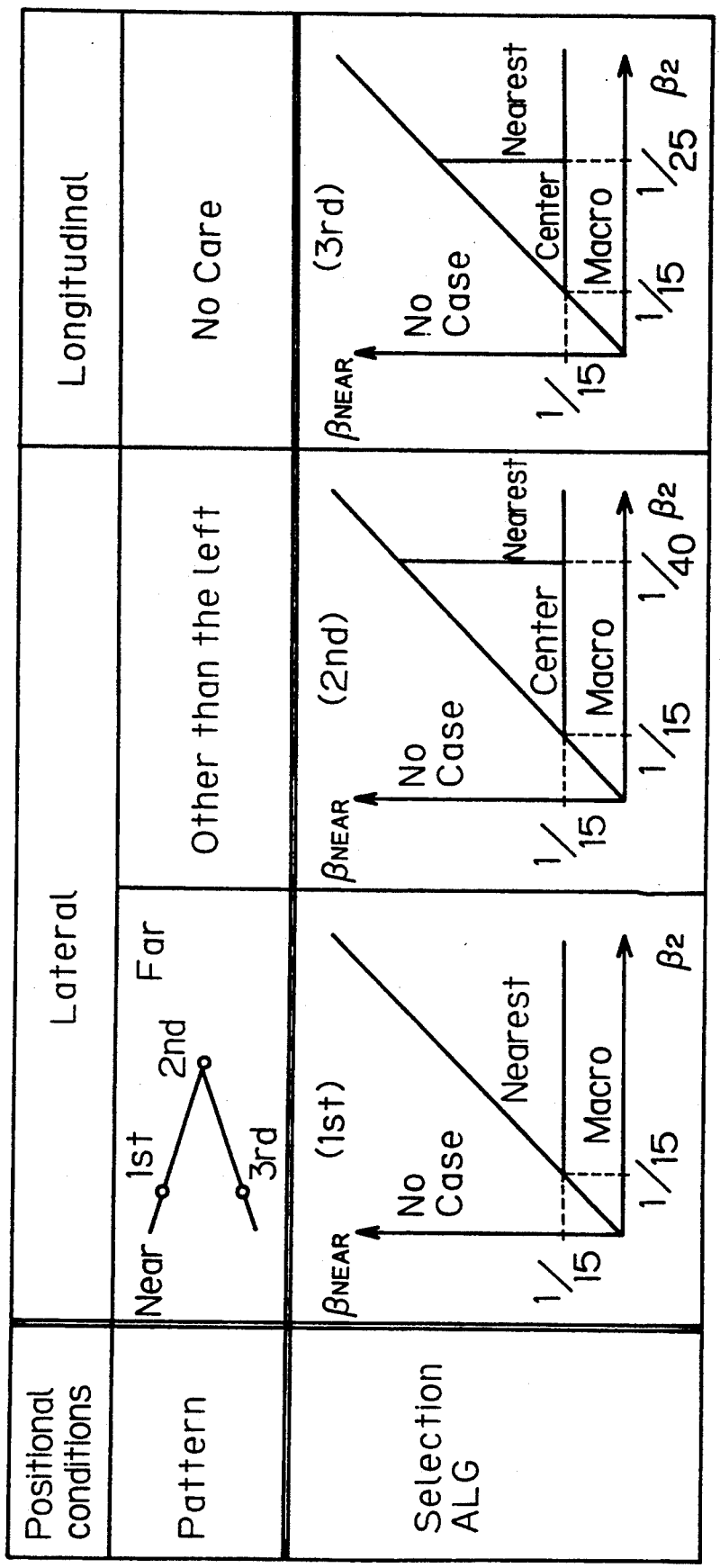
FIG. 68 shows specific rules, for selecting an algorithm, using the membership functions of FIG. 7.

FIG. 68 shows specific rules, for selecting an algorithm, using the membership functions.

The upper row of FIG. 68 shows a positional condition (lateral or longitudinal) of the camera. When the camera is in a lateral position, a pattern of a subject is checked. That is, a first selection ALG is selected when subjects in the first and third islands are located close to the camera and a subject in the second island is located far, and a second selection ALG is selected in cases of other patterns. When the camera is in a lateral position, a third selection ALG is selected regardless of patterns.

The first to third selection ALGs are represented by graphs whose axis of abscissas represents the second island magnification $\beta_2$ and whose axis of ordinates represents the nearest subject magnification $\beta_{NEAR}$ (including the second island magnification $\beta_2$). In the graphs, the magnification is higher in a direction toward the origin. Moreover, since $\beta_{NEAR}$ includes $\beta_2$, it never occurs that $\beta_2 > \beta_{NEAR}$. Therefore, the region above $\beta_2 = \beta_{NEAR}$ is represented by "No Case."

Concerning the first selection ALG, the macro ALG is selected when $\beta_{NEAR} \geq 1/15$, and otherwise, the nearest island priority ALG is selected.

Concerning the second selection ALG, the macro ALG is selected when $\beta_{NEAR} \geq 1/15$, the central island priority ALG is selected when $1/40 \leq \beta_2 < 1/15$ and when $1/40 \leq \beta_{NEAR} < 1/15$, and otherwise, the nearest island priority ALG is selected.

Concerning the third selection ALG, the macro ALG is selected when $\beta_{NEAR} \geq 1/15$, the central island priority ALG is selected when $1/25 \leq \beta_2 < 1/15$ and when $1/25 \leq \beta_{NEAR} < 1/15$, and otherwise, the nearest island priority ALG is selected.

Figure 69:
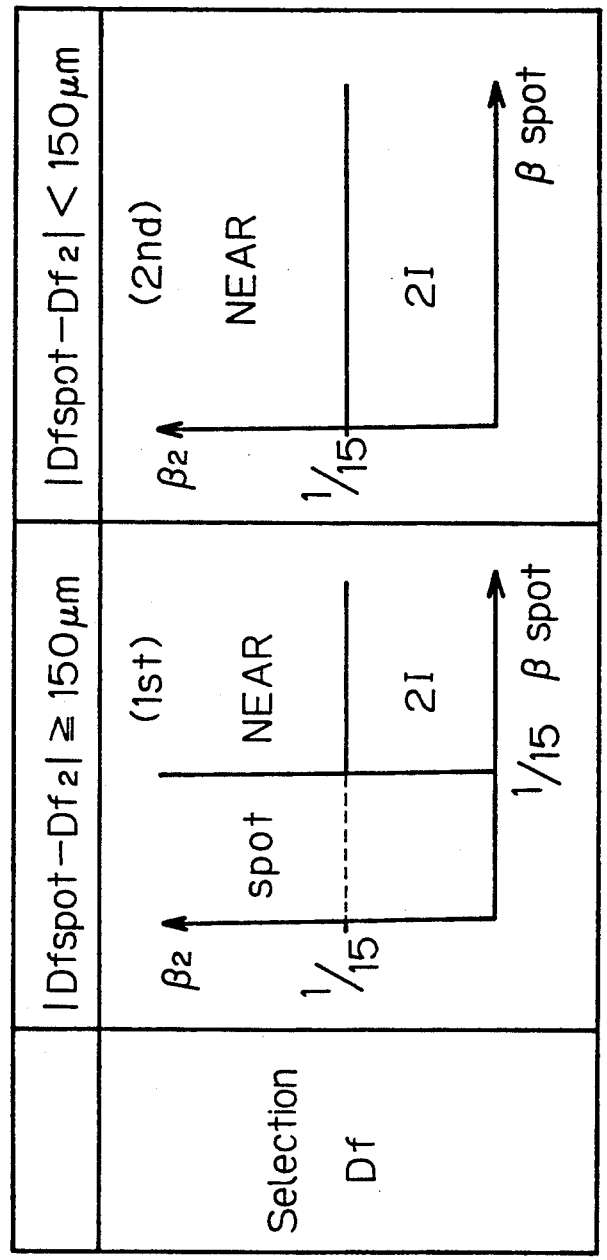
FIG. 69 shows rules, for selecting a defocus amount, employed in a case where a macro algorithm of the fifth embodiment of the present invention is selected.
Figure 70:
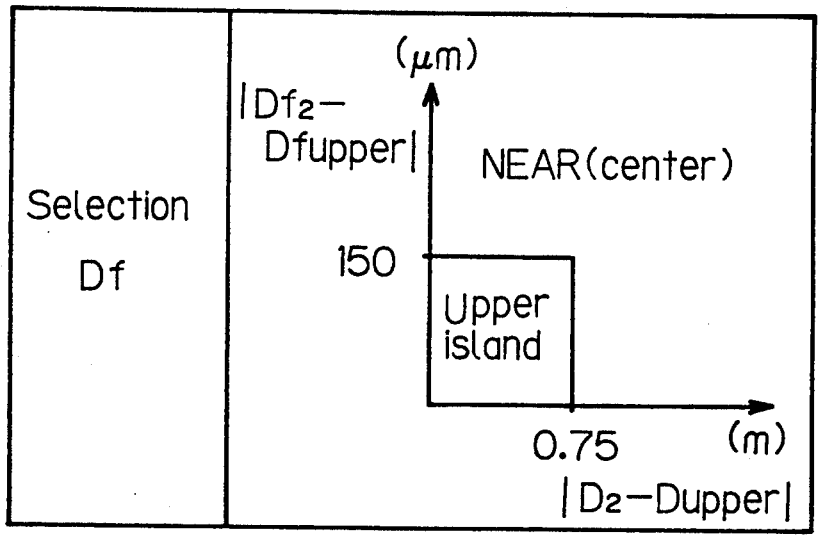
FIG. 70 shows a rule, for selecting a defocus amount, employed in a case where a central island priority algorithm of the fifth embodiment of the present invention is selected.

FIG. 69 shows rules, for selecting the defocus amount Df, employed in a case where the macro ALG is selected, while FIG. 70 shows a rule, for selecting the defocus amount Df, employed in a case where the central island priority ALG is selected.

In FIG. 69, first, a rule is selected according to whether $|Dfspot - Df2| \geq 150$ μm or not. When $|Dfspot - Df2| \geq 150$ μm, a first Df which is for macro is selected. Otherwise, a second Df which is for quasi-macro is selected. The first and second Dfs are represented by graphs whose axis of abscissas represents the magnification $\beta_{SPOT}$ and whose axis of ordinates represents the magnification $\beta_2$. In the graphs, the magnification is higher in a direction toward the origin.

Concerning the first selection Df, the spot island defocus amount Dfspot is employed when $1/15 \leq \beta_{SPOT}$. When $1/15 \leq \beta_2$ and $1/15 > \beta_{SPOT}$, determining that a subject of high magnification is present not in the spot island and but in the second island, a second island defocus amount Df2 is employed. When $\beta_2 < 1/15$, since there is a possibility that a subject of high magnification is present in another island, a nearest island defocus amount $Df_{NEAR}$ is employed.

Concerning the second selection Df, since the difference between Dfspot and Df2 is small, it is unnecessary to employ the spot island defocus amount Dfspot. Therefore, similarly to the case of the first selection Df, the second island defocus amount Df2 is employed when $1/15 \leq \beta_2$, and the nearest island defocus amount $Df_{NEAR}$ is employed when $\beta_2 > 1/15$.

In FIG. 70, the axis of abscissas represents |Df−Dupper|, while the axis of ordinates represents |Df2−Dfupper|.

When |D2−Dupper|≦0.75 m and |Df2−Dfupper|≦150 μm, an upper island defocus amount is employed. At this time, the upper island is specified according to the detected positional condition (lateral or longitudinal) of the camera. That is, when the camera is in a lateral position, the fourth island 4I is the upper island, while when it is in s longitudinal position, the first or the third island 1I or 3I is the upper island according to the inclination direction.

Within a range other than the above, the nearest island defocus amount of the central island is employed. That is, when the camera is in a lateral position, the nearest island defocus amount Df of a central island consisting of the second and the fourth islands 2I and 4I is employed, while when the camera is in a longitudinal position, the nearest island defocus amount of a central island consisting of the second and the first islands 2I and 1I or the nearest island defocus amount of a central island consisting of the second and the third islands 2I and 3I is employed according to the inclination direction of the camera.

When the nearest island ALG is selected, the defocus amount $Df_{NEAR}$ obtained based on the nearest subject distance is selected among the defocus amounts of the first to fourth islands 1I to 4I.

By the above-described methods, focus detection is performed based on a defocus amount and a correlation range which are suitable for each case.

TABLE 1

| Rotation Number ND | Maximum Speed LDVmax | | |
|---|---|---|---|
| (Absolute Value) | TA1 | TA2 | TA12 |
| Less than 100 | V1 | 4V1 | 2V1 |
| 100 or More and Less than 200 | 2V1 | 8V1 | 4V1 |
| 200 or More | 4V1 | 16V1 | 8V1 |

TABLE 2

| Rotation Number N1 | Remaining Rotation Number | Drive Speed LDV | | |
|---|---|---|---|---|
| (Absolute Value) | ΔN | TA3 | TA4 | TA34 |
| 40 | — | V1 | 4V1 | V1 |
| Less than 100 | Less than 20 | V1 | 4V1 | V1 |
| | 20 or More | 2V1 | 8V1 | 4V1 |
| 100 or More | Less than 20 | V1 | 4V1 | V1 |
| | 20 or More and Less than 50 | 2V1 | 8V1 | 4V1 |
| | 50 or More | 4V1 | 16V1 | 8V1 |

TABLE 3

| Flag Names | Meanings |
|---|---|
| LMVF | Whether AF lens is being moved or not (1: being moved) |
| EPF | Whether eye sensing mode is ON or not (1: ON) |
| LEEDF | Whether lens has been moved to the most moved-in position or not (1: moved to the most moved-in position) |
| LCSF | Whether low contrast scanning mode is ON or not (1: ON) |
| FLDP | Whether or not lens moving-out mode is ON when low contrast scanning mode is ON (1: ON) |
| S1ONF | Whether the process has passed S1ON routine or not (1: passed) |
| MSF | Whether main subject determination mode is ON or not (1: ON) |
| ALMF | Whether auxiliary light mode is ON or not (1: ON) |

TABLE 3-continued

| Flag Names | Meanings |
|---|---|
| ZMVF | Whether zoom lens is being moved or not (1: being moved) |
| AGCCHF | Whether AGC data has been changed (from 1/2 to 1) or not (1: changed) |
| LCF | Whether focus detection is impossible in all four detection areas or not (1: impossible in all four detection areas) |

TABLE 4

| Flag Names | Meanings |
|---|---|
| S1INFF | Whether or not in-focus condition has been obtained after switch S1 is turned on (1: in-focus condition after S1ON) |
| INFF | Whether or not in-focus conditions has been obtained (1: obtained) |
| LCF1-4 | Whether focus detection is impossible in respective areas 1-4 or not (LCF1-4 correspond to areas 1-4, respectively) (1: impossible) |
| INFF1-4 | Whether in-focus condition has been obtained with respect to repective areas 1-4 or not (INFF1-4 correspond to areas 1-4, respectively) (1: obtained) |
| LCEF | Whether or not focus detection is impossible even in low contrast mode and auxiliary light mode which are set when focus detection is impossible (1: impossible) |
| O/C1F | Whether the process has passed S1 triggered auto one-shot/continous routine (1: passed) |
| O/C2F | Whether 0.5 sec auto one-shot/continous routine has been executed or not (1: executed) |
| EP1F | Whether first-time lens drive is being performed in eye sensing mode or not (1: not first-time lens drive) |
| ASZF | Whether auto stand-by zoom has been performed or not (1: performed) |

TABLE 5

| Interrupts | Details |
|---|---|
| SMINT | Interrupt applied by an operation of main switch SM |
| Counter Interrupt | Interrupt applied when pulse is inputted from lens encoder |
| Timer Interrupt I | Interrupt applied every predetermined period of time (250 msec) to perform eye sensing |
| Timer Interrupt II | Interrupt applied when pulse is not inputted from encoder for a predetermined period of time T1 |
| Timer Interrupt III | Interrupt for 50 msec appled in eye sensing |
| S1INT | Interrupt applied when switch S1 or grip switch SGR is turned from off to on |
| TEPINT | Interrupt where panning sensing is performed every predetermined period of time |

TABLE 6

| Variables & Designations | Meanings |
|---|---|
| ND | Drive amount of AF lens |
| NLG | Value with a high absolute value |
| N1 | Driven amount of lens |
| ΔN | Remaining drive amount |
| LDV | Drive speed of lens |
| TA1, 2 | Maximum speed LDVmax in Table 1 |
| TA3, 4 | Maximum speed LDV in Table 2 |
| LDVmax | Maximum drive speed of lens |
| T1 | Timer for detecting end position of lens |
| NF | Moving-out amount (amount from the most-moved-in position) |
| TINT | Timer for interrupt where eye sensing is performed every predetermined period of time |

TABLE 6-continued

| Variables & Designations | Meanings |
|---|---|
| TAF | Timer used in AF operation |
| TEP | Timer used for timer interrupt TEPINT for blur sensing |
| NAF | Number of times of focus detection |
| AFARM | 1: multi-point (four areas) distance measurement<br>2: spot (center) distance measurement |

TABLE 7

| Variables & Designations | Meanings |
|---|---|
| TAF1 | Time required for integration |
| L1DF-L3DF | L1DF: preceding defocus amount<br>L2DF: defocus amount preceding L1DF<br>D3DF: defocus amount preceding L2DF |
| DF1-4 | Defocus amount of each area |
| KDF | Reference value for determining whether in-focus condition has been obtained or not |
| NLC | Number of consecutive cases where focus detection is impossible |
| TK | Reference value compared with integration time AF1 to determined whether brightness is insufficient or not |
| KLV | Reference value compared with average value of CCD data to determine whether the data is great enough or not |
| DFAV | Average of current defocus amount and three preceding defocus amount |
| LDFAV | Preceding average defocus amount (DFAV) |
| DFB | Average defocus amount after in-focus condition is obtained under S1ON condition |
| f | Focal length |
| N | AF lens drive amount obtained by calculation |
| KN | Coefficient for converting defocus amoount to lens drive amount |
| D | Distance to a subject |

TABLE 8

| Variables & Designations | Meanings |
|---|---|
| β | Magnification |
| ΔDF | Difference between defocus amounts |
| PANM1-3 | 1: it is detected that panning has occurred<br>2: it is detected that panning has not ocurred<br>3: indeterminate |
| LPAN1, 2 | Previous panning modes are stored |
| C(t) | Photometry value contrast |
| ΔB(t) | Standard value |
| KCT | Predetermined value for determining reliability of contrast C(t) |
| KB14 | Predetermined value for determining reliability of brightness |
| V | Subject speed (moving subject speed) |
| LV1-9 | Preceding nine subject speeds (moving subject speeds) |
| AFM1-3 | 1: AF lock<br>2: indeterminate<br>3. moving subject (continuous) |
| T3 | Timer for timer interrupt III |
| TLC | Time after low contrast scanning |
| NALT | Number of times of focus detection in auxiliary light mode |

TABLE 9

| Sequence | Algorithm | Correlation Range |
|---|---|---|
| Power Focus | 2I Priority Algorithm | No Limit |
| Focus Aid | (AR = 1) | (LM = 0) |
| Power Zoom | Multi Algorithm (AR = 2) | |
| Image Lock | 2I Priority Algorithm | |
| APZ | | |
| ASZ Re-measurement when S2 is ON during zooming | (AR = 1) Dependent on Previous Condition | −2 mm to 4 mm (LM = 1) |
| Wide View | | |
| First-time Distance Measurement | Multi Algorithm (AR = 2) | No Limit (LM = 0) |
| Other than the Above Case | | −2 mm to 2 mm (LM = 2) |

Obviously, many modifications and variations of the present invention are possible in light of the above teachings. It is therefore to be understood that within the scope of the appended claims, the invention may be practiced other than as specifically described.

What is claimed is:

1. An auto focus camera comprising:
    focus adjusting means for detecting a focus condition and driving a taking lens to an in-focus position based on a focus detection result, wherein said focus adjusting means has a continuous mode in which focus detection and lens driving are continuously repeated and a one-shot mode in which lens driving is stopped after an in-focus condition is once obtained;
    starting signal producing means for producing a starting signal which starts a focus adjusting operation;
    an operating member to be operated by a user after the starting signal is produced;
    switching means for selectively switching between the continuous focusing mode and the one-shot focusing mode; and
    controlling means for controlling said focus adjusting means to change a manner of lens driving in response to an operation of said operating member, wherein the changing of the lens driving manner is different from the focussing mode switching carried out by said switching means.

2. An auto focus camera as claimed in claim 1, wherein said operating member is a switch which is turned on by a halfway depression of a release button that is depressed to begin a shutter release operation.

3. An auto focus camera as claimed in claim 2, wherein said starting signal outputting means includes means for detecting with no contact with the user that the user begins a photographing operation and means for generating the starting signal in response to the detection.

4. An auto focus camera as claimed in claim 2, wherein said controlling means controls said lens driving means so as to drive the taking lens at a first speed before the operation of said operating member and to drive the lens at a second speed after the operation of said operating member, said second speed being faster than said first speed.

5. An auto focus camera as claimed in claim 1, wherein said controlling means controls said switching means to switch the focusing mode from the continuous mode to the one-shot mode in response to the operation of said operating member, in addition to the controlling of said focus adjusting means.

6. An auto focus camera comprising:
    focus detecting means for detecting a focus condition;

lens driving means for driving a taking lens to an in-focus position based on a focus detection result;

starting signal outputting means for outputting a starting signal which starts a focusing operation, said focusing operation including focus detection and lens driving;

first controlling means for controlling said focus detecting means and lens driving means so as to repeat the focus operation continuously after the starting signal is outputted; and second controlling means for controlling said driving means so as to drive the taking lens at a faster speed in a focusing operation which is performed for the first time after the starting signal is outputted and to drive the lens at a slower speed in a focusing operation which is performed after the first-time focusing operation.

7. An auto focus camera as claimed in claim 6, wherein said starting signal outputting means includes means for detecting with no contact with a user that the user begins a photographing operation and means for generating the starting signal in response to the detection.

8. An auto focus camera comprising:

focus adjusting means for detecting a focus condition and driving a taking lens to an in-focus position based on a focus detection result, wherein said focus adjusting means has a continuous mode in which focus detection and lens driving are continuously repeated and a one-shot mode in which lens driving is stopped after an in-focus condition is once obtained;

starting signal producing means for producing a starting signal which starts a focus adjusting operation;

an operating member to be operated by a user after the starting signal is produced;

first controlling means for controlling said focus adjusting means to preform a focus adjusting operation in the continuous mode before the operation of said operating member; and second controlling means for controlling said focus adjusting means to perform the focus adjusting operation selectively in either the continuous mode or the one-shot mode after the operation of said operating member.

9. An auto focus camera as claimed in claim 8, wherein said second controlling means includes means for determining whether a subject to be photographed is moving along an optical axis of the taking lens based on a plurality of sets of continuously detected focus condition data, and selecting means for selecting the continuous mode when the subject is determined to be moving and for selecting the one-shot mode when the subject is determined to be at rest.

10. An auto focus camera as claimed in claim 8, wherein said starting signal producing means includes means for detecting, with no contact with the user, that the user begins a photographing operation and means for generating the starting signal in response to the detection.

11. An auto focus camera comprising:

focus adjusting means for detecting a focus condition and driving a taking lens to an in-focus position based on a focus detection result, wherein said focus adjusting means has a first mode and a second mode in which at least one of the focus detection and the lens driving is performed differently in the two modes;

starting signal producing means for producing a starting signal which starts a focus adjusting operation;

an operating member that is operated by a user after the starting signal is produced;

first controlling means for controlling said focus adjusting means to preform a focus adjusting operation in the first mode before the operation of said operating member; and second controlling means for controlling said focus adjusting means to perform the focus adjusting operation selectively in either the first mode or the second mode after the operation of said operating member.

12. An auto focus camera comprising:

focus adjusting means for detecting a focus condition and driving a taking lens to an in-focus position based on a focus detection result;

starting signal producing means for producing a starting signal which starts a focus adjusting operation;

an operating member to be operated by a user after the starting signal is produced;

assisting means for assisting the focus detection of said focus adjusting means; and controlling means for controlling said assisting means, wherein said controlling means changes control of said assisting means in response to an operation of said operating member.

13. An auto focus camera as claimed in claim 12, wherein said controlling means prohibits the assistance of the focus detection from taking place before the operation of said operating member and allows said assistance to take place after the operation thereof.

14. An auto focus camera as claimed in claim 12, wherein said controlling means controls said assisting means to operate at a first frequency before the operation of said operating member and to operate at a second frequency after the operation thereof, the second frequency being higher than the first frequency.

15. An auto focus camera as claimed in claim 12, wherein said assisting means is a driving member which drives the taking lens when focus detection is not possible because of insufficient contrast.

16. An auto focus camera as claimed in claim 12, wherein said assisting means is an illuminating member which illuminates a subject to be photographed when the subject has low illumination or low contrast.

17. An auto focus camera comprising:

focus adjusting means for detecting a focus condition and driving a taking lens to an in-focus position based on a focus detection result;

starting signal producing means for producing a starting signal which starts a focus adjusting operation;

an operating member to be operated by a user after the starting signal is produced;

controlling means for controlling said focus adjusting means to repeat the focus adjusting operation continuously after the starting signal is produced;

calculating means for calculating a velocity of an image, formed by the taking lens, along the optical axis of the taking lens based on a plurality of sets of focus condition data;

means for determining whether the position of the image is moving along the optical axis by comparing the calculated velocity of the image with a predetermined level; and changing means for changing the predetermined level in response to the operation of said operating member.

18. An auto focus camera as claimed in claim 17, wherein said starting signal producing means includes means for detecting, with no contact with the user, that the user beings a photographing operation and means for generating the starting signal in response to the detection.

* * * * *

UNITED STATES PATENT AND TRADEMARK OFFICE
CERTIFICATE OF CORRECTION

PATENT NO. : 5,315,339
DATED : May 24, 1994
INVENTOR(S) : Masataka HAMADA et al

It is certified that error appears in the above-identified patent and that said Letters Patent is hereby corrected as shown below:

On the title page: Item [75]
    delete "Otsuka" and insert -- Ootsuka --.

Signed and Sealed this

Sixteenth Day of August, 1994

Attest:

BRUCE LEHMAN

Attesting Officer     Commissioner of Patents and Trademarks